United States Patent [19]
Houggy et al.

[11] Patent Number: 5,838,226
[45] Date of Patent: Nov. 17, 1998

[54] COMMUNICATION PROTOCOL FOR TRANSMISSION SYSTEM FOR CONTROLLING AND DETERMINING THE STATUS OF ELECTRICAL DEVICES FROM REMOTE LOCATIONS

[75] Inventors: David E. Houggy, Allentown; Donald R. Mosebrook, Bethlehem; Robert G. Palmer, Jr., Allentown, all of Pa.

[73] Assignee: Lutron Electronics Co.Inc., Coopersburg, Pa.

[21] Appl. No.: 597,706

[22] Filed: Feb. 7, 1996

[51] Int. Cl.$^6$ ........................................... H04B 1/00
[52] U.S. Cl. ................... 340/310.01; 340/310.06; 340/825.06; 340/425.1; 455/3.3; 455/7; 455/9; 375/211; 375/259; 370/226
[58] Field of Search ............... 340/310.01, 310.04, 340/310.06, 310.08, 425.1, 825.06–825.13, 825.18, 825.56, 825.54, 825.72, 825.69; 455/3.3, 4.1, 7, 9, 11.1, 13.1; 375/211, 219, 220, 259, 257; 370/226, 243, 246, 315, 321

[56] References Cited

U.S. PATENT DOCUMENTS

| | | | |
|---|---|---|---|
| 3,781,478 | 12/1973 | Blahut et al. | 179/15 AL |
| 4,064,486 | 9/1977 | Faber | 340/825.06 |
| 4,400,694 | 8/1983 | Wong | 340/505 |
| 4,449,246 | 5/1984 | Seiler et al. | 374/4 |
| 4,556,865 | 12/1985 | Fukagawa et al. | 340/825.5 |
| 4,638,298 | 1/1987 | Spiro | 340/825.52 |
| 4,703,451 | 10/1987 | Calabrese | 340/382.07 |
| 4,745,597 | 5/1988 | Morgan et al. | 370/87 |
| 4,792,946 | 12/1988 | Mayo | 370/86 |
| 4,937,812 | 6/1990 | Itoh et al. | 370/13.1 |
| 5,038,140 | 8/1991 | Ikeuchi | 340/825.08 |
| 5,039,980 | 8/1991 | Aggers | 340/506 |
| 5,252,961 | 10/1993 | Yamauchi | 340/825.07 |
| 5,287,343 | 2/1994 | Nakamura et al. | 370/13.1 |
| 5,400,360 | 3/1995 | Richards et al. | 375/214 |
| 5,424,726 | 6/1995 | Beymer | 340/932 |
| 5,448,230 | 9/1995 | Schanker et al. | 340/310.06 |

FOREIGN PATENT DOCUMENTS

| | | |
|---|---|---|
| 091290 | 10/1983 | European Pat. Off. . |
| 210811 | 2/1987 | European Pat. Off. . |
| 534710 | 3/1993 | European Pat. Off. . |

OTHER PUBLICATIONS

*Patent Abstracts Of Japan*, vol. 018, No. 073, (E–1503), Feb. 7, 1994 & JP 05 284566, Oct. 29, 1993.
*Patent Abstracts Of Japan*, vol. 095, No. 003, Apr. 28, 1995 & JP 06 334581, Dec. 2, 1994.

(List continued on next page.)

*Primary Examiner*—Donnie L. Crosland
*Attorney, Agent, or Firm*—Ostrolenk, Faber, Gerb & Soffen, LLP

[57] ABSTRACT

A communication protocol for a two way transmission system having at least one first transmitter/receiver device, at least one second transmitter/receiver device and at least one repeater for relaying signals between the first and second devices. The protocol includes the steps of transmitting a first signal comprising a command from the first device, repeating the first signal with each repeater in a respective repeater time slot, receiving the first signal at the second device, transmitting status information from each second device in a respective status time slot, forming a status bit map comprising all status information in the at least one repeater, and transmitting the status bit map with the repeater so that the at least one first device has received the status bit map. Preferably, the transmission system comprises an R.F. communication system. If a plurality of repeaters are employed, the repeaters repeat the transmitted signals in a defined repeater sequence. The repeaters build a bit map of all status information received by the respective repeaters during the repeater sequence. In this way, it is assured that all first and second devices receive those signals intended for the respective devices.

34 Claims, 39 Drawing Sheets

OTHER PUBLICATIONS

*Database WPI*, Section EI, Week 9319, Derwent Publications Ltd. & JP 05 091 558, Apr. 9, 1993.
"Wireless Land: Mobile–Computing's Second Wave", Electronic Design, Jun. 26, 1995 pp.55–72.

"Three–Way Light Switch an Aid to Safety" Staten Island Advance, May 4, 1995 p.D2.

"Analysis of a Slot Microstrip Antenna" IEEE Transactions on Antennas and Propagation, vol. AP–34, No. 2 (Feb. 1986).

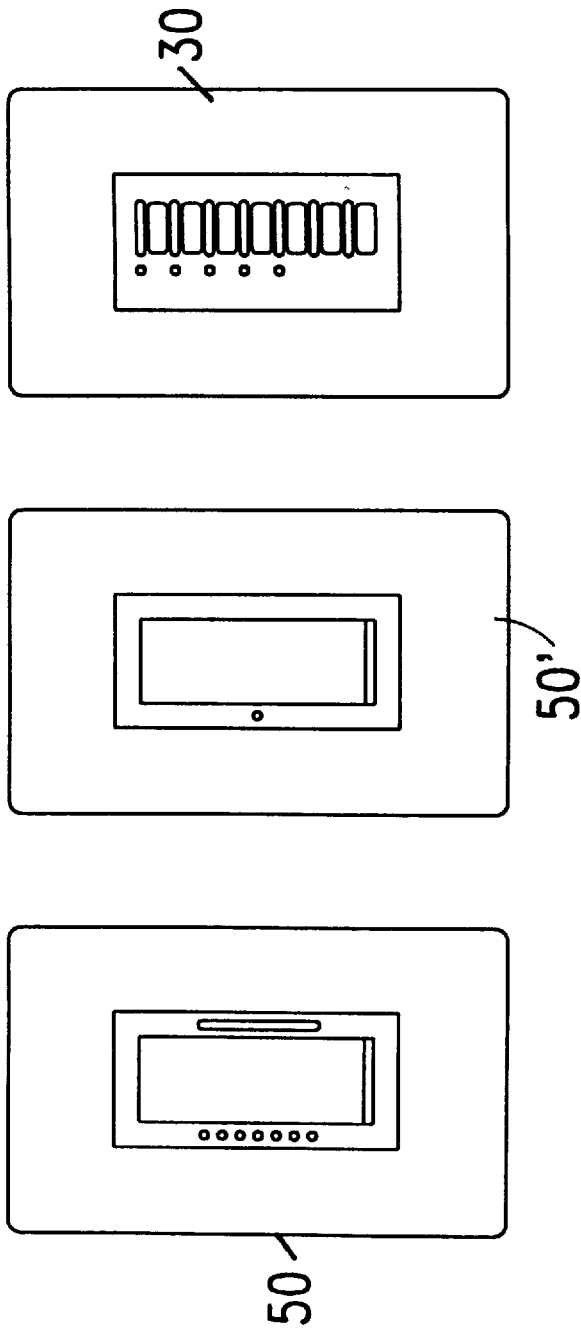

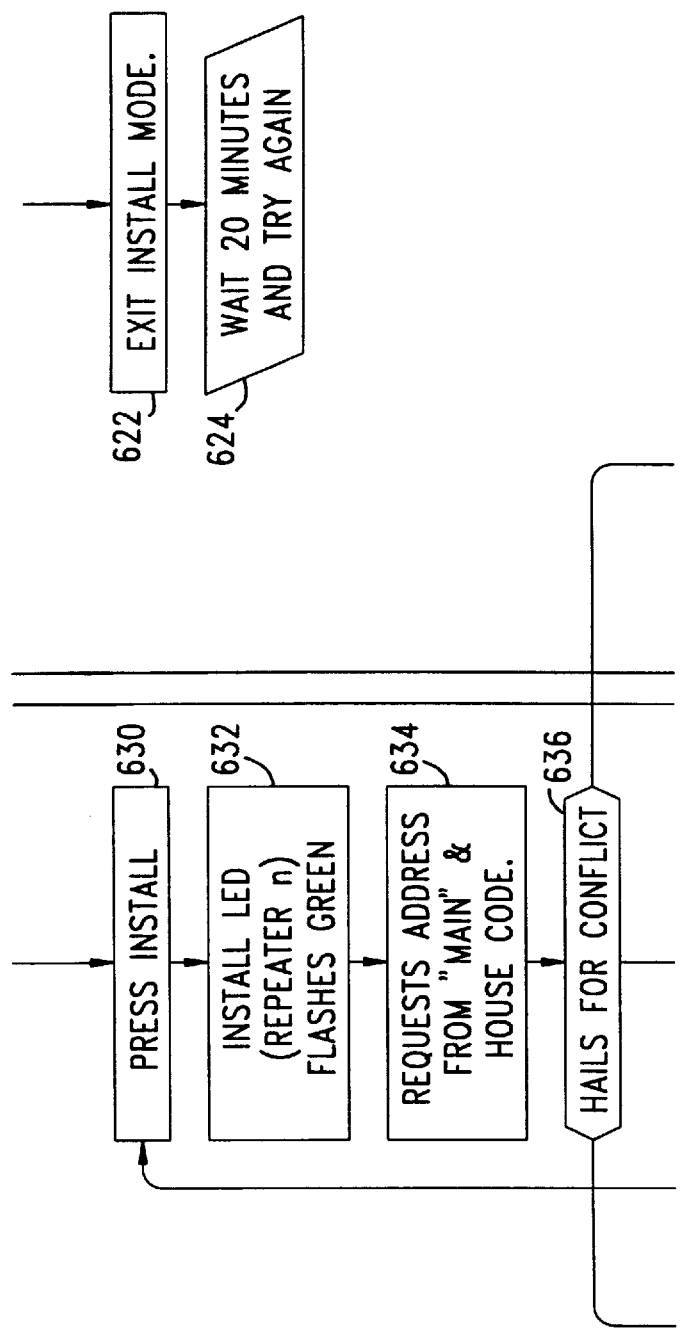

COMMUNICATION PROTOCOL FOR TRANSMISSION SYSTEM FOR CONTROLLING AND DETERMINING THE STATUS OF ELECTRICAL DEVICES FROM REMOTE LOCATIONS

BACKGROUND OF THE INVENTION

The present invention relates to the control of electrical devices, and in particular, electric lamps, from remote locations. Even more particularly, the present invention relates to the control of electrical devices such as electric lamps from remote locations through radio frequency links. In particular, the present invention relates to a system for controlling electrical devices from remote locations over communications links, e.g., radio frequency links, and which dispenses with any need to alter the internal wiring of the electrical system, i.e., the internal wiring of a building. Even more specifically, the present invention relates to a communication protocol for such a system for providing communications signals between components of the system to insure that each component reliably receives communications intended for it.

The present invention provides a system for controlling the status of electrical devices, for example, electric lamps, from a remote location via communication links such as radio frequency links, power line carrier links or infrared links. The present invention allows the status of the electrical devices, e.g., on, off and intensity level, to be transmitted back to a master location. The present invention may employ at least one repeater to ensure reliable communications between the control devices for the electrical devices, for example, specially adapted lighting control devices in accordance with the invention, and at least one master unit. In the preferred embodiment, the master unit generates a radio frequency signal which is transmitted to and received by either or both a control device, such as a light dimmer, and a repeater, which is provided also to relay the control signals to the control device. The repeater is important in the case where the local control device is unable to receive the control signals directly from the master unit. The control device then actuates the electrical device to the desired status, returning a radio frequency signal via an antenna to the master unit or to the master unit via the repeater indicating the true status of the electrical device.

In another embodiment, the invention uses power line carrier signals to communicate from master unit to control device and radio frequency signals to communicate from control device to master unit, optionally via a repeater.

In yet another embodiment, the invention uses an RF to power line carrier bridge. RF control signals are transmitted from a master unit to the bridge and converted to PLC signals for receipt by the control devices. The control devices transmit status RF signals to the bridge for conversion to PLC signals for receipt by the master unit.

Although the present invention is directed particularly to a lighting control system, the present invention can be applied to communication signals relating to the control and status of other devices, for example, communication equipment, motors, audio/visual equipment, computers, appliances, HVAC (heating, ventilating and air conditioning) systems, security systems, etc.

The present invention preferably includes one or more lighting control devices which each include an antenna and a control and communications circuit which activates a controllably conductive device contained within the lighting control device. A controllably conductive device may comprise, e.g. a semiconductor device such as a TRIAC, bipolar transistor, FET, IGBT, etc. or a switch or relay or any other device whose conductive state can be controlled. The lighting control device can also be manually actuable. The lighting control device, according to the preferred embodiment of the invention, includes an RF antenna, a transmitter/receiver and a control circuit for processing signals received from a master unit and for communicating status information to the master unit.

The control device preferably fits into a standard electrical wall box, and the antenna which comprises a part of the control device is sized so as to fit within the standard electrical wall box or at least within the area defined by the faceplate for the opening of a standard electrical wallbox.

According to the invention, the master units can take several forms. In one embodiment, the master unit comprises a table top master which can plug into an electrical outlet, and has a conventional antenna for transmitting and receiving signals. In another form, the master is a wall mount master and is sized such that it fits within the confines of a standard electrical wall box. In either embodiment, the master unit preferably includes a plurality of controls, each associated with a particular electrical control device or a plurality of electrical control devices. As will be explained herein, the association of the electrical control devices to a particular control on the master unit is freely programmable by the user. Further, the master unit may include functions which allow all electrical control devices to be turned on or off simultaneously. In addition, the present invention can include at least one repeater, which helps to ensure that all signals communicated between master and control devices are received by the appropriate receiver, whether the master or the electrical control device. The repeaters employ a repeater sequence for helping to ensure that each receiver receives those signals intended for it.

In the preferred embodiment of the invention, the communications protocol is for use in a two way R.F. communications system having a first transmitter/receiver, a second transmitter/receiver and a repeater that relays signals between the first and second transmitter/receivers. In an actual implementation, the first and second transmitter/receivers are the master control unit (first) and local control device (second) controlling an electric lamp or other electrical device wired to the control device through, for example, a building electrical power system. A plurality of the second devices typically is provided. Each control device comprises a manual actuator for manually setting the status of the appliance and a circuit controlled by the connected transmitter/receiver for setting the status or command remotely from the master unit. Each control device transmits a status signal to be received ultimately by the master unit concerning the status of the electric device, in the case of an electric lamp, its status as on, off and the intensity level.

In order to ensure reliable communications and to provide true status to the master unit, according to the preferred embodiment of the invention, at least one repeater is strategically placed to relay control and status signals.

The communications protocol according to the preferred embodiment of the invention used by the master unit, repeater and control devices is as follows:

The master unit transmits a control signal corresponding to the setting of the status of at least one appliance, as so determined by an actuator of the master unit. A plurality of electrical devices may be controlled by a single master unit actuator. The master transmits a link claim signal followed by a command packet which includes control signal commands for the control devices. Each repeater repeats the link claim signal and command packet in a defined time slot, to avoid interference. The repeaters repeat the signal in a defined repeater sequence dependent on the number of repeaters. In order to ensure reliability, the repeaters may transmit multiple times during the defined repeater sequence. This will ensure that all control devices receive the particular control signals intended for it.

At the end of the repeater sequence, the master transmission is repeated and the repeater repeats the sequence a second time, to provide even greater reliability. Optionally, the master can retry for third and fourth times. The control devices transmit status signals that are received by ones of the repeaters and possibly the master unit.

During the repeater sequence, the repeaters build a status bit map of all status information, obtained from the status signals from each of the control devices, adding to the status bit map only the information known to the particular repeater and transmitting an updated status bit map, thus passing the updated status bit map around to all other repeaters until a complete status bit map of all status information is developed by the repeaters. The repeater sequence ensures that the complete status bit map is developed and all master units receive the complete status bit map.

The repeaters obtain status information from the control devices when the control devices transmit a status signal in response to a command signal from the master directly or via the repeater or repeaters. The master also transmits an assignment bit map of all control devices assigned to a master unit actuator. The control devices each determine an assignment time slot in which to communicate by determining the number of control devices assigned to a master unit actuator.

In the repeater developed status bit map, each control device is assigned two bits in the status bit map. To maintain a 50% duty cycle, an "on" state of an electrical device is a 10 and an "off" state is 01, with no response being a 00 or 11. The latter states alternate to maintain the 50% duty cycle.

An exemplary repeater sequence, if there are four repeaters, is R1-R2-R3-R4-R1-R3-R2-R1-R4-R3-R1-R2, requiring 12 repeater time slots. According to the preferred embodiment, each one of the repeater time slots is 25 msecs long. It is required that any single device only communicate once in a 100 msec interval due to FCC regulations. FCC averaging is performed every 100 msecs. By ensuring that every device communicates only once in a 100 msec interval, this allows for maximum transmission power. With repeater time slots of 25 msecs., the above sequence would violate this rule. Accordingly, a longer sequence has been chosen: R1-R2-R3-R4-R1-R2-R3-R4-R1-R2-R3-R4-R1. Alternatively, wait slots in which no communication is made can be used. Other repeater sequences have been developed for different numbers of repeaters.

The repeaters generate the status bit map so as to reduce the time required to get the status signal from each control device back to every master. If each status signal was required to be passed separately through the repeater sequence, too much time would be required and the system operation would be too slow. By building a status bit map, time is saved because each repeater adds to the status bit map only the information that it has. The updated status bit map is then passed around the system through the repeater sequence, new data being added by each repeater until the sequence ends, at which point the status bit map is complete and all master units have received the complete status bit map at least once. The status bit map generation process thus allows an increasingly larger set of information to be moved to the destination points in parallel.

The repeater repeats or retransmits received information between a first device and a second device. The first and second devices are adapted both to transmit and receive and the repeater transmits and receives to provide two way communication between the first and second devices. The first device may be, e.g., a master control unit for remotely controlling the status of a plurality of electrical devices, such as electric lamps connected into a hardwired electrical system connected to an electrical power network. The second device may be an electrical control device for the electrical device connected into the hardwired electrical system. The first and second devices include RF transmitter/receivers for communicating with each other either directly or via the repeater. The repeater assures that communication between the first and second devices occurs despite shadowing, nulls, attenuation, electromagnetic interference and inefficient antennas. The repeater helps to ensure reliable communication within the confines of a building and despite stationary interference/attenuation sources, such as walls, building materials, furniture, plumbing, electrical lines, etc. and moving interference/attenuation sources, such as people, animals and water in plumping lines, for example. The repeater is particularly suited for transmitting signals in a communication system located in a confined area, such as a building, and is particularly adapted for transmitting signals in a radio frequency control system for controlling the status of a plurality of electrical devices such as electric lamps connected into a hardwired electrical power network such as the electric system of a building.

A plurality of repeaters can be used as the number of and distance between first and second devices increases. Each repeater has a control circuit for transmitting received information in a defined repeater time slot and in a defined sequence predetermined to ensure that all devices receive the information intended for the device. The sequence does not require knowledge of the order or location of the repeaters to guarantee that each device receives the information intended for the device.

Each repeater includes a circuit for generating a status bit map of all status signals known to it. The status bit map is transmitted to other repeaters with the other repeaters each adding status Information known to the particular repeater to the status bit map. After the repeater sequence is complete, the complete status bit map having all status information will be formed ensuring that all repeaters transmit a complete status bit map and all devices receive the information intended for that device. In particular, each master unit will have received the complete status bit map at least once. In order to obtain high reliability, the repeater is spaced more closely than the wider spacing allowed by theory.

There are various systems known in the prior art which allow for remote control of lighting fixtures without hard wiring control lines to the lighting control devices.

In one prior art system, a user can install a so-called three-way electrical switch, i.e., an additional light control switch, into an existing hard wired single control system by replacing an existing manually operated lighting control device with a lighting control device having a radio frequency receiver incorporated therein. The replacement lighting control device is hard wired into the electrical system in the same way as the conventional device to control the lighting fixture. The radio frequency receiver is responsive to radio frequency signals generated by a remote battery powered switching device having a transmitter which can be conveniently affixed to a building wall at another location, thereby to provide the three-way switch circuit. The additional battery powered lighting control device has a manually operated lever, which when operated, sends an RF signal to the other electrical control device which is hard wired into the building's electrical system. The hard wired device will then toggle in response from its present state to the opposite state, i.e., from on to off or off to on. Thus, either switching device, the hard wired replacement or the battery powered device, can operate the light fixture. Accordingly, a three-way electrical switch can be provided into an existing electrical system without hard wiring the three-way switch into the system. In this prior art system, having the battery powered transmitting switch and the hard wired switch including the receiver, the hard wired receiving switch includes a whip antenna made from a piece of insulated wire which may be allowed to dangle out of the electrical box either outside the building wall or inside the wall. The receiver in the hard wired switch allows only one way of communication i.e., it receives signals from the battery powered transmitting switch. Two-way communication between the hard wired switch and the transmitting switch is not provided. A system of this type is sold by Heath Zenith as the Reflex Switch. Another device of this type, which instead employs a hand-held remote control to provide a three way switching function, is manufactured by Dimango.

In another prior art system an existing hard wired manually operated lighting control device is replaced with a lighting control device having a radio frequency receiver incorporated therein. The replacement lighting control device is hard wired into the electrical system in the same way as the conventional device to control the lamp in a lighting fixture. The radio frequency receiver is responsive to radio frequency signals generated by a remote battery powered control device having a transmitter which can be conveniently affixed to a building wall at another location. The battery powered control device has switches to enable the selection of four different light levels. The switches when operated cause an RF signal to be sent to the electrical control device which is hard wired into the building's electrical system. The hard wired device responds to the RF signals by adjusting its output to cause the lamp to operate at one of four different predetermined light levels. In addition to responding to RF signals, the hard wired device can also operate in response to the actuation of manually actuated switches incorporated within it. Two way communication between the hard wired device and the battery powered control device is not provided. A system of this type is sold by Leviton as the Anywhere switch.

In another prior art system, known as the X10 system, standard lighting control fixtures are replaced by lighting control fixtures operating via a power line carrier (PLC) communication system, i.e., information for operating the remote lighting control devices is provided over the building existing power line by a power line carrier (PLC). In addition, in some of these systems, an RF communications link is also provided so that a hand held remote control master device can be used to operate the various lighting fixtures. In these systems, an RF repeater may also be provided. In the X10 system, only one way communication is provided so that a master unit is not apprised of the status of the controlled light fixtures. Also, the user is unable to tell if the command sent by the master was carried out by the lighting control device due to poor communication links caused by noise, burned out light bulbs, etc.

In the X10 system, a radio frequency to PLC bridge is provided to convert radio frequency signals into power line carrier (PLC) communication signals. The RF to PLC bridge plugs into an existing wall outlet and provides the PLC carrier onto the electrical power line to be received by controlled lighting control devices. Typically, the RF to PLC bridge comprises a box which is plugged into an existing wall or electrical outlet and has an antenna for receiving signals from the master controller or a repeater.

In addition to the X10 system, there are also known two-way communications links for providing, in general, home automation. These include the Electronic Industries Association Consumer Electronics Bus (CEBus) (EIAIS-60) protocols for radio frequency media, power line carrier, infrared media and twisted pair media, and the Echelon Corporation LONworks. Intellon Corp. provides transceivers that comply with the CEBus standards for RF and power line carrier. Echelon provides transceivers that comply with their communications protocol. Although these systems in general provide communications links which can be adapted to consumer and home use, none of them provide for the integrated system for controlling electrical devices as described herein.

In addition to the above, a system known as the Smart House supplied by Smart House LP is also available. This system comprises a wired system and, accordingly, would entail expensive alteration and dislocation if applied to the control of electrical fixtures, particularly lighting in a home.

In addition to the above, the assignee of the present application offers systems known as HomeWorks, NetWorks and LuMaster which are hard-wired control systems controlling lighting devices. Although these systems are suitable for new construction, they entail major alteration and dislocation when applied to existing homes.

Also becoming available are wireless local area networks (LANs) for computer systems, which employ radio frequency communication methods ensuring that all nodes of the network can communicate with each other. See, for example, Electronic Design, Jun. 26, 1995, page 55.

SUMMARY OF THE INVENTION

It is, accordingly, an object of the present invention to provide a communication protocol for a system for remotely controlling electrical devices, for example electric lamps, without having to rewire a building's electrical system.

Yet still a further object of the present invention is to provide a communication protocol for a communication system for controlling electric lamps and/or other electrical devices which allows a building's existing lighting system, for example, to be controlled from remote locations without having to rewire the building's electrical system.

Yet still a further object of the present invention is to provide a communication protocol for an electrical control system providing two way transmit/receive communications of radio frequency signals, thereby allowing the reception of signals to operate an electric lamp or other electrical device from a remote location as well as a transmit function to provide back to the remote location the status of the affected electric lamp or electrical device.

Yet still a further object of the present invention is to provide a communication protocol for such a system including one or more master units and one or more electrical control devices, for example, dimmers, the latter being installable in standard size electrical wall boxes so that they can be installed retroactively into a building's electrical system to allow remote control of the control devices.

Yet still a further object of the present invention is to provide a communication protocol for a system for remote control of electrical control devices controlling electrical devices, for example, electric lamps, which includes at least one master unit having a plurality of controls, each of which is programmably associatable with one or more electrical control devices.

Yet still a further object of the present invention is to provide a communication protocol for a system for the remote control of electrical control devices controlling electrical devices, for example, light dimmers controlling electric lamps, which allows for reliable two-way radio frequency communications between the electrical control device and the master control unit, such that information is provided by the master unit to a lighting control device to control the status of the associated electric lamps, and information concerning the status of the associated electric lamp is transmitted back to the master unit to be displayed.

Yet still another object of the present invention is to provide a communication protocol for communicating with an electrical control device, the control device including an antenna, a transmitter/receiver, and a control circuit for controlling the actuation of the associated controlled electrical device in response to signals received from a master unit, and which provides communications back to the master unit concerning the status of the controlled device.

Yet still a further object of the present invention is to provide a communication protocol for a system for remotely controlling electrical devices, for example, electric lamps, which includes at least one master unit and at least one electrical control device, and wherein at least one repeater helps ensure that communications between master and control device are received by the respective devices.

Yet still a further object of the present invention is to provide a communication protocol for use in an RF communication system.

Yet still a further object of the invention is to provide a communication protocol for use in a combined RF/power line carrier communication system. The protocol described can also be used with other communication links, e.g., infrared links.

Yet still a further object of the present invention is to provide a communication protocol which operates in conjunction with a repeater that transmits received information between a first device and a second device.

Yet still a further object of the present invention is to provide a communication protocol which operates in conjunction with a repeater which transmits information between first and second devices wherein the first and second devices are adapted both to transmit and receive communications.

Yet still a further object of the present invention is to provide a communication protocol for providing communications between a master control unit for remotely controlling the status of a plurality of electrical devices, such as electric lamps connected into a hard wired electrical system connected to an electrical power network, and a plurality of electrical control devices for controlling the electrical devices.

Yet still a further object of the present invention is to provide a communication protocol for use in a system for remotely controlling electrical devices which helps ensure communication between components of the system despite shadowing, nulls, attenuation, electromagnetic interference and inefficient antennas located in certain ones of the components.

Yet still another object of the present invention is to provide a communication protocol which helps ensure reliable communication within the confines of a building and despite stationary interference/attenuation sources such as walls, building materials, furniture, plumbing, electrical lines, etc.

Yet still a further object of the present invention is to provide a communication protocol which helps ensure reliable communication within the confines of a building despite moving interference/attenuation sources such as people, animals and water in plumbing lines.

Yet still a further object of the present invention is to provide a communication protocol which is particularly suited for use with a repeater for transmitting information in a communication system located in a confined area, such as a building, and which repeater is particularly adapted for transmitting information in a radio frequency control system for controlling the status of a plurality of electrical devices such as electric lamps connected into a hard wired electrical power network such as the electrical system of a building.

Yet still a further object of the present invention is to provide a communication protocol which can be used with a plurality of repeaters without interference between repeaters and wherein repeaters can be added as the number of components in the system increases.

Yet still a further object of the present invention is to provide such a communication protocol wherein received information is transmitted in defined repeater time slots and in a defined sequence predetermined to help ensure that all devices receive the information intended for the device.

Yet still a further object of the present invention is to provide a communication protocol for use with a system having a plurality of repeaters wherein the repeaters function with other repeaters according to a defined sequence wherein the sequence does not require knowledge of the order or the location of the repeater to guarantee that each device receives the signals intended for the device.

Yet still a further object of the present invention is to provide a communication protocol for use in generating a status bit map of all electrical device status information known to a repeater and which status bit map is transmitted to other repeaters with the other repeaters each adding status information known to the particular repeater to the status bit map.

Yet still a further object of the present invention is to provide a communication protocol which employs a repeater sequence to generate a completed status bit map, and once the completed status bit map is formed, to ensure that all repeaters transmit a complete status bit map and all devices receive the completed status bit map and thus the information intended for the particular device.

Yet still a further object of the present invention is to provide a communication protocol which is used in a system in which the spacing of the repeater from other components is closer than the wider spacing allowed by theory.

The above and other objects of the present invention are achieved by a communication protocol for a two way transmission system having at least one first transmitter/receiver device, at least one second transmitter/receiver device and a repeater for relaying information between the first and second devices comprising: transmitting a first signal comprising a first command from the first device; repeating the first command with each repeater in a respective repeater time slot; receiving the first command at the second device; transmitting status information from each second device in a respective status time slot; forming a status bit map comprising all status information in the at least one repeater; and transmitting the status bit map with the repeater so that the at least one first device has received the status bit map.

According to the preferred embodiment, the communication protocol further comprises transmitting the first command a second time from the first device and repeating the first command a second time with each repeater in the respective repeater time slot.

Further, according to the preferred embodiment, the communication protocol further comprises transmitting the first command a third and optionally fourth time from the first device and repeating the first command a third and optionally fourth time with each repeater in the respective repeater time slot.

Yet further according to the preferred embodiment, the communication protocol further comprises transmitting a link claim; and thereafter transmitting a command packet.

Still yet further according to the preferred embodiment, the communication protocol comprises transmitting the first command a second time; repeating the first command a second time with each repeater in a respective repeater time slot; the step of transmitting the first command a second time comprising: dividing a time period in which to transmit the first command a second time into a plurality of backoff time slots; selecting one of the backoff time slots for transmission of the first command a second time; and transmitting the first command a second time by transmitting the link claim and thereafter the command packet; the step of repeating the first command a second time with each repeater in a respective repeater time slot comprising: repeating the link claim a plurality of times after the first device transmits the link claim the second time; and repeating the command packet a plurality of times after the first device transmits the command packet the second time.

The objects of the invention are furthermore achieved by a communication protocol for a two way transmission system having at least one first transmitter/receiver device and at least one second transmitter/receiver device comprising: transmitting a first signal comprising a command from the first device; receiving the first signal at each of the second devices; and transmitting a status signal from each second device in a respective time slot; and further wherein each of the second devices have individual device addresses, and the addresses are used to determine the time slots.

The objects of the invention are also achieved by a communications protocol for a two way transmission system, having at least one first transmitter/receiver device, at least one second transmitter/receiver device, and a repeater for relaying information between the first and second devices comprising: transmitting a first signal comprising a command from the first device; receiving the first signal at the repeater; transmitting the command in a second signal from the repeater; receiving at least one of the first signal and the second signal at each of the second devices; transmitting a first status signal from each second device in a respective status time slot; receiving the first status signals from each second device at the repeater and combining them into a combined status signal; transmitting the combined status signal from the repeater; receiving at least one of said first status signals from said second devices and said combined status signal at said first device.

The objects of the invention are also achieved by a communication protocol for a two way transmission system, having at least one first transmitter/receiver device, at least one second transmitter/receiver device and at least two repeaters for relaying information between the first and second devices comprising: transmitting a first signal comprising a command from the first device; receiving the first signal at a first repeater; transmitting the command in a second signal from the first repeater; receiving at least one of the first signal and the second signal at the second repeater; transmitting the command in a third signal from the second repeater; receiving at least one of the first signal, the second signal, and the third signal at each of the second devices; transmitting a status signal from each second device in a respective status time slot; receiving the status signals from each second device at at least one repeater and combining them into a combined status signal; transmitting the combined status signal from the repeater; receiving the combined status signal at the other repeater, adding additional status information received by that repeater and transmitting an updated combined status signal from the other repeater; and receiving at least one of said status signals from said second device, said combined status signal, and said updated combined status signal at said first device.

Other objects, features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which:

FIGS. 13(A), 13(B) and 13(C) show the repeater installation mode utilized when installing the system according to the present invention;

DETAILED DESCRIPTION OF EMBODIMENTS OF THE INVENTION

Figure 1:
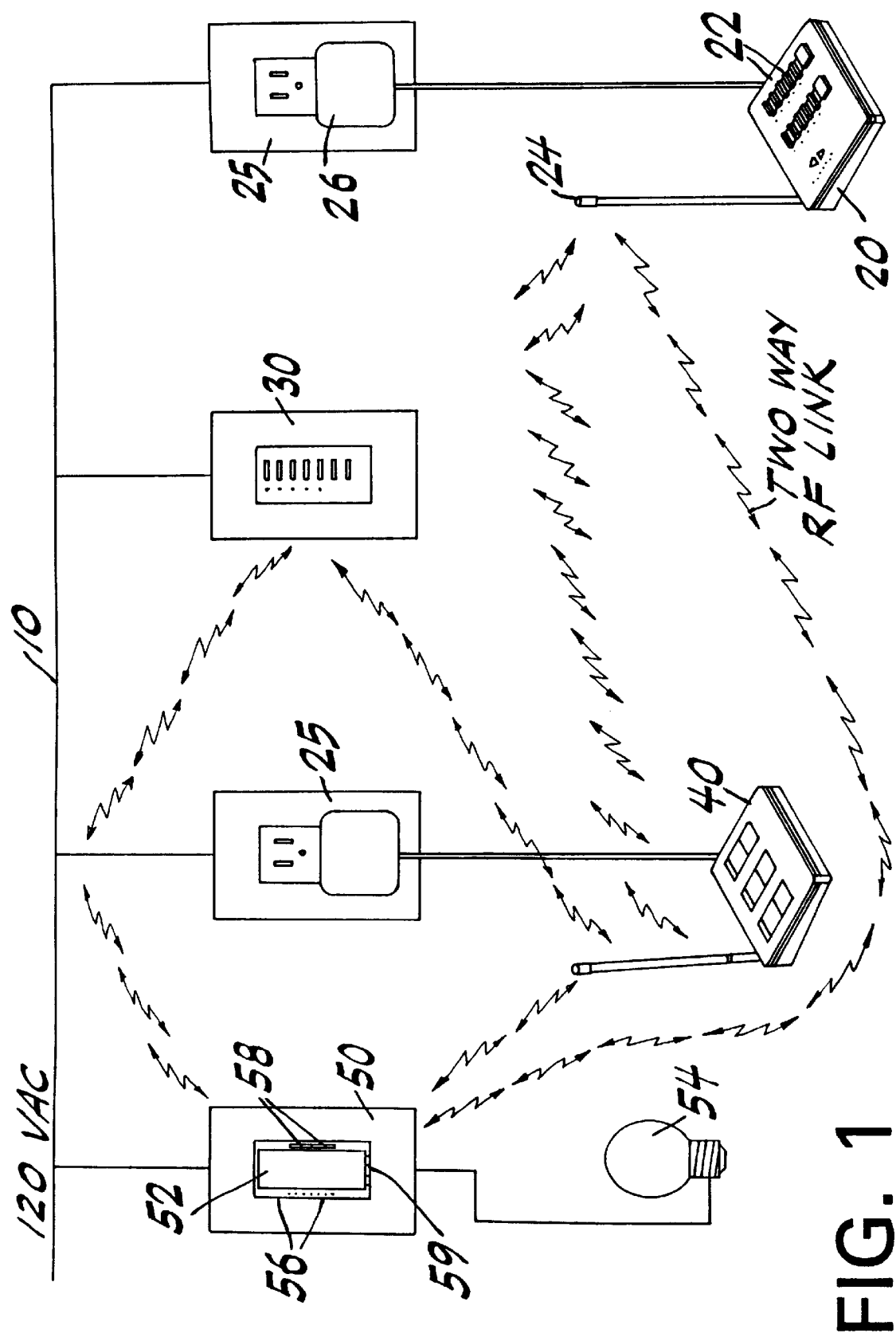
FIG. 1 is a system diagram of the overall system for controlling electrical devices from remote locations.

With reference now to the drawings, FIG. 1 shows a system according to the invention connected into a building's hard wired electrical system 10, which can be used to accomplish the remote control of the electrical lamps or other electrical devices hard wired into the hard wired electrical system 10. With the exception of installing lighting control devices to replace the existing standard lighting control switches, no change in the building wiring is necessary to implement the control functions. Accordingly, the system shown in FIG. 1 can be used to provide remote control of a building lighting system without installing any additional wires. This is particularly useful to retrofit an existing building for remote control without expensive construction work and rewiring. The system of the invention can, however, also be used in new construction. Even in new construction the invention has benefits in reducing the amount of wiring which is necessary.

In one embodiment of the invention, all control functions are accomplished by radio frequency signals between master control devices and lighting control devices, which may, but need not, be routed through a repeater.

According to the preferred embodiment of the system of the invention, a master control device 20 may be installed having a plurality of controls and status indicators 22 which control various control devices assigned to the various control buttons. The assignment of the particular control devices to particular control buttons is in accordance with a computer program which will be described in greater detail herein. According to the preferred embodiment, the master device 20 includes an antenna 24 for receiving and transmitting radio frequency signal and plugs into a wall outlet 25, for example through a transformer 26, for power. If desired, another type of master unit 30 can also be provided. The master unit 30 is identified as a wall mount master, because it is installable into a standard electrical wall box. The wall mount master shown in FIG. 1 is a single gang design, but it may be of multiple gang design as described later herein, and thus will fit in a multigang standard electrical wall box. The wall mount master 30 includes an antenna which is hidden from view and described in Applicant's co-pending application Ser. No. 08/598,239 filed concurrently herewith. Such an antenna is preferably hidden from view and receives and transmits radio frequency signals for control and status functions. A number of master units, either of the table top type or wall mount type or any combination of same can be provided in the system according to the invention.

According to the preferred embodiment of the system described, a repeater 40 is also provided to help ensure that every component of the system will receive the RF communication signals intended for that component for control purposes and/or for providing status information. The repeater is described herein and in copending patent application Ser. No. 08/598,234 filed concurrently herewith. The system is described herein and in co-pending patent application Ser. No. 08/599,097 filed concurrently herewith.

At least one lighting control device 50 is provided which is capable of manual actuation via a manual control button 52, but which is also capable of receiving radio frequency signals from the master units 20, 30 or repeater 40, to control the status of an electric lamp 54.

In addition, the lighting control device 50 is capable of transmitting radio frequency signals to the repeater 40 and/or master units 20 and 30 to inform the master units of the true status of the affected electric lamp 54. The status is indicated on a display device of the master unit. This is a true status of the affected electric lamp and if the affected lamp is burned out, the dimmer is malfunctional or a communication link is broken, the status indicator on the master will not light, informing the operator of a problem.

The lighting control device 50 may comprise a dimmer, for example, and may include a plurality of status indicating devices, for example, light emitting diodes 56 which radiate through optical wave guides to indicate the intensity setting of the electric lamp 54 to the user. In addition, the lighting control device 50 includes a means 58 for setting the intensity level. For example, such means 58 may comprise an up/down rocker switch. Furthermore, an on/off switch 59, for example, an air gap switch, may be provided to disable the operation of the lighting control device, as desired, e.g., for maintenance purposes.

A lighting control device having the general appearance of the lighting control device 50 shown in FIG. 1 is the device of the Maestro line sold by the assignee of this patent application. However, the Maestro lighting control device is not provided with any means for radio frequency communication, but merely is referred to here as an example of a lighting control device which has the general appearance of the lighting control device 50 shown herein. Additionally, the Maestro device can share some of the same or similar mechanical/electrical components as the lighting control device described herein.

As shown, the master can receive signals from the control devices directly or through the repeater. Likewise, the control devices can receive signals from the master either directly or through the repeater.

Figure 2:
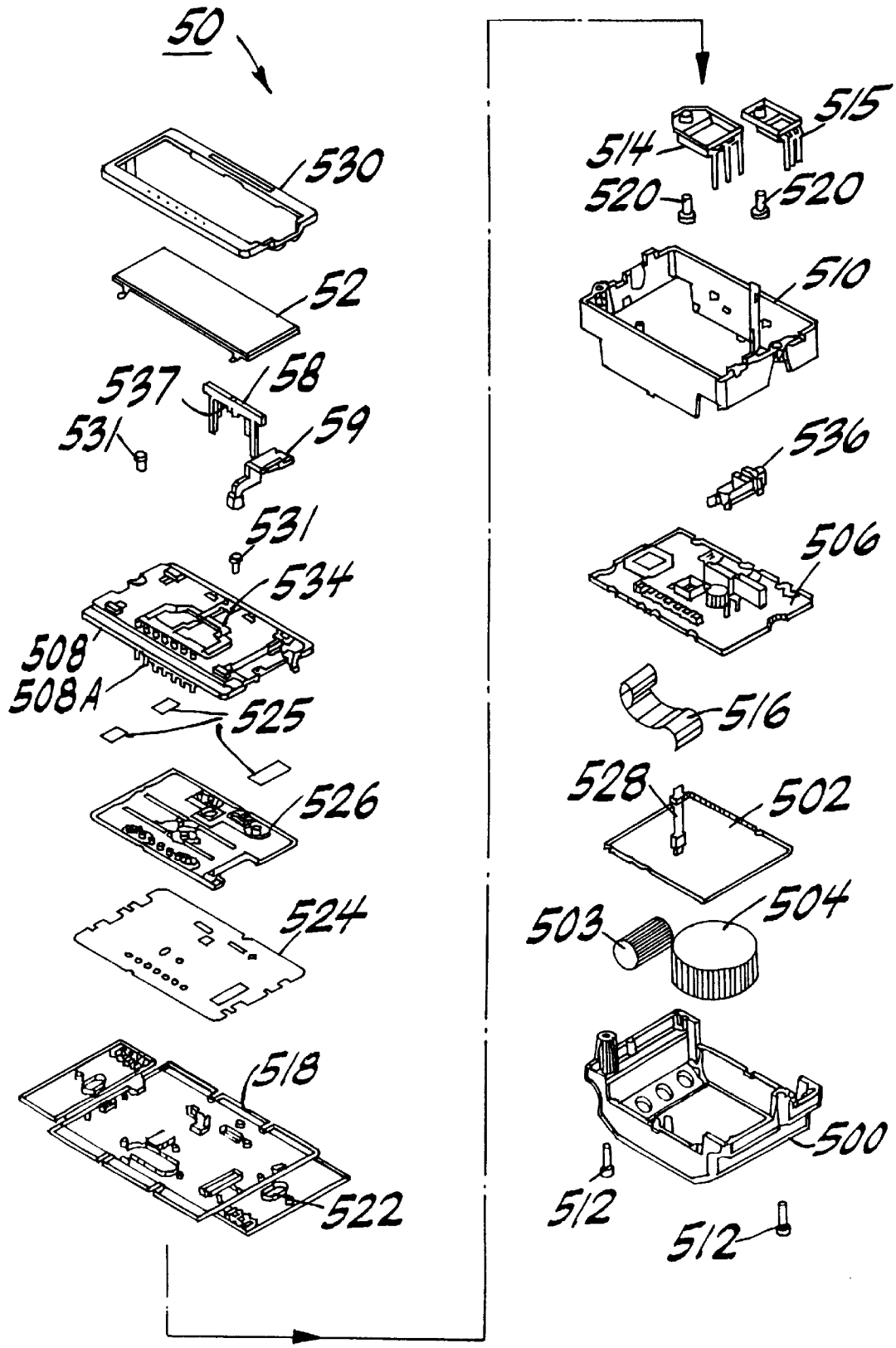
FIG. 2 is an exploded perspective view of a lighting control device, in the embodiment shown, a light dimmer, employable in the invention.

FIG. 2 is an exploded view of the preferred embodiment of lighting control device 50 shown in FIG. 1. The lighting control device 50 includes an insulating backcover cap 500 through which the power electrical wires can be provided. Into the backcover cap 500, an RF board 502 is provided, coupled to the antenna, to be described in greater detail below. The purpose of the RF board 502 is to receive radio frequency signals from the antenna for controlling the operation of the electric lamp as well as for transmitting radio frequency signals to the antenna for transmission back to the master devices.

Also provided in the backcover cap 500 is a radio frequency interference (RFI) suppression choke 504 and a capacitor 503 which is provided to appropriately filter the alternating current energy which is supplied to the lighting control device for power via building electrical system 10.

Also provided into the backcover cap 500 is a power and control board 506, which includes a power supply and regulator and a microprocessor control circuit that is controlled by signals received from the RF board 502 and which transmits signals to the RF board 502 concerning the status of the electric lamp.

The power and control board 506 includes a plurality of light emitting diodes which indicate the status of the affected lamp or lamps. A sub-bezel 508 is provided above the light emitting diodes and includes molded-in light-pipes 508A to transmit the light from each of the light emitting diodes externally of the device so that the light emitted by the light emitting diodes is visible to an operator of the device. Preferably, the sub-bezel can be made of a clear plastic such as Lexan™ or other polycarbonate or other light transmitting plastic to perform the light pipe function. Additionally, the sub-bezel 508 also functions to insulate antenna board 526 from the user. The antenna board 526 according to the preferred embodiment is coupled to the A-C supply, so such insulation is required according to the preferred embodiment. Coupled to the backcover cap 500 is a backcover ring, also of an insulating material, and indicated at 510 in FIG. 2. The backcover cap 500 and backcover ring 510 are held together by appropriate means, for example, screws 512. The lamp controlled by the power and control board 506 is controlled by a semiconductor power device 514, which may comprise a triac. Semiconductor power device 515 may be an FET or other transistor used as part of the power supply regulator for power and control board 506. The RF board 502 may be coupled to the power and control board 506 via a flex ribbon electrical connector 516 as shown.

Power semiconductor devices 514 and 515 are fastened to a metal yoke 518 via screws 520 to dissipate heat. The yoke 518 thus comprises a heat sink and also functions as the means by which the lighting control device 50 is mounted into an electrical wall box. Accordingly, yoke 518 includes two screw holes 522 for receiving mounting screws for mounting the yoke and accordingly the lighting control device 50 into the electrical wall box in conventional fashion. Disposed above the yoke 518 and insulating the yoke 518 from components disposed above the yoke is an insulating member 524 which may be made of an insulating material such as Kapton® as manufactured by DuPont. The insulating member 524 as well as the yoke 518 include a plurality of holes therethrough for light pipes 508A as well as wiring for connections to a printed circuit antenna board 526 disposed above the insulating member 524. A three pin electrical feed 528 is provided for connecting the antenna printed circuit board 526 to the RF board 502. Sub-bezel 508, disposed above the antenna printed circuit board 526, is made of a suitable insulating material and has disposed thereon an actuating button 52 operating through the intermediary of a molded-in hinge bar 534 to control a switch. The switch is operated by the hinge bar 534 and provides signals to the microprocessor which controls the operation of the power semiconductor device 514 to control the on/off status of the lighting control device. In addition, a rocker arm control 537 is provided having operating surfaces 58 for operating switches for increasing or decreasing the intensity of the connected electric lamp.

Airgap actuator 59 operates airgap leaf switch 536 to provide a positive airgap system off for system maintenance.

In addition to insulating sub-bezel 508, insulating members 525 may be provided, as necessary, to further insulate antenna board 526. These members 525 may be used to block small apertures in sub-bezel 508 provided for molding clearances.

Bezel 530 is provided as an outer covering for aesthetic purposes and may be suitably colored. Preferably, bezel 530 and members 52, 59 and 538 are each factory installed in one of selected colors so that an appropriate aesthetic appearance can be obtained. These respective components are interchangeable so that different colors or color combinations can be provided.

The elements 52, 59, 530, 536 and 537 are substantially conventional and their functions are known from the Maestro line of light dimmers sold by the assignee of the present application.

The antenna printed circuit board 526 is coupled to the yoke in an insulating fashion preferably via adhesive on both sides of insulating member 524. Sub-bezel 508 is coupled to yoke 518 via screws 531 and insulates the antenna from the external environment. In the preferred embodiment, the antenna is coupled to the power line and is accordingly at the power line potential. The sub-bezel 508, however, completely insulates the antenna from the user to prevent electrical shock. This construction saves the need for expensive and bulky electrical isolation of the antenna from the power line.

As shown in FIG. 2, the antenna printed circuit board 526 is completely enclosed within the lighting control device 50. There is no dangling antenna as in the prior art or any external antenna. The device 50 fits within a standard electrical wallbox. Alternatively, antenna board 526 can be sized so that it is somewhat larger than the outwardly facing opening in the electrical wallbox. In such case, the antenna board 526 is mounted just above the opening and should be sized so that it is no larger than the faceplate for the wallbox opening, and thus concealed behind the faceplate.

Figure 3:
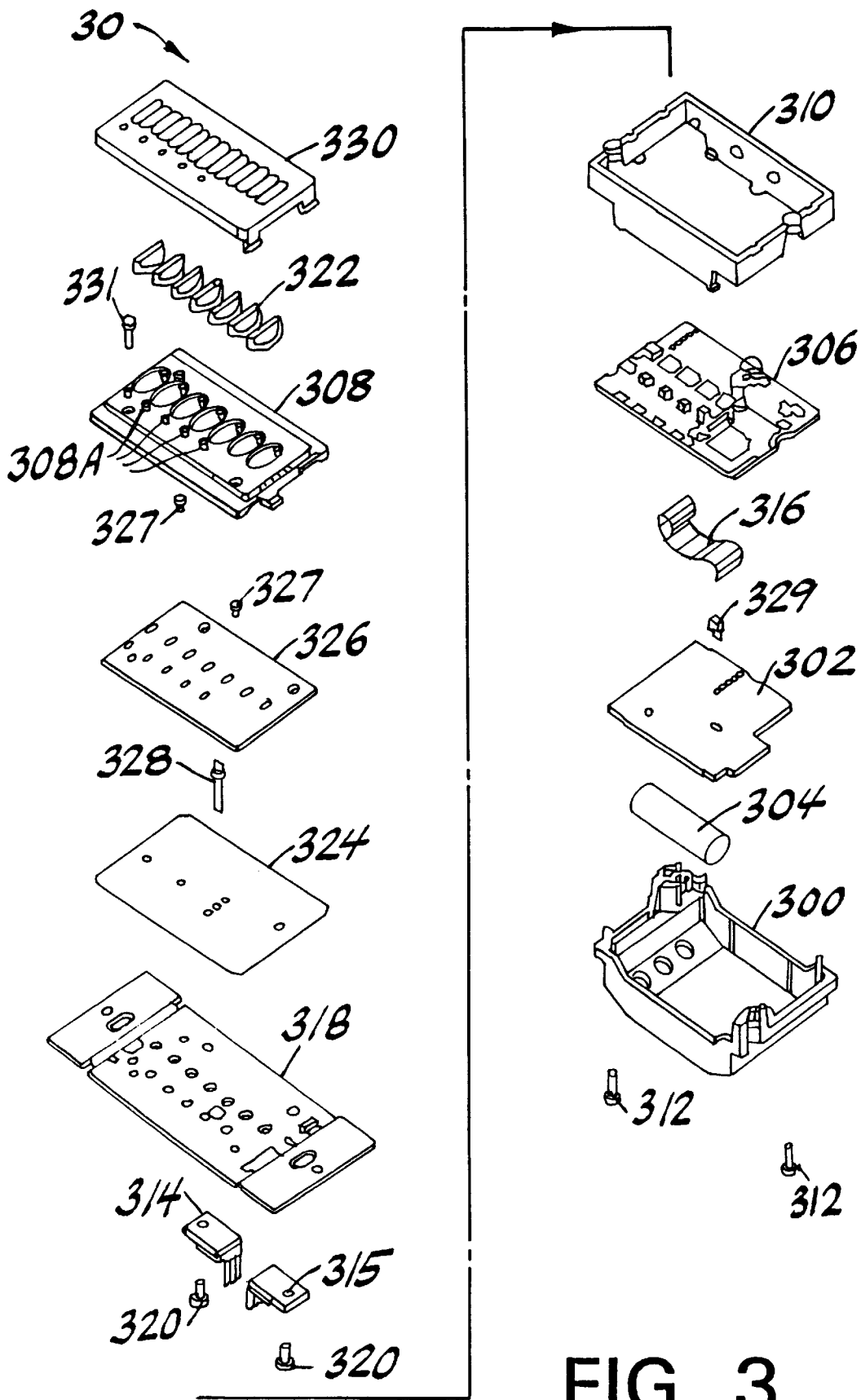
FIG. 3 is an exploded perspective view of a wall mounted master control station employable in the invention for controlling electrical devices from a remote location.

In similar fashion to the lighting control device 50, shown in FIG. 2, the preferred embodiment of the wall mounted master unit 30, shown in FIG. 3, includes a backcover cap 300, a power supply filter capacitor 304, an RF board 302, a flex connector 316, a power and control PC board 306, a backcover ring 310, power semiconductor control device 314 and voltage regulation device 315, a yoke 318, an insulator 324, for example, of Kapton® as manufactured by DuPont, an antenna PC board 326 as well as a different design sub-bezel 308 incorporating light pipes 308A, control buttons 322 and a bezel 330. A screw 331 fastens sub-bezel 308 to the yoke. Antenna screws 327 may be used to fasten the antenna to the yoke 318. Alternatively, adhesive can be used as in the embodiment of the dimmer of FIG. 2. A three pin feed 328 is provided for electrically coupling the antenna PC boards 326 via a three pin feed socket 329 to the RF board 302. As in the lighting control device 50, screws 320 are provided for fastening the semiconductor power device 314 and regulator 315 to the yoke 318. The backcover cap 300 can be suitably fastened to the backcover ring via screws 312.

The design of the antenna PC boards 326 and 526 may be somewhat different due to the differences in the number and function of the control buttons provided on the master 30 versus the lighting control device 50. Preferably, however, the antenna PC board 326 and 526 are designed according to the same constraints i.e., to fit within an electrical wall box, or within the faceplate area, so that they are of compact design, suitable for receiving and transmitting radio frequency signals, substantially far-field isotropic so that they are of particular use in confined areas such as buildings; having a narrow bandwidth and thus unaffected by extrinsic and out-of-band electromagnetic interference and interference caused by accompanying control circuits; of small size to fit into confined spaces and in particular, into standard electrical wall boxes; having an evanescent or fringe near-field disposed near the printed circuit board substrate edges and having a substantially negligible field on the backside of the substrate so as to minimize interference, particularly with adjacent control circuitry; preventing transmission substantially beyond the local area of the lighting system; capable of reception and transmission effectively despite the size of the antenna being much smaller than the operating wavelength; of particular use with the local control devices and master units of the RF controlled lighting control system of the present invention; sized so as to take maximum advantage of the small space available in electrical wall boxes but allowing other components, including mechanical actuation components and user indicators, for example, optical waveguides, to be incorporated in the wall box; of stable impedance relative to the environment and relatively unaffected by the environment; having an essentially capacitive impedance which is compensated by built-in inductive loading provided by the configuration of the PC board; concealed from view having no dangling or aesthetically displeasing visible antenna; providing a predominantly evanescent or fringe side radiation pattern in the near-field with substantially a negligible field on the antenna board backside to minimize electromagnetic coupling into the control circuitry; cost effective and eliminating the need for expensive and bulky AC network isolation electrical circuits but yet being completely insulated from the user; and capable of operation with two wire light dimmers having no neutral connection.

The details of the antenna 326 and 526 shown in FIGS. 2 and 3 are described in applicants above-identified co-pending application filed concurrently herewith. As described in that application, the antennae 326 and 526 preferably comprise a PC board type of antenna in which metallized land patterns are disposed on an insulating substrate. These antennae are sized to fit substantially within the area of the faceplate for the opening of an electrical wallbox. At the frequency and wavelength of operation of the preferred embodiment of the invention (418 MHz), the antenna size is such that all dimensions are substantially less than the free space wavelength of the RF signals processed, and, in particular, less than one-tenth the free-space wavelength.

Figure 4:
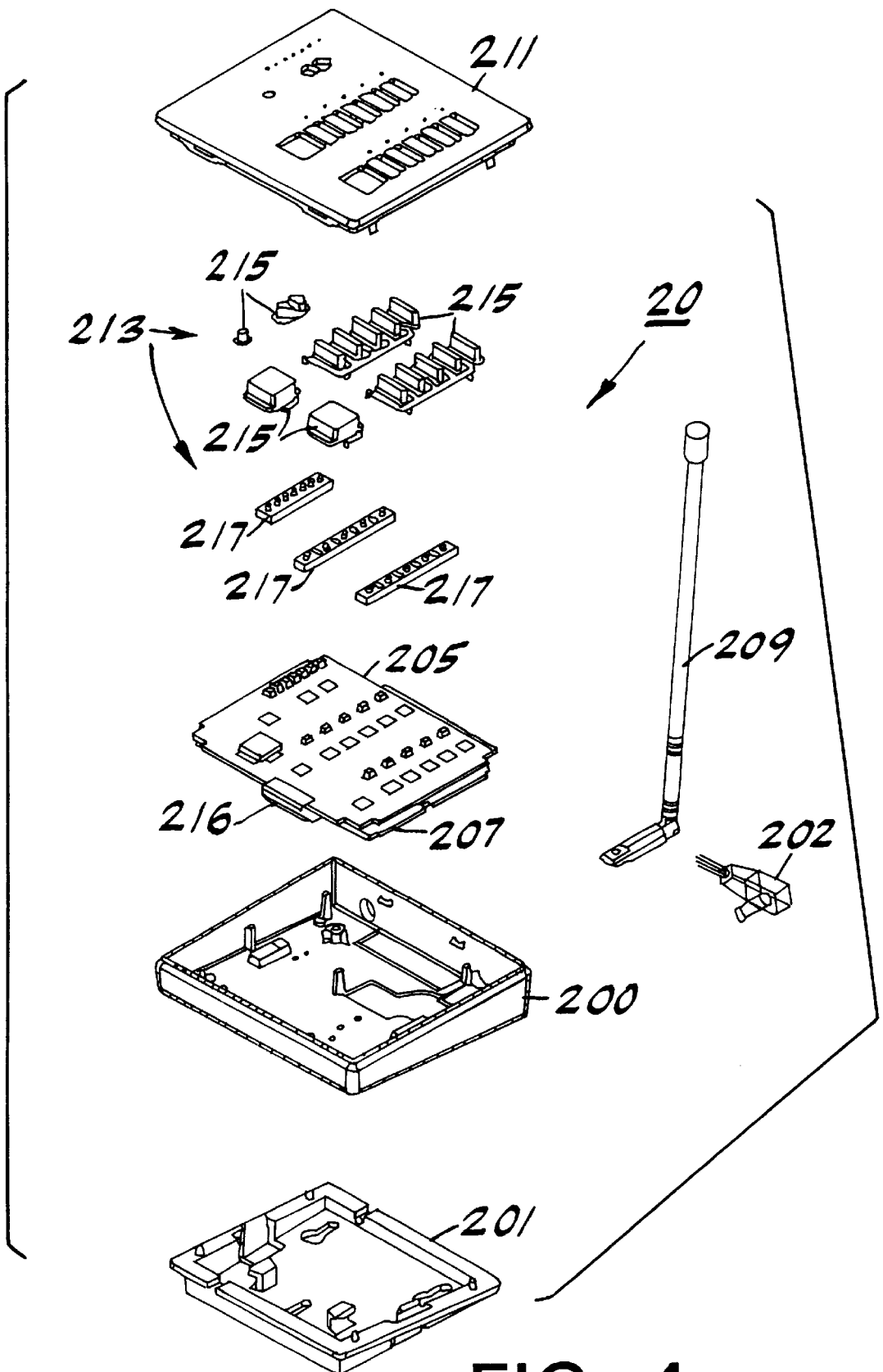
FIG. 4 is an exploded perspective view of a table top master control station for controlling electrical devices from a remote location according to the invention.

FIG. 4 shows details in an exploded perspective view of a table top master control station 20 shown in FIG. 1. According to the invention, the table top master control station comprises a base 200 and optional wall mounting plate 201 which snaps into the base 200 and allows the master to be mounted on a wall. The master includes a power connection 202 for plugging into a standard electrical outlet 25. Preferably, a transformer 26, as shown in FIG. 1, converts the standard electrical current to a low voltage current.

The master unit shown in FIG. 4 includes a main board 205 comprising various electrical components and a microprocessor to be described in greater detail below, and the unit further comprises an RF board 207 which is coupled to a conventional antenna 209, for example, a telescoping or non-telescoping pivotable antenna 209 as shown. In contrast to the antenna of the wall mounted master or control device, the table top master (and also the repeater) can employ a high efficiency antenna. A flex connector 216 is provided to connect RF board 207 to main board 205. Disposed above the main board 205 is a button housing 211 which provides support means for a plurality of user controls and indicators 213 and upon which labels of the functions of the various buttons and indicators may be provided. The user controls and indicators 213 include a plurality of buttons 215 as well as indicators 217, which might comprise light pipes for providing the outputs of light emitting diodes (located on main board 205) visibly to the user.

Figure 5:
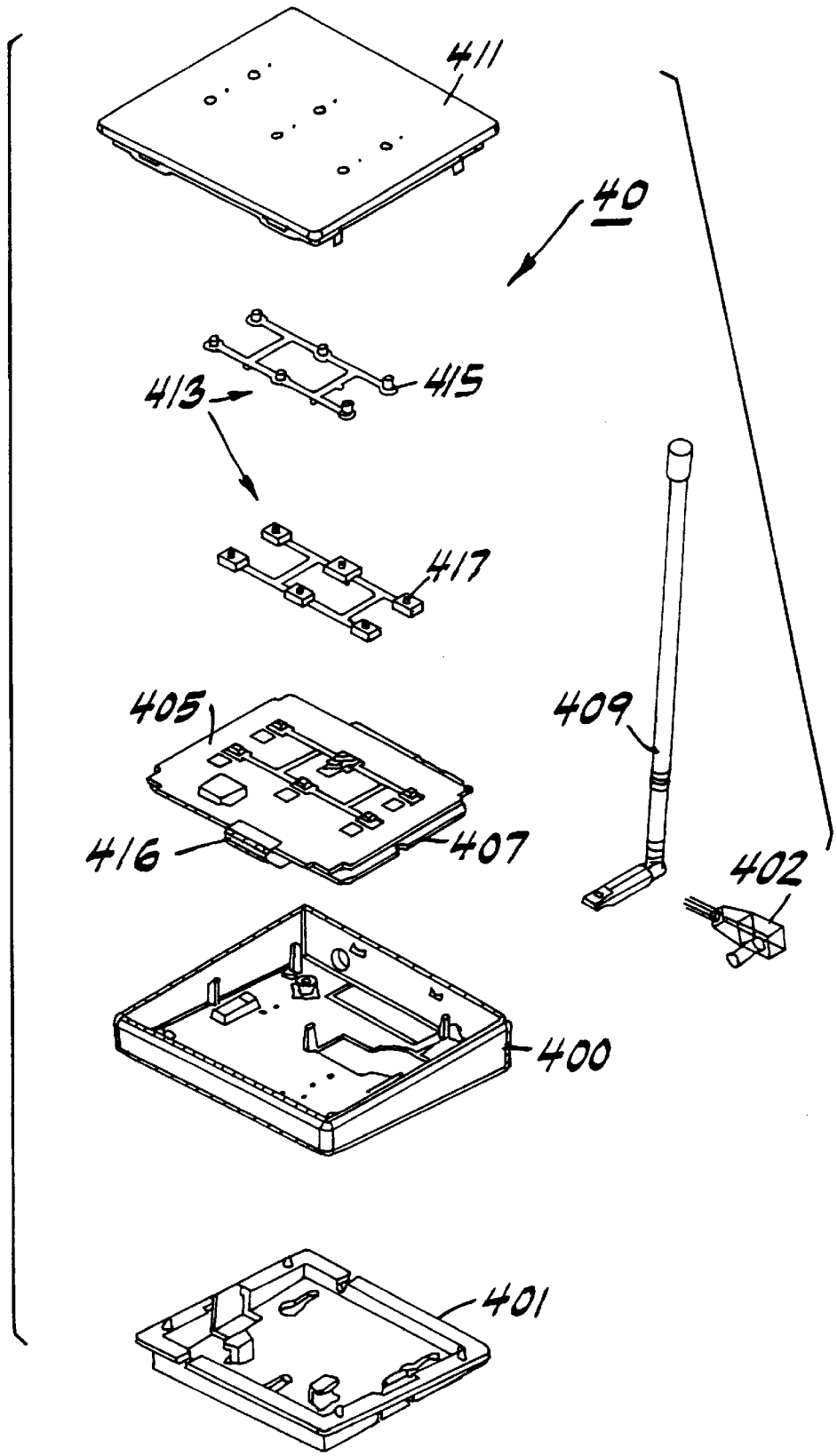
FIG. 5 is an exploded perspective view of a repeater station according to the present invention for helping to ensure that communication signals between master stations and control devices are properly received.

FIG. 5 is an exploded perspective view of a repeater unit according to the present invention, and the function of which will be explained in greater detail below. The repeater 40 includes a base 400, an optional wall mounting plate 401, a power plug 402, a main control board 405, RF board 407 coupled to antenna 409, a button housing 411 providing support for a plurality of indicators and buttons 413. The indicators and buttons 413 comprise a plurality of buttons 415 and light pipes 417. A flex connector 416 is provided to connect main board 405 to RF board 407.

Figure 6E:
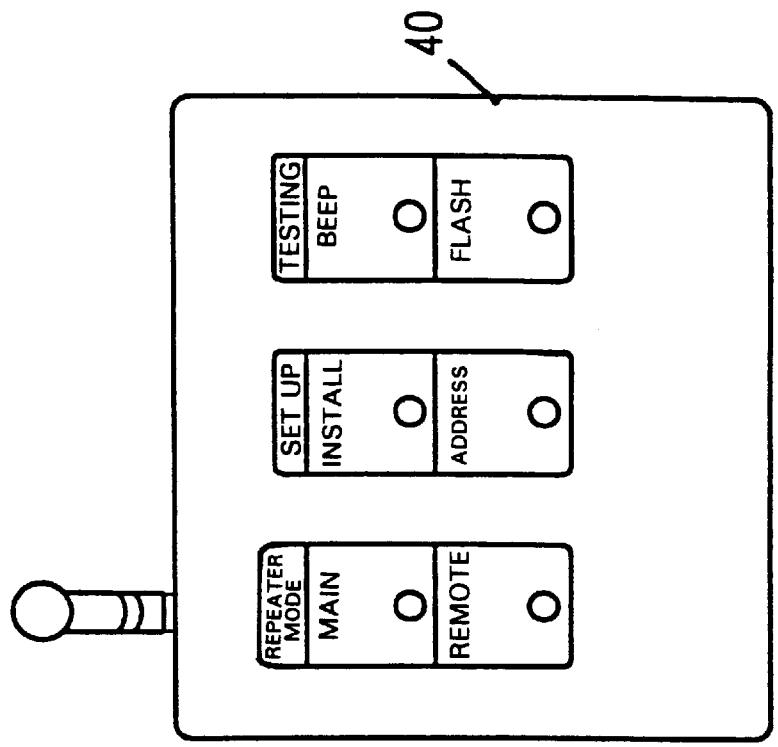
FIG. 6(a), (b), (c), (d) and (e) show respectively: (a) a lighting control device comprising a dimmer; (b) a lighting control device comprising an on/off switch; (c) a wall mounted master control station; (d) a table top master control station; and (e) a repeater, all according to the present invention.
Figure 6D:
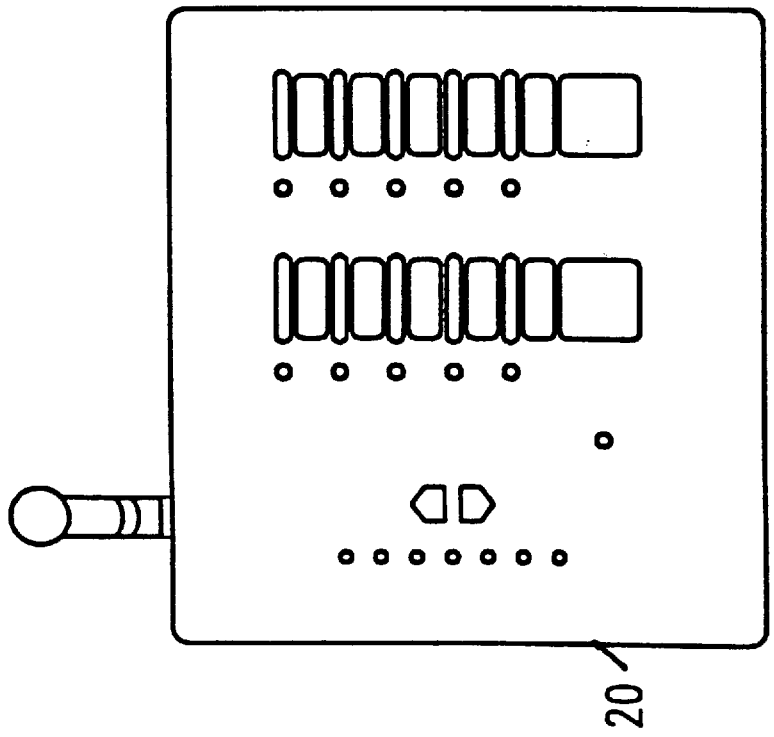

FIG. 6 shows the appearance of various ones of the components according to the present invention. FIG. 6(a) shows a typical dimmer 50 according to the present invention. FIG. 6(b) shows a typical on/off switch 50', which does not include a dimmer function. FIG. 6(c) shows a typical wall mounted master control 30, as shown in FIG. 1. FIG. 6(d) shows a typical table top master control station 20 and FIG. 6(e) shows the appearance of the repeater station which is shown in more detail in FIG. 11.

According to the preferred embodiment of the present invention, as described in greater detail below, the intelligence of control functions of the invention is distributed amongst the various components, including the repeater, the master station and the various lighting control stations 50 or 50'.

Figure 7C:
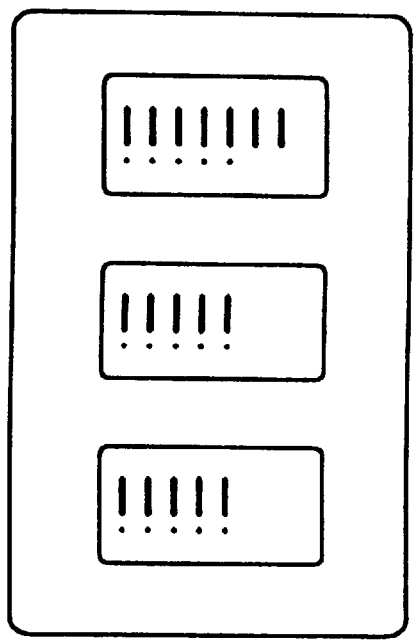
FIG. 7(a), (b) and (c) shows various master controls, particularly: (a) a 7 button master control; (b) a 12 button master control; and (c) a 17 button master control, all mountable in standard single or multi-gang electrical wall boxes.
Figure 7B:
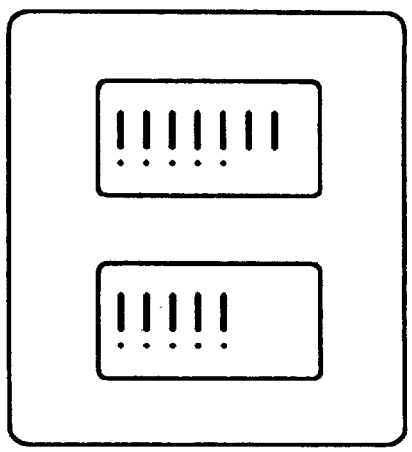
Figure 7A:
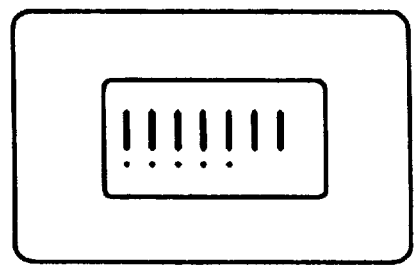

FIG. 7 shows that the wall mounted master stations 30 can comprise master stations having different numbers of control functions. For example, FIG. 7(*a*) shows a single gang master station mountable in a single gang electrical wall box and comprising seven buttons, five of which control the control devices in assigned locations and the other two buttons comprising respective switches to control the control devices to turn all electric lamps "on" simultaneously and all lamps "off" simultaneously. FIG. 7(*b*) shows a double gang wall mount master capable of controlling control devices assigned to 10 different control buttons and FIG. 7(*c*) shows a triple gang master control station capable of controlling control devices assigned to 15 different control buttons. Each of the wall mount masters 7(*b*) and 7(*c*) also include switches with control buttons for "all on" and "all off".

Figure 8:
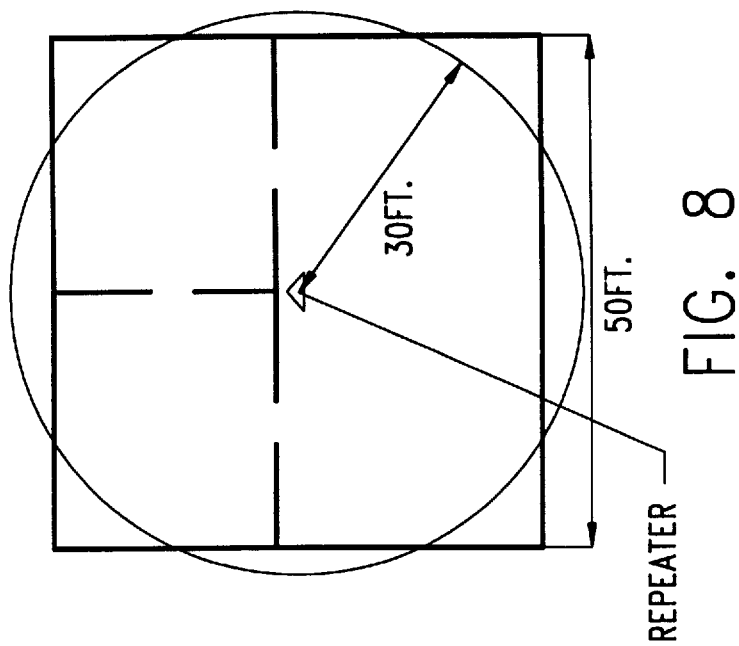
FIG. 8 shows typical positioning of a repeater in a three room installation.

According to the preferred embodiment of the present invention, the purpose of the repeater 40 is to help ensure that RF communication signals between master and control devices are received by the intended receivers. Accordingly, the system according to the preferred embodiment of the invention is provided with at least one repeater, which preferably is as centrally located as possible to help ensure that all communication devices are within a prescribed radius of the location of the repeater. As shown in FIG. 8, a preferred implementation of the present invention provides that all communication devices are located within 30 feet of the repeater. According to the preferred embodiment of the invention, more than one repeater can be used, as will be described in greater detail below.

Figure 9A:
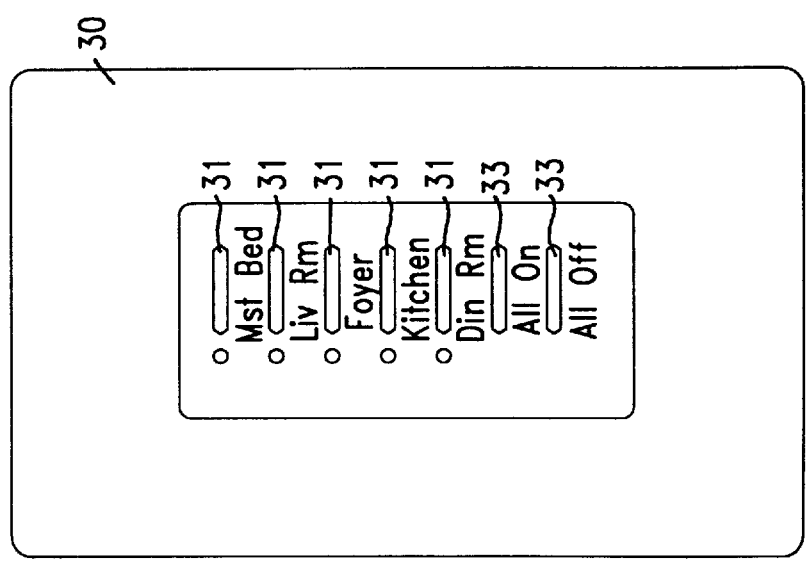
FIG. 9A is a detail of a portion of FIG. 9.
Figure 9:
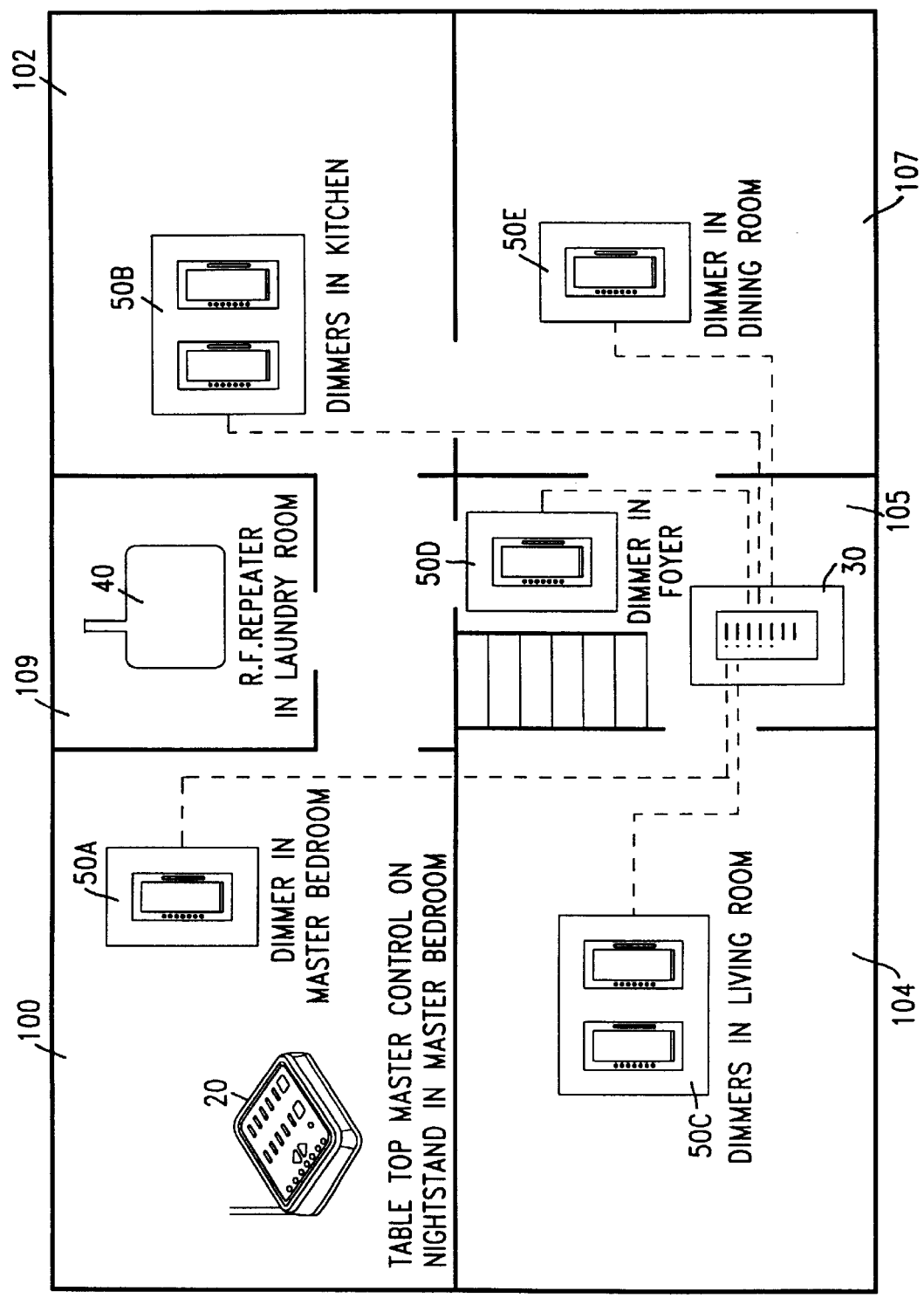
FIG. 9 shows an installation of the various components according to the present invention in a typical house, with the enlarged inset view of FIG. 9 showing one master control for this typical application.

FIG. 9 shows a typical installation of the system according to the present invention in a house having a floor having six rooms. As shown, a typical installation might include the disposition of a table top master control 20 in a master bedroom 100, various dimmers 50A, 50B, 50C, 50D and 50E (or alternatively switches or a combination of switches and dimmers) in respective master bedroom 100, kitchen 102, living room 104, foyer 105, and dining room 107. In addition, a single repeater 40 is provided in a central location in a room 109 to help ensure that signals between the master and the various dimmers and/or switches are received by the intended receivers. In addition, a wall mount master 30 is preferably provided in the entrance foyer of the house so that all switches and/or dimmers may be controlled or status determined from master locations 20 or 30. If the system is spread over a larger area or difficulty is experienced receiving signals at control devices or masters, additional repeaters can be installed.

The master control 30 shown in FIG. 9 is shown enlarged in FIG. 9A to illustrate a typical arrangement of the control buttons and how a user may program the control buttons to implement desired functions. As shown in FIG. 9A, the master control 30 includes a plurality of control buttons. In the embodiment shown, there are five control buttons 31 assigned to each of five rooms in the house. The remaining two buttons 33 allow the user to turn all controlled lamps on or all controlled lamps off simultaneously.

Figure 10:
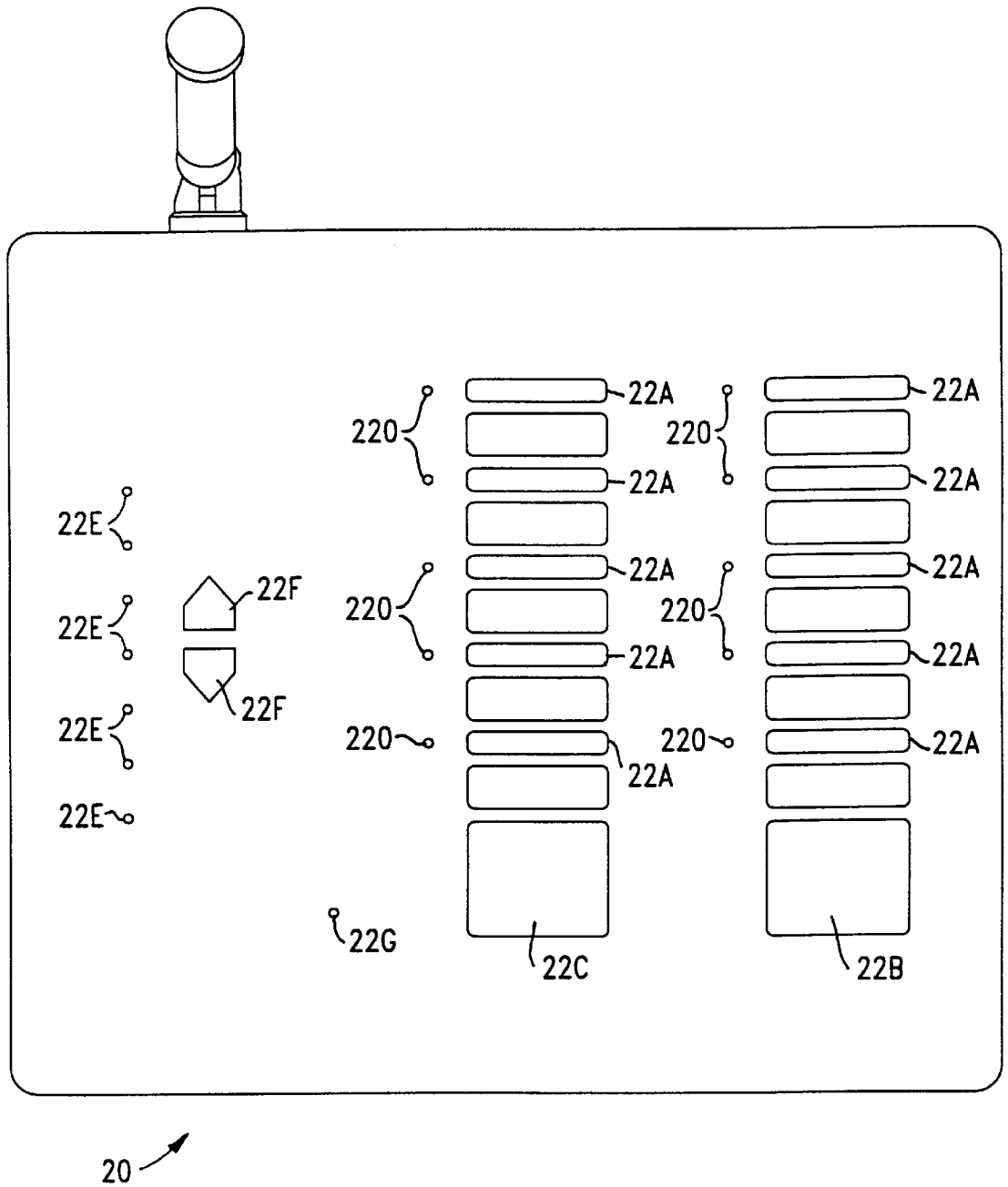
FIG. 10 is a detailed view of the control panel of the table top master of FIG. 4.

FIG. 10 shows the control panel of the tabletop master 20 shown in FIG. 4. It comprises buttons 22A with corresponding LEDs 22D. It further includes "all off" button 22B and "all on" button 22C. Dim set button 22G, "raise" and "lower" buttons 22F and level LEDs 22E are used when the tabletop master is used in "dim set" mode described herein in connection with FIG. 16.

Figure 11:
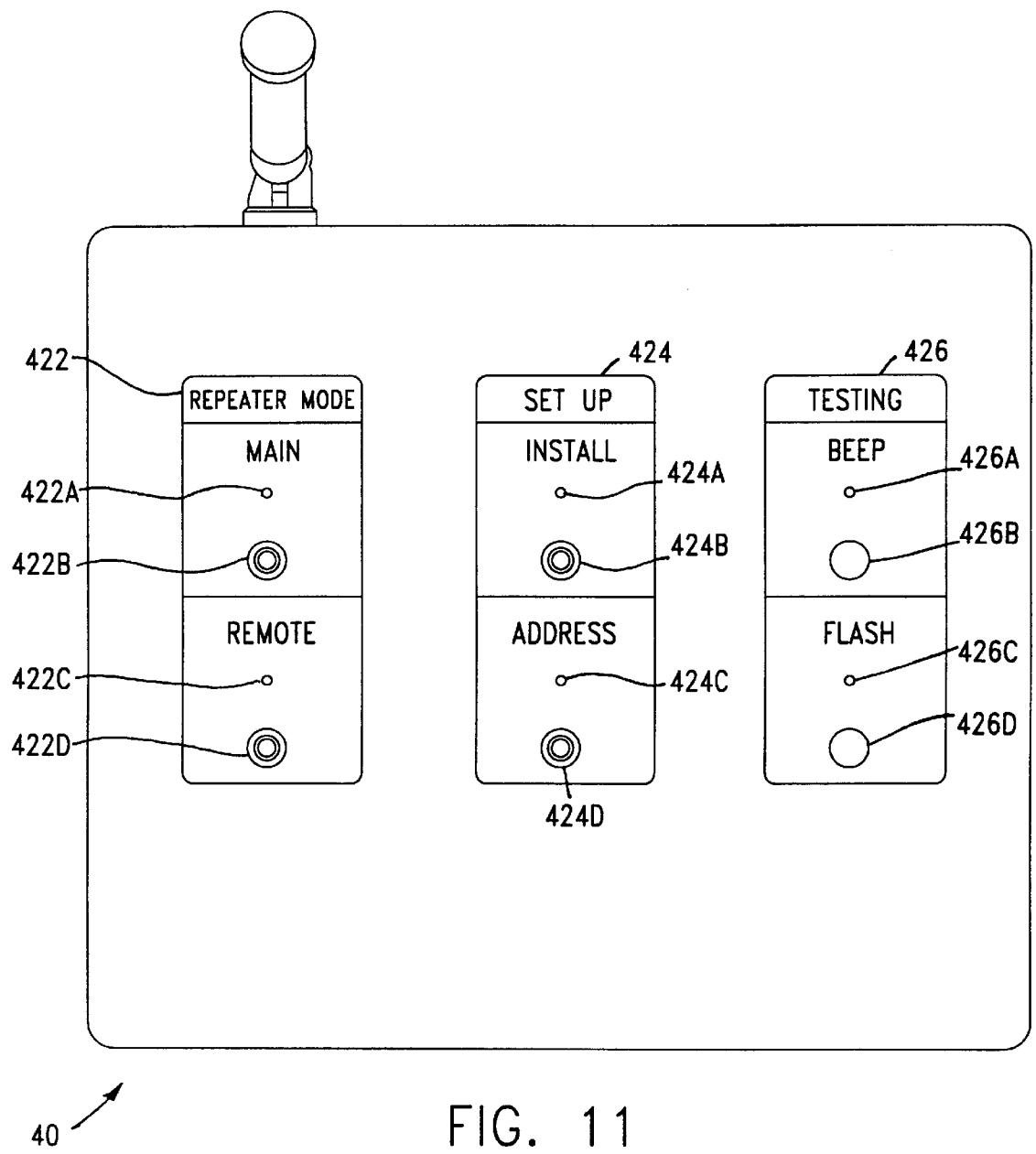
FIG. 11 is a detailed view of the control panel of the repeater station of FIG. 5.

FIG. 11 shows the control panel of the repeater station 40 shown in FIG. 5. It comprises repeater controls 422, set up controls 424 and testing controls 426. The repeater controls include main switch actuator 422B and associated LED 422A, and remote switch actuator 422D and associated LED 422C. The set up controls 424 include install switch actuator 424B and associated LED 424A, and address switch actuator 424D and associated LED 424C. The testing controls 426 include beep switch actuator 426D and associated LED 426A, the flash switch actuator 426D and associated LED 426C. The function and use of these controls is described in more detail below.

Figure 12:
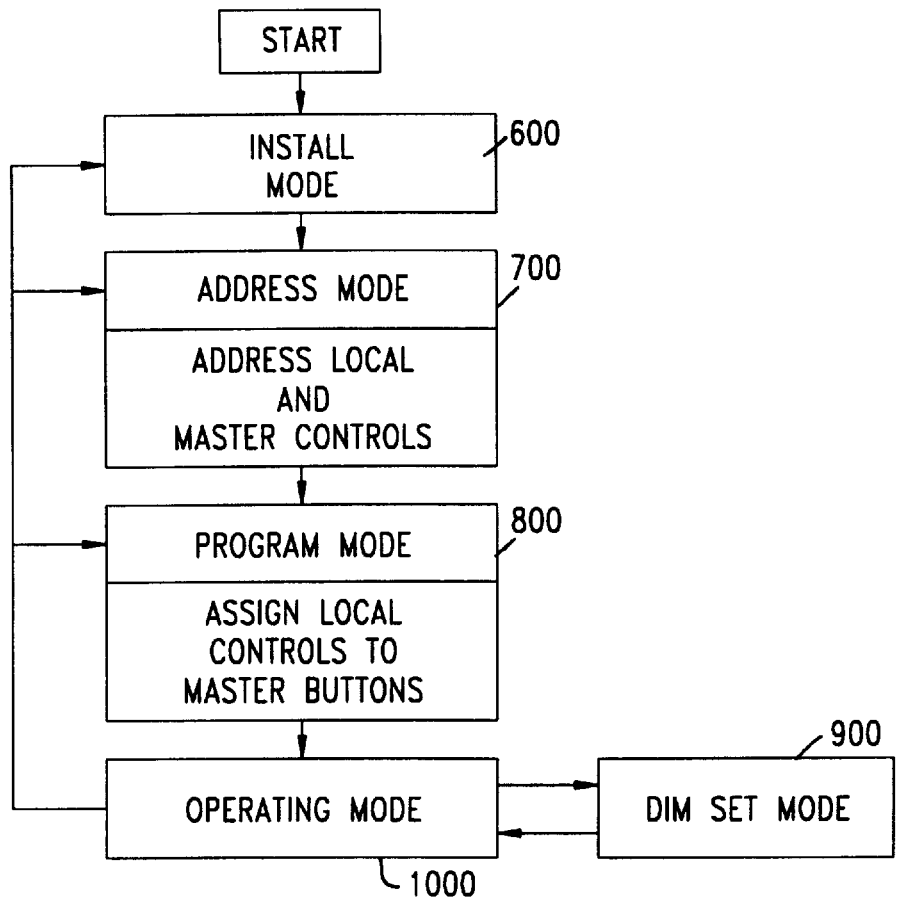
FIG. 12 shows an overall flow diagram for the various modes of operation of the present invention.

Turning now to FIG. 12, the system according to the preferred embodiment of the invention is configured and programmed on site. The system employs a program of operation which is easily learned. The purpose of the configuration is to locate and identify all components that will be used in a particular system. In applications such as high rise condominiums and apartment buildings, because two separate systems may be used in close proximity, it is important that the two systems not interfere with each other. Accordingly, an installation routine is employed so that a proper house code can be selected by the system so that it will not interfere with nearby systems. This is particularly important in applications such as high rise condominiums and apartment buildings since each system must have its own separate code to avoid the situation where systems in close proximity operate as a single system instead of as two separate systems. According to the preferred embodiment of the invention, the system randomly selects one of 256 available house codes to keep such interference from occurring.

In order to accomplish this function, one repeater of each system is selected as a main repeater. This is shown in FIG. 11. Switches 422B and 422D are provided on each repeater, and one of the repeaters is set to "main" with all other repeaters utilized in the system being set to "remote". According to the preferred embodiment, at least one repeater must be used in the system according to the invention.

However, the system need not employ a repeater. The primary function of the repeater is to increase reliability in a system of the type using RF signals according to the present invention. A repeater would not be necessary if all devices can communicate with the master unit directly. Further, according to the present invention, certain program functions are provided in the repeater, e.g., the programs relating to assignments of house codes and master and control device addresses. These program functions can be provided in other places, e.g. in the master units, if a repeater or repeaters is not employed.

Furthermore, as will be explained below, the repeaters develop an on-off status bit map and an intensity level bit map to assist in providing reliability. If a repeater or repeaters is not employed, such functions are not necessary.

FIG. 12 shows the overall program flow for the system according to the preferred embodiment of the present invention, beginning with startup. The normal mode of operation is known as the operating mode and it is the mode in which the system operates after the user installs the system, addresses all components of the system and programs the operation of the buttons on the master station.

As shown, upon beginning installation of the system, the operator first enters an "install" mode 600 in which a house code is selected. After the install mode, the user enters an "address" mode 700 in which all local and master controls are provided with addresses by the repeater. Both the install mode and the address mode are selected by the user at the repeater or repeaters. Once all local and master controls have been addressed, the operator then proceeds to the "program" mode 800, which is entered into from a master station. In this mode, all the local controls are assigned to master control station buttons. Once the local controls have been assigned to master buttons, the user then enters into the operating mode 1000.

In addition, the user may also set each of the dimmers employed in the system to a particular light level, as indicated by "dim set" mode 900. The user may return to the install mode if repeaters must be added or to the address mode if additional masters or dimmers are installed or to the program mode to change current master button assignments.

Figure 13A:
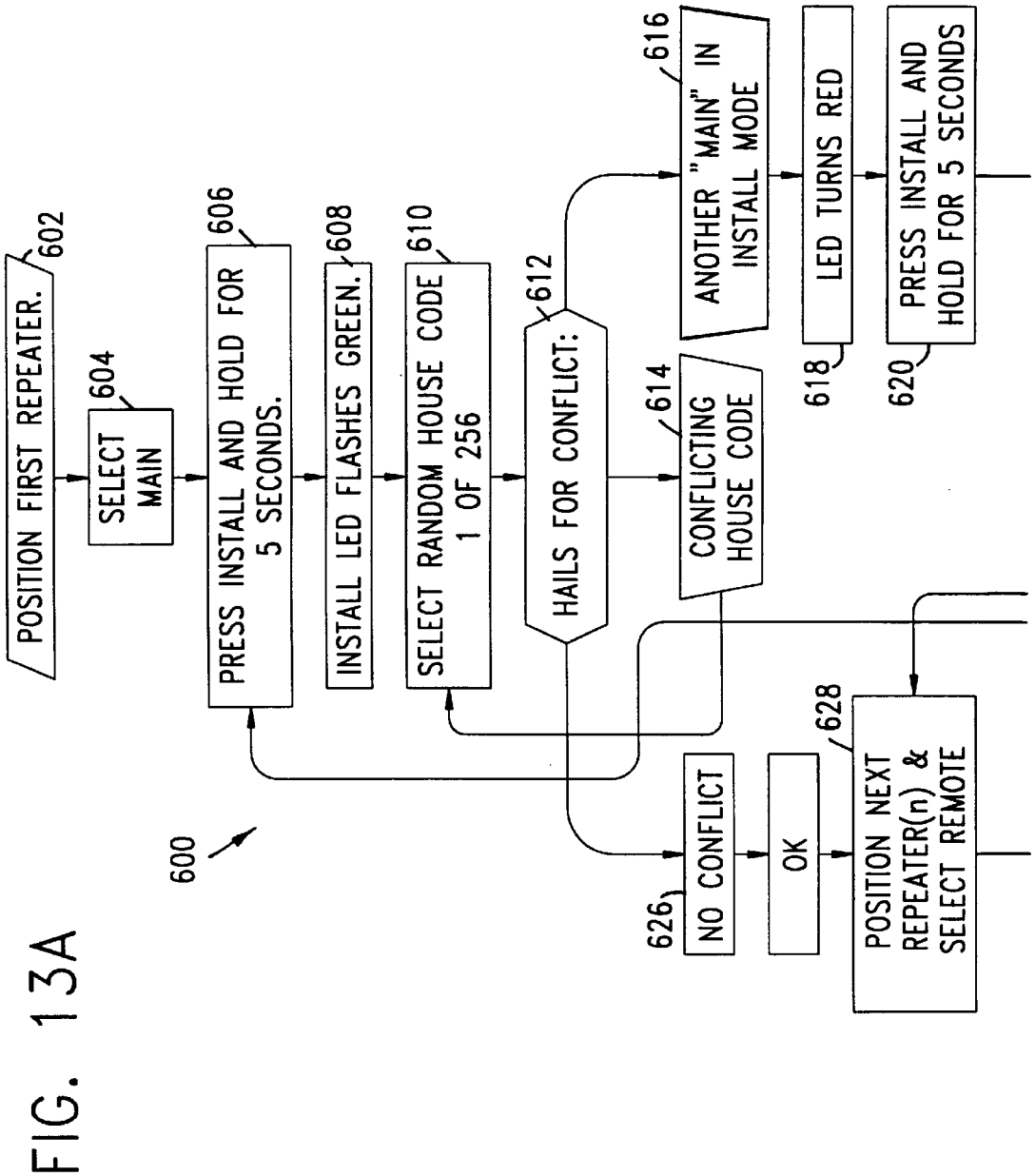
Figure 13C:
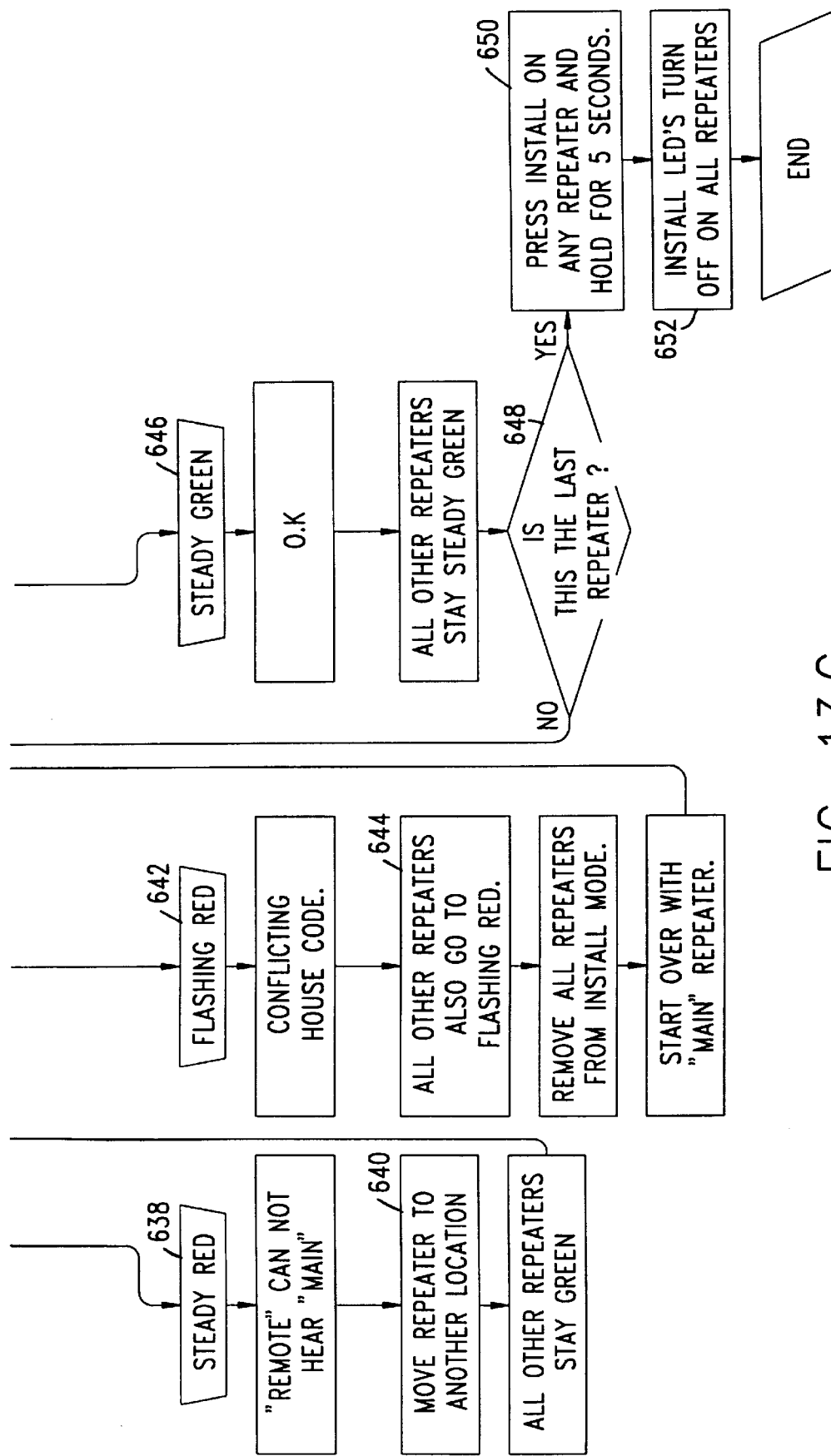

The user first enters the repeater install mode shown in FIG. 13A. As shown in FIG. 11, the user operates the switch 422B on the selected repeater to "main". LED 422A will light up. The repeater is preferably located centrally to all the local and master controls. Preferably, the repeater is located within 30 feet of all local and master controls and is discreetly placed.

After the first repeater is placed, and set to "main", as indicated at steps 602 and 604 in FIG. 13A, the user presses the install button 424B on the setup panel of the repeater, as shown in FIG. 11 and indicated at step 606. When the user selects a particular repeater as the main repeater by actuating "main" switch 422B, the repeater assumes the number 1 or "R1 " position in the repeater sequence, to be described in detail below. The program is preferably set up so that the install button must be held for a set period of time, e.g., 5 seconds. Once held for that set period of time, an LED 424A will flash, as indicated in step 608 and shown in FIG. 11. The program will then randomly select a house code, amongst one of a large number of possible house codes, for example, 256, i.e., an 8 bit code. This is shown by step 610 in FIG. 13A.

The system program then automatically checks for a conflict, as shown at 612 by determining if any conflicting house codes have been received. If a conflicting house code is received, as indicated at 614, the program re-enters step 610 and selects another house code at random. In addition, at step 612, the repeater selected as the main repeater determines if there is another repeater set as main in the install mode. This is shown at step 616. If another repeater is set to "main" and is in the install mode, the LED 424A turns red, as indicated in step 618. The user then presses the install button 424B again as shown in step 620 and thereby exits the install mode as shown at 622. Because the system has determined that another system in close proximity is being installed at the same time, the user must wait until the other system is installed and then can try again, as indicated at 624.

Assuming that the repeater in the install mode has determined that there is no conflict with another system, as indicated at 626, the house code will have been selected and the user can then, assuming the system has more than one repeater, install the remaining repeaters of the system. Accordingly, in step 628, the user positions the next repeater in the appropriate location so that it is within 30 feet of all local and master controls not served by another repeater. Unlike the first repeater, this repeater is set so that it is a remote repeater. Accordingly, switch 422D is operated to "remote". The install button 424B is depressed again, as shown in step 630, in the same way as shown for 606, and the install LED 424A will flash green as indicated at step 632. The remote repeater then requests a house code and a repeater address, via RF communications, from the main repeater, as indicated at step 634. The first remote repeater to be installed obtains position "R2" in the repeater sequence. Subsequently, installed repeaters are identified in the repeater sequence seriatim beginning with "R3". The remote repeater then has to determine if there is a conflict, as indicated at step 636. Depending on the result of the conflict determination, the program flow is then in one of three directions, as indicated by A, B and C in FIG. 13A.

If the remote repeater cannot communicate with the main repeater, an indication will be given, e.g., the LED 424A will go to a steady red, as indicated at 638 of FIG. 13B. The user must then reposition the repeater, as indicated at 640 and then return to step 630 and press the install button at which point the already described routine is repeated.

If a conflicting house code is determined by the remote repeater i.e., the remote repeater is in a position whereby it has determined that the house code selected by the main repeater conflicts with the house code of another system in close proximity, then the install LED 424A will flash red, as indicated at 642. If the remote repeater determines that there is a conflicting house code, it will communicate with the other repeaters of this conflict, and the install LED of is all repeaters will begin to flash red as indicated at 644. The user then removes all repeaters from the install mode and goes back to the main repeater and begins with step 606 by setting the main repeater again to the install mode so that a new random house code can be selected.

In the event that no conflict is detected by the remote repeater at 636, an indication will be so given, e.g., the LED 424A will light a steady green, as indicated at step 646. The user then determines whether this is the last repeater, as indicated at step 648. If it is not, the user returns to step 628 and positions the next repeater and installs the next repeater in the same way. Assuming it is the last repeater, the install button is depressed on any of the repeaters and held for 5 seconds as indicated at step 650. The remote repeater whose install button has been depressed will then communicate with all other repeaters and all repeaters will exit the install mode, as indicated at step 652. The repeaters of the system have now all been installed, and the user is now ready to enter the address mode 700.

Figure 14A:
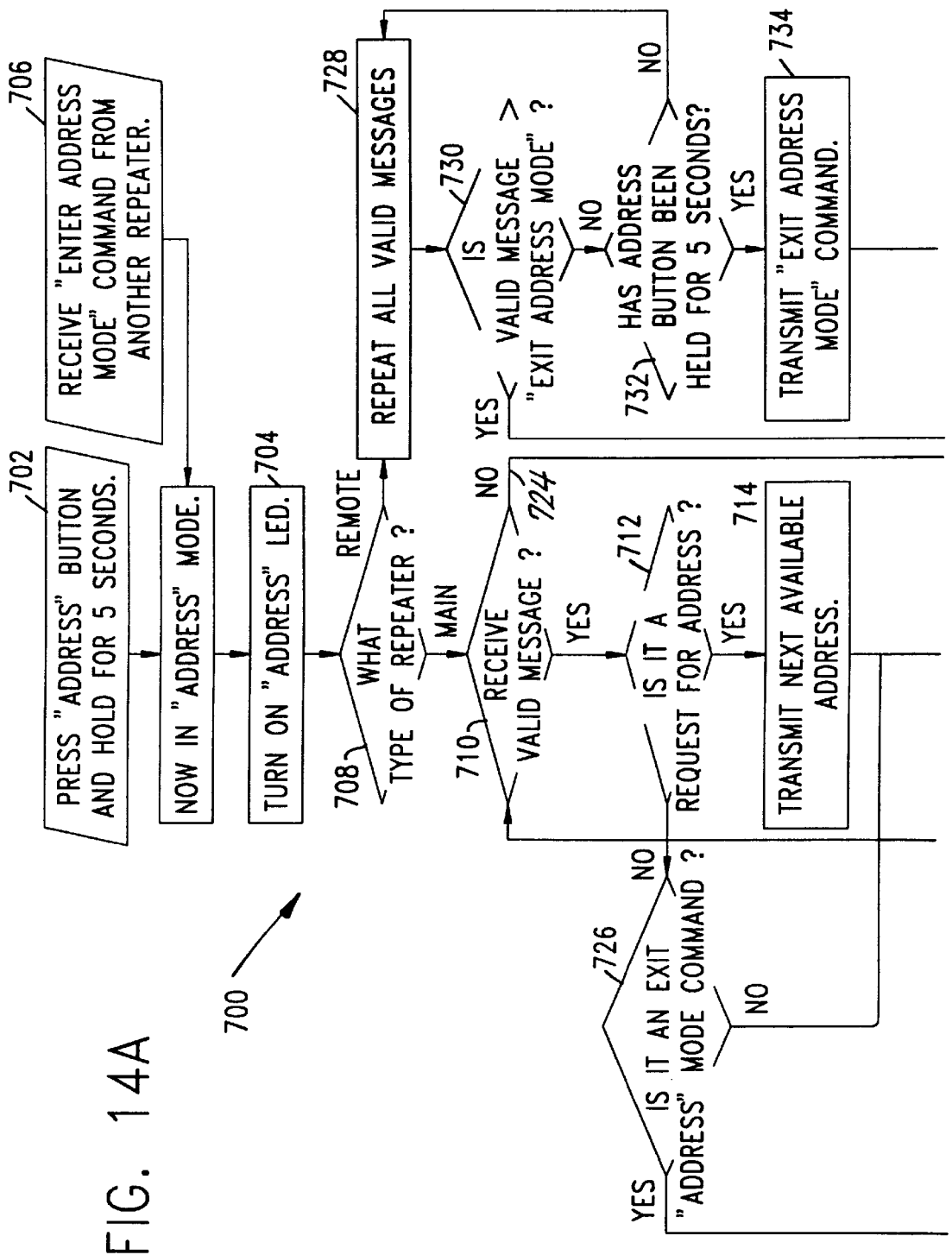
FIG. 14 shows the address mode utilized when setting up the system according to the present invention to address each of the individual components.
Figure 14B:
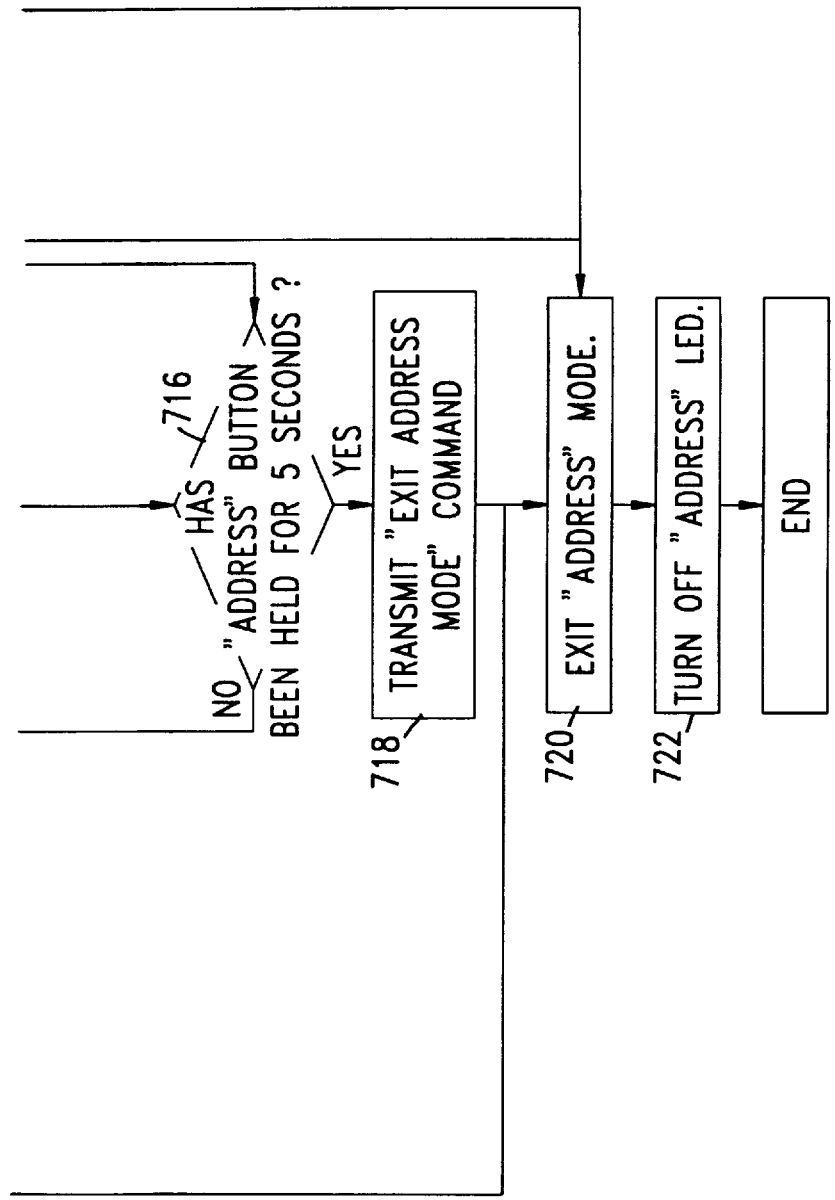

The address mode 700 is shown in FIG. 14. In the address mode, the repeater provides addresses to each of the local and master controls.

The address mode 700 is shown in detail in FIG. 14. To enter the address mode the user can operate the address button on any repeater. This puts all repeaters in address mode. A request for address is always passed to the main repeater which issues the address which is then passed to the local or master control as described below. To enter the address mode, the user operates the address button 424D on any one of the repeaters and holds it for five seconds, as indicated in step 702 in FIG. 14. The address LED 424C will turn on, as indicated in step 704. As shown in step 706, if any other repeater receives a communication from another repeater that the other repeater has entered the address mode, then all repeaters will enter the address mode. This is true even of repeaters that receive the communication from another repeater that the other repeater has entered the address mode only after receiving such information from still yet another repeater. That is, the repeaters repeat the information from one repeater to another so that eventually, all repeaters in the system enter the address mode as long as one of them has entered the address mode.

At step 708, the repeater determines whether it is a main or remote repeater, as determined by the setting of the repeater mode controls 422. If it is a main repeater, the repeater listens to determine if it has received a valid message from one of the master or local controls, as indicated at step 710. This is performed in accordance with a communication protocol employing time slots, as will be discussed in more detail below. Assuming that it has received a valid message, the repeater determines if the message is a request for address, as indicated in step 712. If it is, the repeater transmits the next available address to that device, as indicated at step 714. The program next determines if the address button had been held for five seconds, as indicated at step 716. If so, the repeater then transmits an exit address mode command at step 718 for receipt by all local and master controls and exits the address mode as indicated at step 720. If not a return is made to step 710. The address LED 424C is turned off at step 722.

If at step 710, a valid message has not been received, branching is then to step 716 as indicated by the branch line 724. If the address button has not been held for five seconds, a return is made to step 710.

If at step 712 a request for an address has not been received, a determination is made at step 726 whether an exit address mode command has been received from another repeater. If not, step 716 is entered and a determination is made if the address button on that repeater has been held for five seconds in which case the address mode is exited. If at step 726 an exit address mode command has been received, the address mode is exited, as indicated at step 720.

If at step 708 the repeater determines that "remote " has been selected by switch 422D, the repeater repeats all valid messages it has received at step 728. At step 730, the repeater determines if it has received an exit address mode command. If so, return is to step 720 and the address mode is exited. If not, the determination is then made at step 732 if the address button has been held for five seconds. If so, an exit address mode command is sent at step 734 and a return to exit address mode at step 720 is made. If not a return is made to step 728.

At step 712, the repeater determines if a request for address has been received from the master or local controls. In order for a repeater to receive a request for address from one of the local or master controls, the user goes to one of the local controls or one of the master controls in the house. The user changes the state of the local control by turning it on or off. A signal is provided to the user to indicate that an address has been received. For example, the load, typically an electric lamp, is programmed to flash, for example, twice, indicating that the local control has received an address from the repeater. The local control is also provided with the house code by the main repeater at this time, as indicated at step 714. The user then goes to each local control and repeats this procedure, i.e., turns the local control on or off. If the local control has received an address from the repeater, a signal is provided to the user. For example, a suitable way to accomplish this is to "flash" the load, i.e., the electric lamp is caused to flash on and off, preferably twice. The user thus goes around the entire house and obtains an address for each of the local controls in this manner.

With respect to the master controls, a preferred implementation for providing addresses to the master controls relies upon the "all on" or "all off" buttons of the master control. When the all on or all off buttons change state, according to the preferred embodiment of the invention, all the LED indicators on the master control will flash twice, indicating that it has received an address from the repeater. The master control is also provided with the house code by the main repeater at this time, as indicated at step 714. The user performs this same operation on each of the master controls until all of the master controls have been properly addressed. The main repeater preferably assigns addresses to each local control seriatim in accordance with the user's sequence of selection of the local controls for addressing, beginning with the address "D1". Similarly, for the master controls, addresses are assigned by the main repeater seriatim in accordance with the user's sequence of selection for addressing beginning with the address "M1". Once the user has addressed all local and master controls, the user takes the system out of the address mode, as indicated at step 716 or 732 by pressing the address button and holding it for five seconds.

As indicated in FIG. 14, any of the repeaters, whether a main or a remote repeater, can be used to enter the address mode. If it is a main repeater, the transmission of the next available address to a local or master control is originated at that repeater. If it is a remote repeater, the repeater merely repeats all valid messages, including the assigned addresses. However, according to the preferred embodiment, the assignment of addresses is performed only in the main repeater, as indicated in FIG. 14.

Figure 15A:
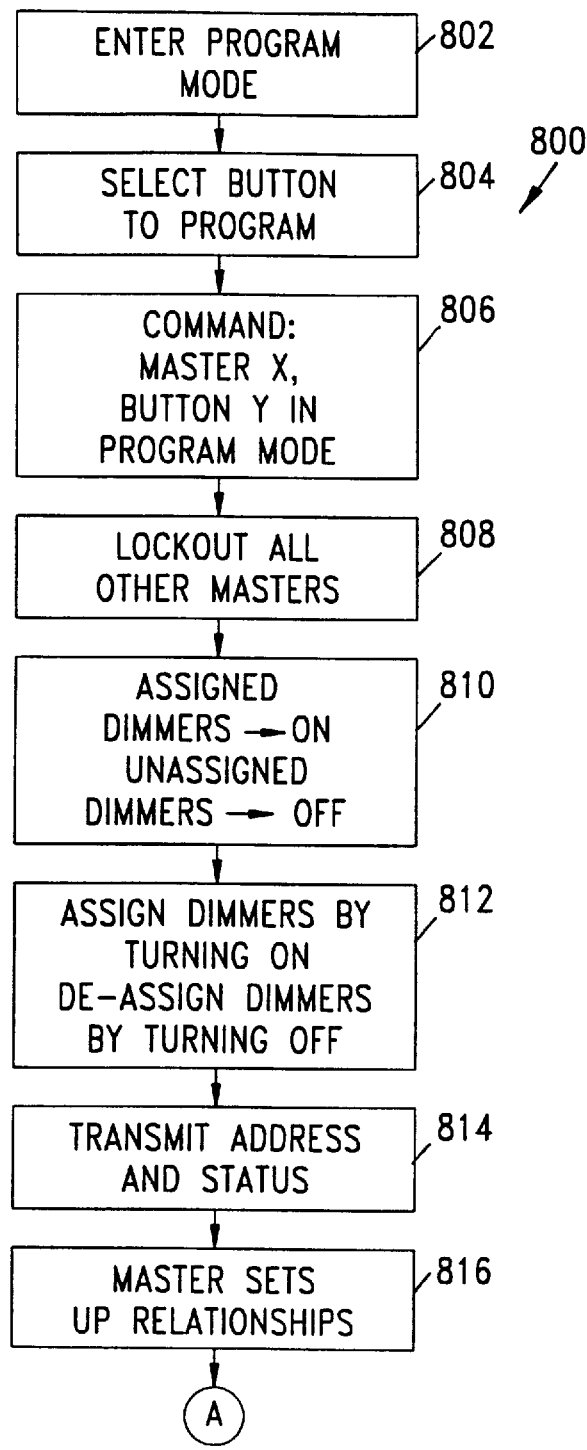
FIGS. 15A, 15B and 15C show the program mode utilized in programming the master control station for assigning specific lighting control devices to specified buttons on the master control.
Figure 15B:
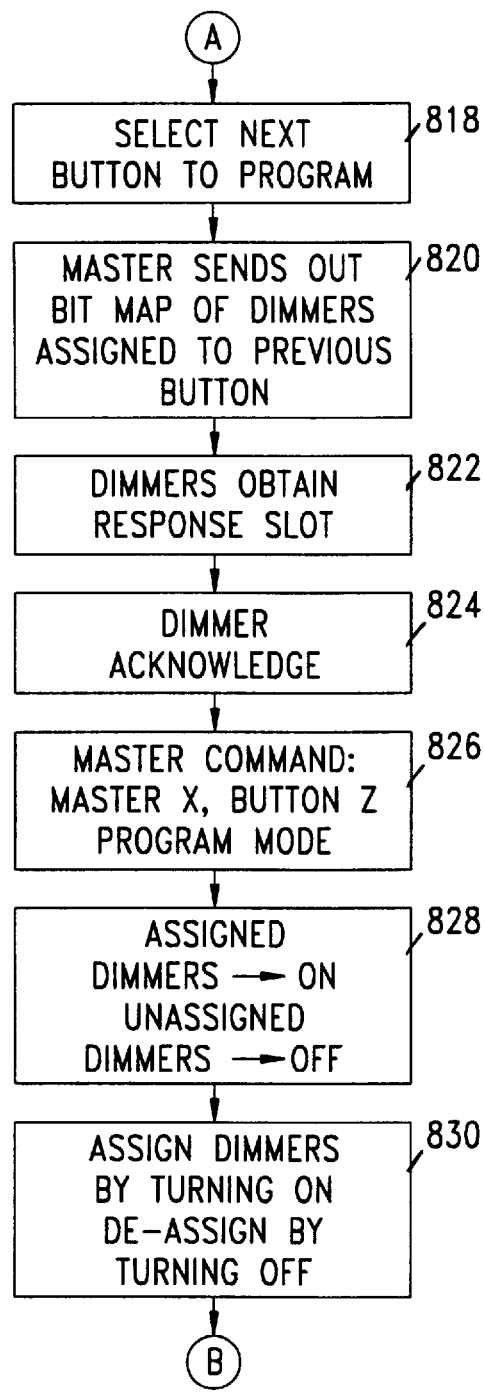
Figure 15C:
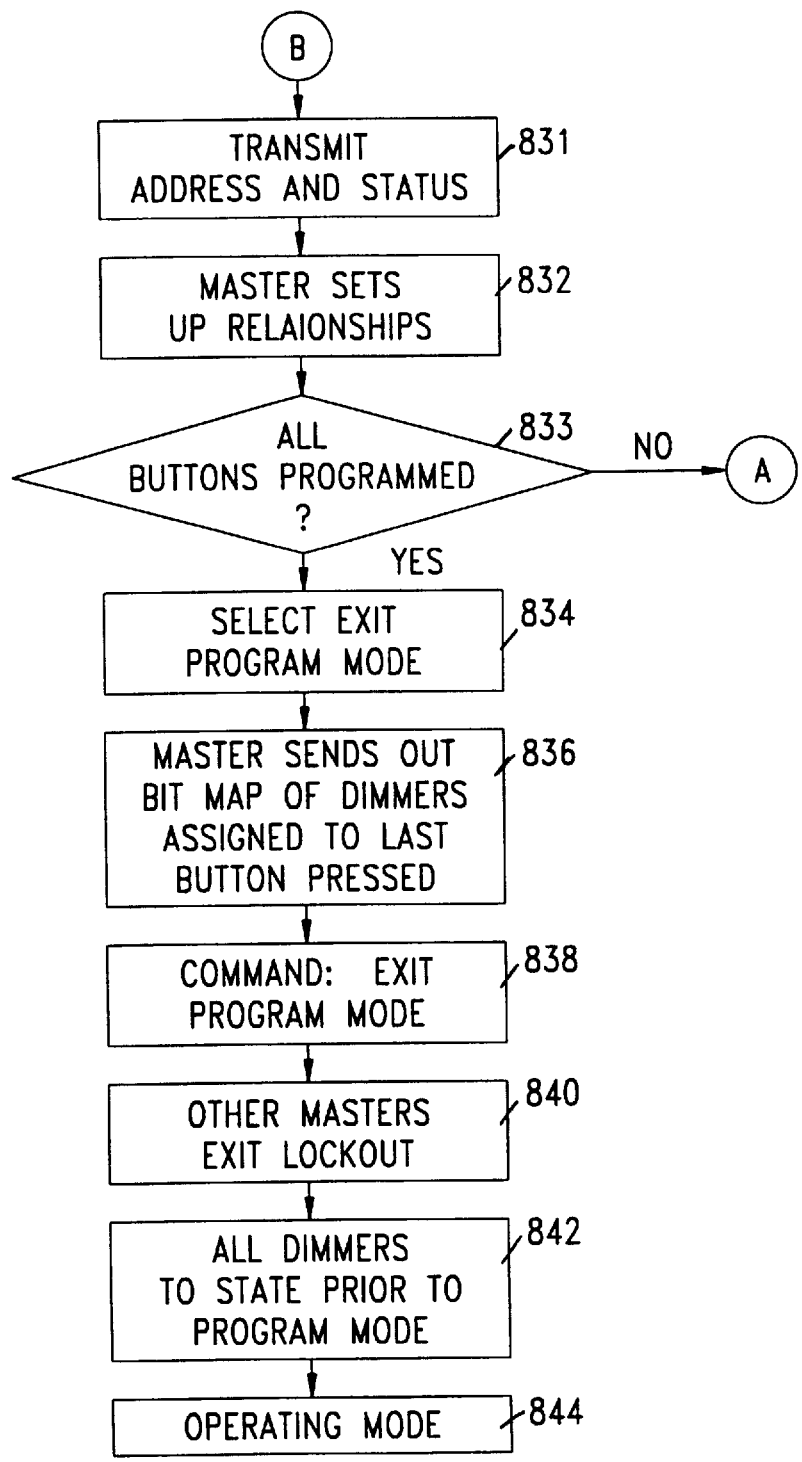

Once each of the master and local controls have been addressed, the user is then ready to enter the program mode, i.e., the mode in which the local controls are assigned to buttons on the master station. The program mode is shown in FIGS. 15A, 15B and 15C.

Because the local controls of the present invention are typically only two wire controls, i.e., such that they switch only the hot side of the AC line and are unconnected to neutral, in order to power the local controls, it is necessary that each local control on the system be equipped with a load and that the load be operational. Thus, in the case of a lighting system, each local control must be connected to an operational lamp. Otherwise, it will not be possible to address or program the local controls.

Before any local and master controls can be programmed, they must be assigned addresses by the address mode. In order to verify that all controls have an address, the user can go to one of the repeaters and press and hold the flash mode button 426D for five seconds. The flash mode button is in the testing panel as shown in FIG. 11. If a local control has an address, it will be flashing its load on and off. If a master control has an address, it will be flashing its LEDs on and off.

The repeater also employs a "beep" function. The beep function is provided for troubleshooting. When beep mode select button 426B is actuated, e.g., by actuating it for more than 5 seconds, LED 426A turns on to indicate the beep mode has been entered. In this mode, the repeater provides an audible beep whenever it receives a signal from a master or control device. This is used during testing to determine if a repeater can receive signals from the master and control devices. To exit the "beep" mode, the user again actuates switch 426B for the preset period of time, e.g., 5 seconds. Beep mode LED 426A is extinguished and the system enters the state it was in previously.

Assuming that each local and master control has an address, the user enters the program mode as indicated in step 802 by pressing and holding selected buttons on the master control simultaneously for a set period of time, e.g., five seconds. In one embodiment of the invention, the top button in the right most column and the all-off button of the master control are held simultaneously for five seconds. The LED to the left of the top button will begin to flash and all local controls assigned to this button will turn on. All local controls not assigned to this button will turn off.

Initially, no local controls are assigned to any of the buttons, so all local controls will turn off.

At step 804, the user pushes a master control button that the user wishes to program. The LED to the left of the button will begin to flash. The master control will send out a command that that particular master control, and the particular button selected is now in the program mode. This is illustrated in step 806 in FIG. 15A. In response to the command, all other masters will then enter a lock-out mode so that they cannot be programmed. All their LEDs will flash and their buttons will not perform any function. This is indicated in step 808. The user then walks throughout the house and turns on the local controls that the user wishes to be assigned to that button. If a local control is already on and the user wishes to delete that control from the button, that local control is turned off. This is indicated in step 812. Step 810 indicates that assigned dimmers will go on and unassigned dimmers will go off.

After each dimmer which is to be assigned to a particular button has been turned on and after each dimmer which is not to be assigned has been turned off, the dimmer transmits its address and status, as indicated at 814, to the master control. The master then sets up the relationship between the assigned local controls and the particular button depressed, as indicated at step 816. The user then selects the next button to program, as indicated at step 818 in FIG. 15B. The master sends out an assignment bit map of all the dimmers assigned to the previous button at step 820. Based upon this assignment bit map, which specifies all those dimmers assigned to the previous button, the dimmers calculate a response slot so that they can send back status information to the master. The lowest addressed dimmer found in the assignment bit map is assigned to slot 1, the second lowest addressed dimmer to slot 2, etc. as is described in more detail below. This is indicated in step 822. At step 824, the dimmers acknowledge receipt of the assignment bit map. The master station now transmits a new command indicating that a new button has been depressed, as indicated at step 826. As before, all those dimmers assigned to this button will go on and those unassigned will go off as indicated in step 828. Initially, no dimmers will be assigned, so all will be off. The user then goes about the house, and assigns dimmers by turning them on and de-assigns dimmers by turning them off. This is indicated at step 830. The dimmer transmits its address and status, as indicated at 831 in FIG. 15C to the master control. The master then sets up the relationship between the assigned local controls and the particular button depressed as indicated at step 832. At step 833, as indicated in FIG. 15C, a determination is made if all buttons have been programmed. If they have not, return is made to point A in FIG. 15B and the next button is programmed, after a new assignment bit map is sent out for the last button to be programmed so that each of the dimmers obtain a response slot to transmit status to the master.

The user then goes about programming each of the remaining buttons on the master control. Once all buttons have been programmed, the user exits the program mode by holding the top and "all off" buttons in the right-most column for five seconds, as indicated at 834. The master sends out an assignment bit map of the last button pressed, as indicated at 836 and each of the assigned dimmers obtain a response slot. Once this is performed, the master transmits a command to exit the program mode as indicated at 838. All of the masters then exit lock-out mode as indicated at 840 and the dimmers return to the state prior to the program mode as shown at 842. Assuming that the user does not desire to enter any other state, the user then enters the operating mode, as indicated in step 844.

Figure 16A:
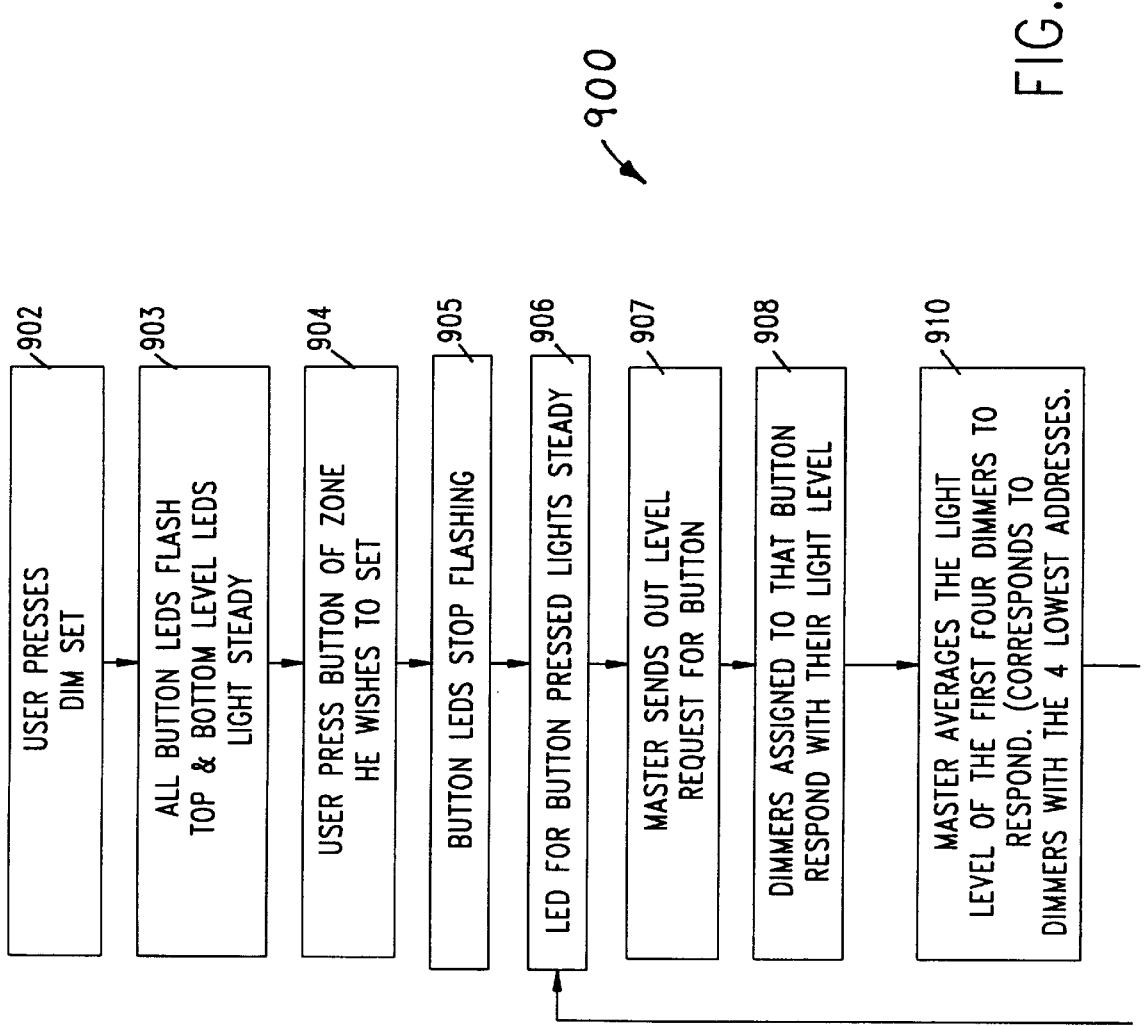
FIG. 16 shows the dim set mode which allows the user to adjust the light level settings of lighting control devices from a master control station.
Figure 16B:
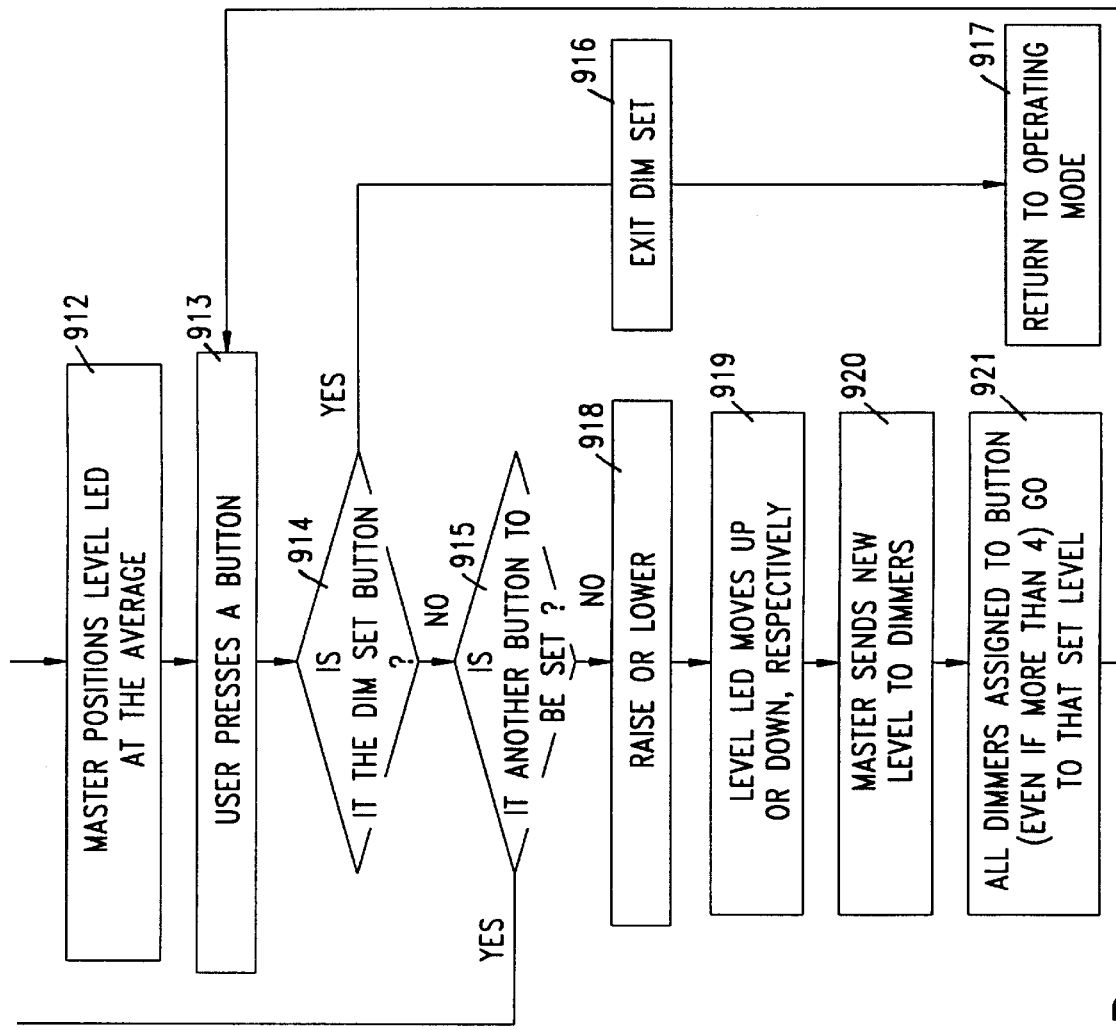

FIG. 16 illustrates the "dim set" mode 900 of FIG. 12. The dim set mode is entered by operating the dim set button 22G of FIG. 10 of the master control as indicated at 902. All button LEDs 22D flash and top and bottom intensity level LEDs 22E light steadily as indicated in step 903. The user then operates a button to be set as indicated at 904. Button LEDs 22D stop flashing as indicated at 905. The LED for the button to be set lights steadily as indicated in step 906. The master sends out a request for dimmer levels for the button to be set to all local controls and repeaters as indicated at step 907. Dimmers assigned respond with their light levels as indicated at step 908. The repeaters build and transmit an intensity level bit map which includes the intensity levels, in the preferred embodiment, of the four lowest addressed dimmers assigned to that button. Once the complete intensity level bit map is developed and received by the master, the master averages the light intensity levels in the bit map as indicated in step 910. The master then extinguishes the top and bottom LEDs of group 22E and illuminates an LED to correspond with the average light level as indicated in step 912.

The user presses a button as indicated at step 913. The master determines if it is the "dim set" button as indicated in step 914. If not, the master system determines if another button is to be set as indicated at step 915. If not, it must be a "raise" or "lower" button 22F as indicated at step 918. The LED of the group 22E of LEDs which is illuminated to indicate the intensity level of the assigned lamp or lamps changes depending on whether the "raise" or the "lower" button is operated as indicated at step 919. The master then transmit new light level information to the dimmer or dimmers assigned to that button as indicated at step 920. All dimmers assigned set the connected lamp or lamps to the new light level as indicated at step 921. The master then returns to step 913 and waits for another button to be actuated. If another button is actuated at step 915, the master returns to step 906. If the dim set button is actuated again at step 914, the master exits the dim set mode as indicated at step 916 and then returns to the operating mode as indicated at step 917.

Figure 17:
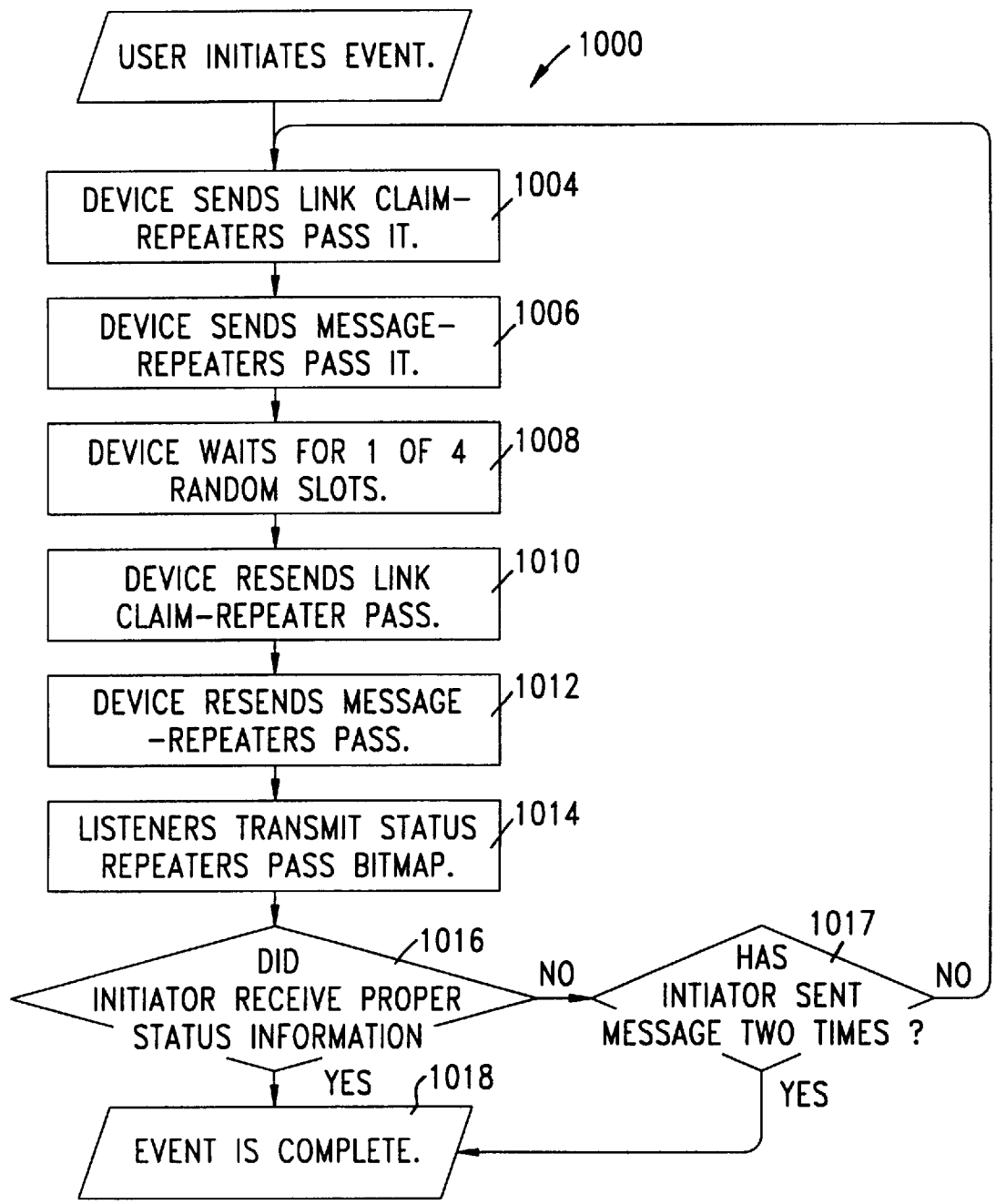
FIG. 17 shows the operating mode of the system according to the present invention.

Once the dimmer settings have been made and the dim set mode has been exited, the system then enters the operating mode as illustrated in FIG. 17.

As described previously, each local control device, e.g. each dimmer or switch, may include a manual actuating device to allow the user to change the status of the connected lamp or lamps. When the user initiates such action to change the connected load status, the local control transmits a status information signal to the master or masters (directly and/or indirectly via a repeater or repeaters) to indicate the true status of the respective load. By "true" status, the invention also contemplates that when a master transmits a control signal to a local control device, the local control device transmits a signal indicating the true status of the connected load.

In the operating mode 1000, the user first initiates an event, for example, pressing a master control button to turn on certain lamps. The master control then communicates a link claim, as indicated at 1004. Each of the repeaters pass the link claim to the other repeaters and the controls. The master then sends a message, as indicated at 1006, and the repeaters pass this information. The device, for example, a master, then preferably waits for one of 4 random time slots, as indicated at 1008. The device thereafter resends the link claim and the repeaters pass it, as indicated at 1010. The device resends the message and the repeaters pass it as indicated at 1012. At step 1014, each of the listening devices assigned to the actuated button transmits its status. The repeater or repeaters repeat signals from the master units or light control devices in time slots. The repeaters build an on-off status bit map as they receive communications and pass the on-off status bit map around by retransmission. In the preferred embodiment, the on-off status bit map indicates the status of all control devices assigned to the actuated button, i.e., on or off. Those control devices not assigned to the actuated button do not respond and the on-off status bit map includes information for those control devices indicating no response. Each repeater adds information to the on-off status bit map known to it so that after a complete repeater sequence determined by the number of repeaters, as explained in greater detail below, the complete on-off status bit map of all system information is developed and transmitted. In this way, it is ensured that the master will have received a complete on-off status bit map of all status information at least once.

At step 1016, the initiating master device determines if it received the proper status information from the local control device. If it did, the event is complete as indicated at 1018. If not, a determination is made at step 1017 if the initiating master device has sent the message two times. If not, return is made to step 1004. If yes, the event is considered complete.

Figure 18:
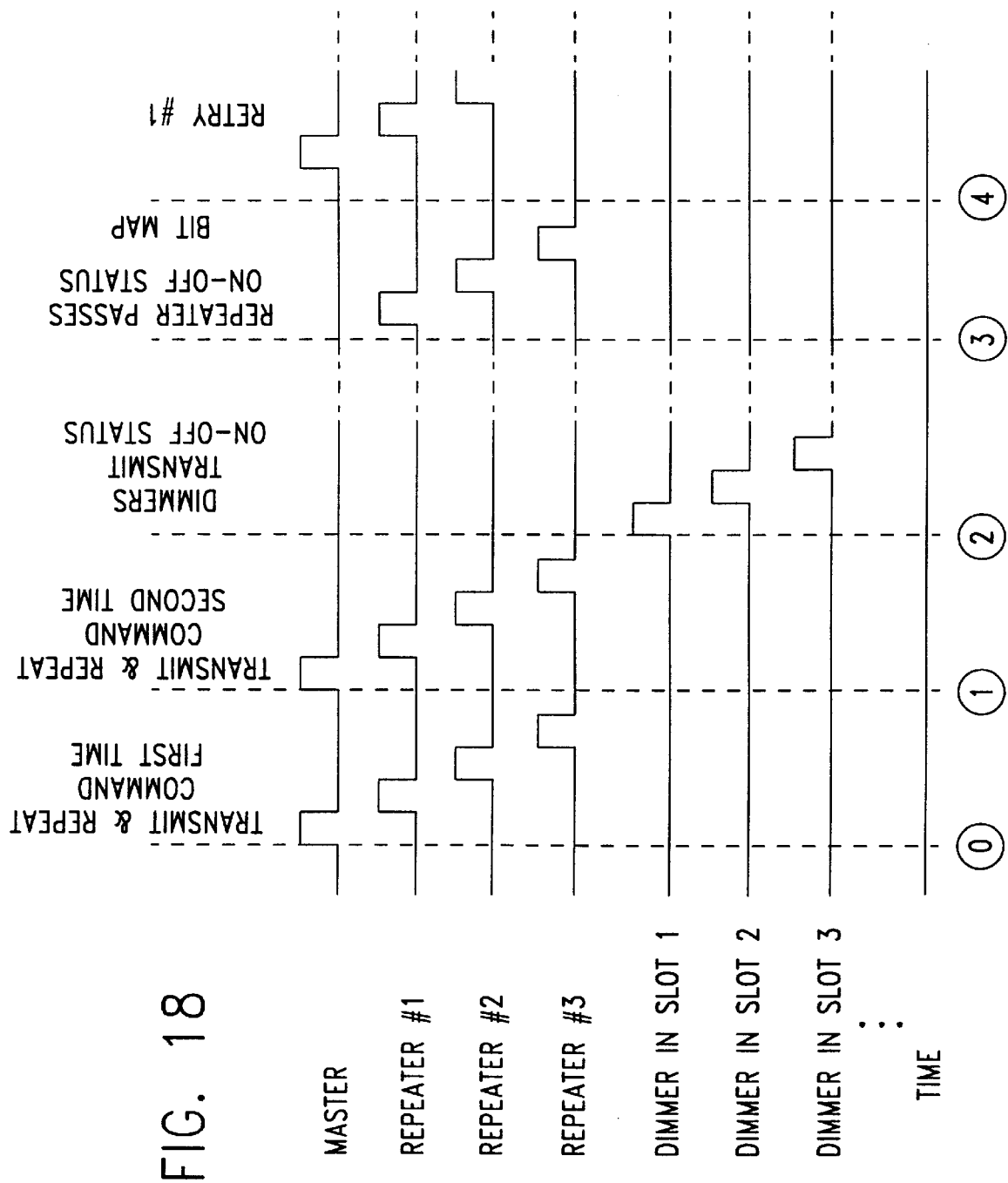
FIG. 18 shows the communications protocol among the master stations, repeaters and dimmers.

Turning now to FIG. 18, details of the communication protocol described between masters, repeaters and dimmers are shown. The description is given for the communication of the on-off status bit map but the same protocol is used for the assignment bit map and the intensity level bit map, previously described. The system employs a protocol of sending messages, as described, two times, in order to provide reliability. In a usual situation, a master will transmit a command twice, as indicated in FIG. 18. Each repeater will then transmit the command in its own time slot, as indicated in FIG. 18. FIG. 18 shows that three repeaters are employed in the system illustrated. Each repeater repeats the command in its time slot for each master command. The assigned dimmers then transmit their status in their assigned time slots, as discussed above, and to be discussed in greater detail below. Once each dimmer has transmitted in its time slot, the repeaters develop the on-off status bit map. Each repeater inserts into the on-off status bit map that information which it has received to form a more complete on-off status bit map. After a certain number of transmissions of the on-off status bit map, a complete on-off status bit map will have been developed and each master unit will have received the complete on-off status bit map at least once. Once each of the repeaters have transmitted the completed on-off status bit map, and it has been received by the masters, if the masters receive an on-off status bit map other than the one expected, the masters will repeat and transmit the command again, as shown by retry number 1 in FIG. 18. Optionally, additional retries can be used if the first retry also fails.

Figure 19:
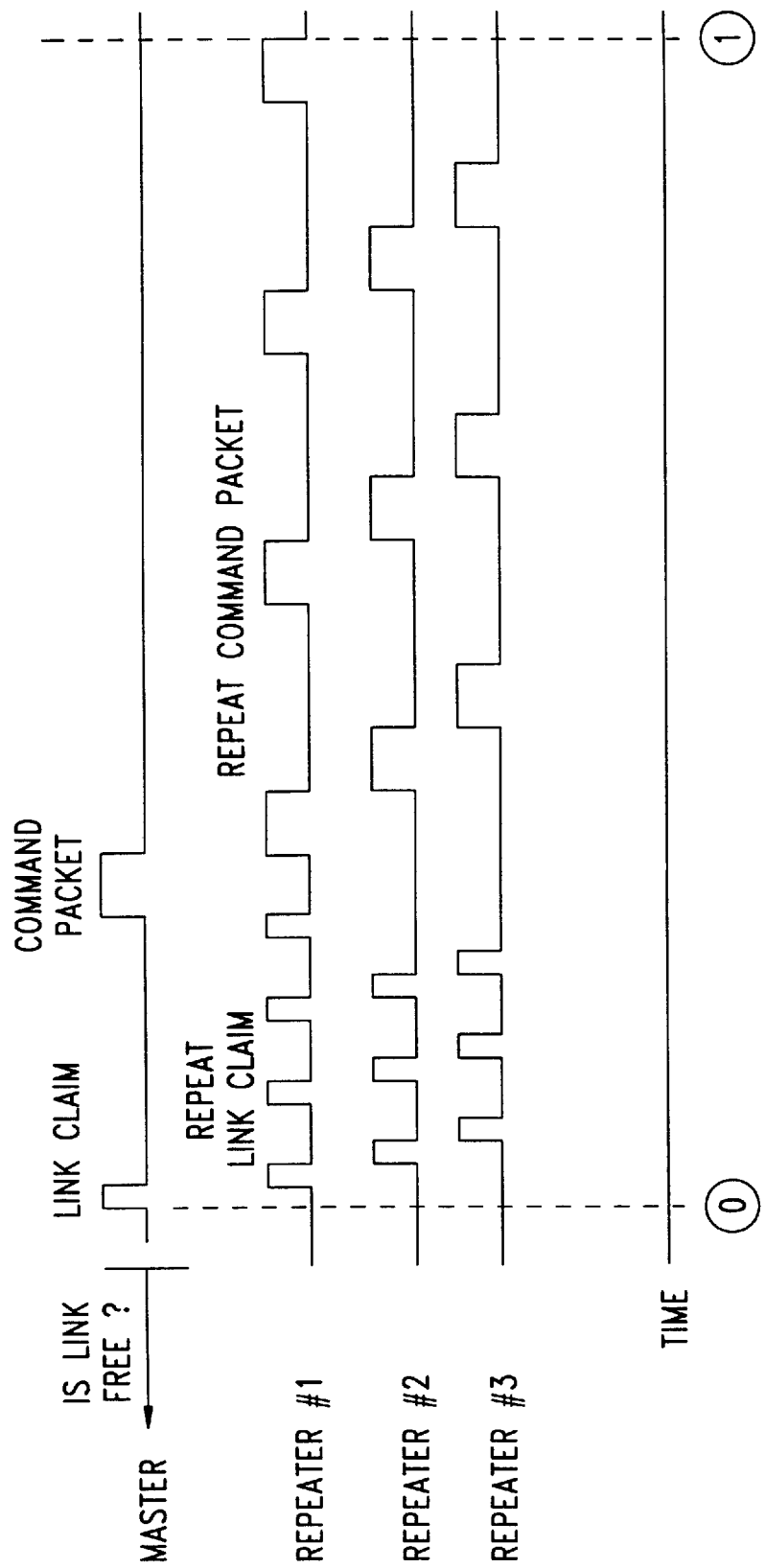
FIG. 19 shows details of the communications protocol according to FIG. 18.

In the initial transmission of the command packet, the master transmits a link claim followed by a command packet. This is shown in FIG. 19. Each repeater then repeats the link claim and thereafter the command packet, as shown in FIG. 19. Each repeater repeats the link claim and the command packet in its own time slot, as indicated.

In the second transmission of the command packet as indicated in FIG. 20, the master again transmits the link claim and the command packet and each of the repeaters retransmits the link claim and command packet as shown.

Figure 20:
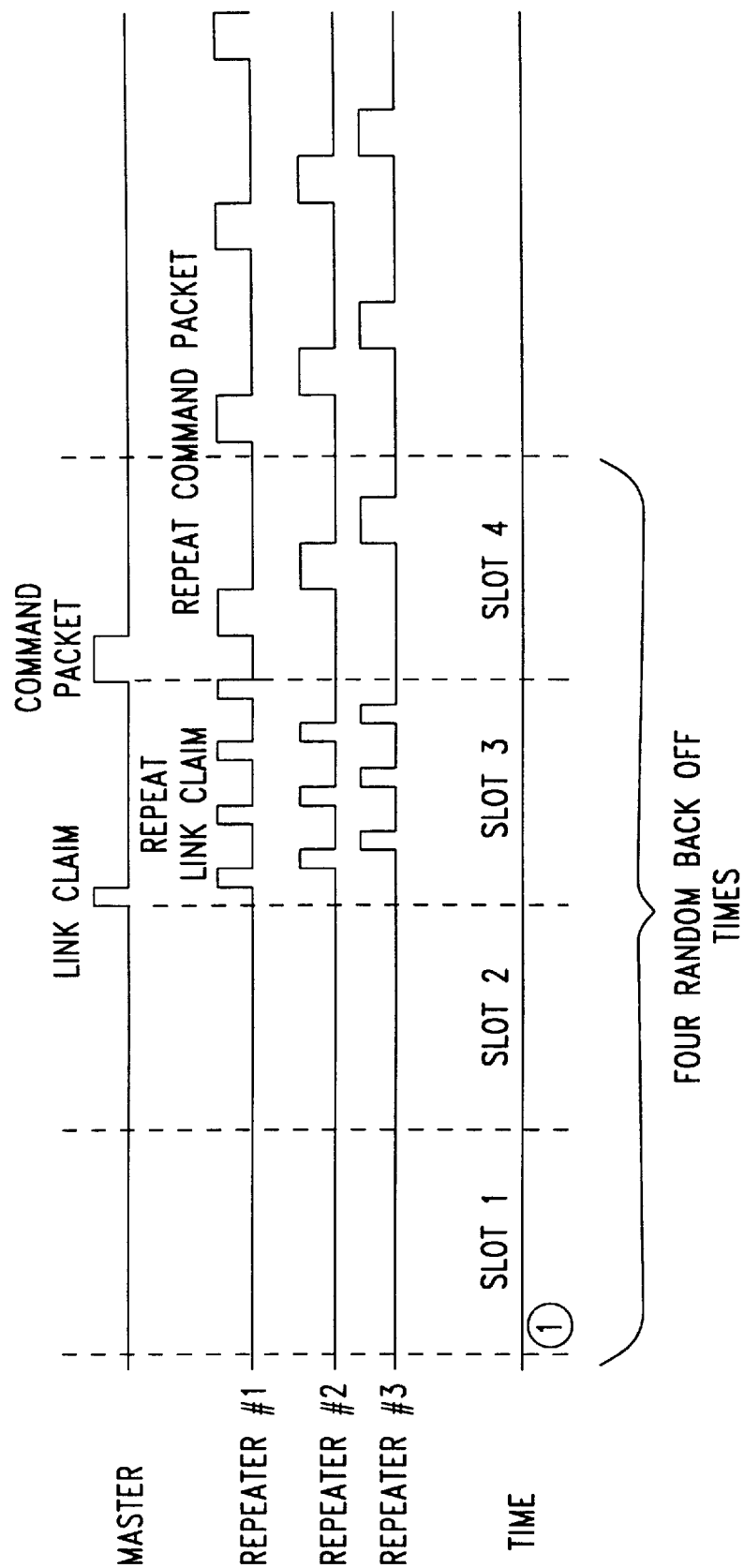
FIG. 20 shows further details of the communications protocol of FIG. 18.

In the second transmission by the master, as shown in FIG. 20, the master sets up a plurality, in the embodiment shown, four, back-off slots for transmission. The reason for the second transmission is to allow a second attempt at communication when two devices try to communicate at the same time and also to increase reliability. If two devices attempt to communicate at the same time, on the retry, the four random back off times reduce the probability of any two devices trying to communicate again at the same time. The probability of this occurrence the second time is one quarter the probability of this occurrence the first time. The master selects one of these four slots, e.g., randomly. In the illustrated example shown in FIG. 20, the master has randomly selected slot 3. The command packet is repeated immediately after slot 3 beginning in back-off time slot 4.

In order to allow communication between the lighting control devices and the master station without interference, each lighting control device automatically determines a time slot for the transmission of status signals. This is done by having the master generate the assignment bit map defining all lighting control devices assigned to each master unit actuator.

After each master button has been programmed during the program mode, the master sends out the assignment bit map of all local controls assigned to a particular button. This was described above in connection with the program mode. The dimmers then determine their slot by counting the number of dimmers assigned to the button with a lower address than its own address and adding one for itself. For example, if there are eight dimmers, the assignment bit map generated by the master might look as follows:

| dimmer No. | 1 | 2 | 3 | 4 | 5 | 6 | 7 | 8 |
|---|---|---|---|---|---|---|---|---|
| assignment bit map | 0 | 1 | 1 | 0 | 0 | 0 | 1 | 0 |
| Slot No. |  | 1 | 2 |  |  |  | 3 |  |

Accordingly, in the above-illustrated example, dimmers 2, 3 and 7 have been assigned to the particular master button as indicated by a "1" in the assignment bit map. Dimmers 2, 3 and 7 are therefore assigned slot numbers 1, 2 and 3, in that order, for transmitting status information to the master.

Preferably, the on-off bit map status information transmission time slot is made extra long to allow for dimmers connected to different phases of a three-phase power system. This may be necessary if the dimmers determine the beginning of the time slots based on line voltage zero crossings. Dimmers coupled to different phases of a three phase system will therefore have overlapping time slots (if the time slots exceed ⅓ of a half cycle) which can cause interference between the communications for adjacent time slots. To solve this problem, the time slots are made extra long, illustratively twice as long, which allows a period of dead time at the end portion of a time slot which eliminates overlap with information in the following time slot for a dimmer connected to a different phase.

As described above, the repeaters create an on-off status bit map and transmit it. The repeater generated on-off status bit map indicates the on-off status of all control devices.

Each repeater transmits information known to it in the time slot assigned to that repeater. As the repeater sequence proceeds, each repeater accumulates information transmitted by the other repeaters and adds it to the on-off status bit map. By the end of transmission, all the repeaters will have transmitted a completed on-off status bit map and each master will have received the completed on-off status bit map at least once.

Each dimmer has two bits in the on-off status bit map. A 10 indicates that the dimmer is in the "on" state and a 01 indicates that the dimmer is in the "off" state. A 00 or 11 indicates no response. These "no response" sequences alternate. This method ensures that 50% duty cycle data is always received by the receiver which allows the use of a floating threshold to optimize sensitivity.

In order to ensure that communications are received by each of the local controls and masters in the system, the repeaters repeat in a specified sequence. The repeater sequence is such that it does not require knowledge of the order or location of the repeaters to guarantee a message is passed to each component for which it was intended.

The repeaters are used to extend the range of operation of the system. According to the conventional thought, repeaters are placed between two points of communication. For example, if points A and B are too far apart, a repeater is placed between them so that they may communicate with each other. If points A and B are even further apart, multiple repeaters may be used. Each repeater hears a message and sends it on to the next repeater. Then the next repeater hears that message and sends it. In the preferred embodiment of the system according to the invention, the allowed distance from a master or dimmer to a repeater is 30 feet. The allowed distance from one repeater to another is 60 feet in the preferred embodiment.

Figure 22:
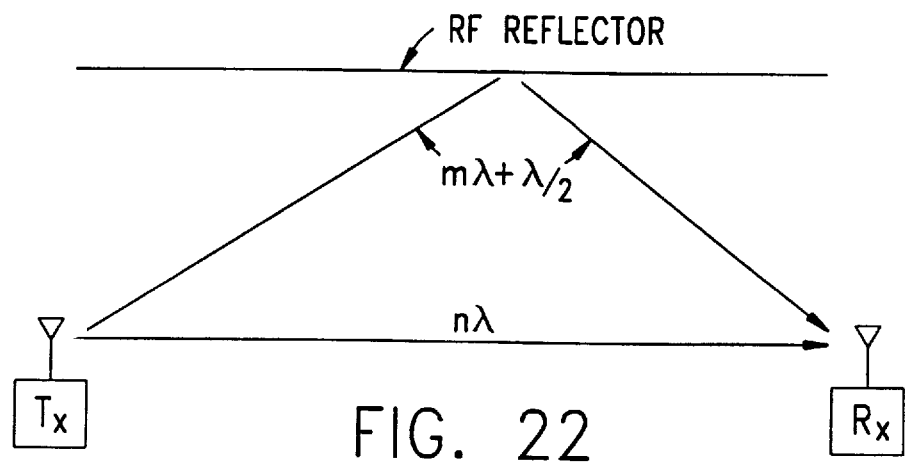
FIG. 22 shows how multipath nulls occur and how they result in reception of attenuated received signals, and for which the present invention provides a solution by accomplishing space diversity using one or more repeaters.
Figure 22A:
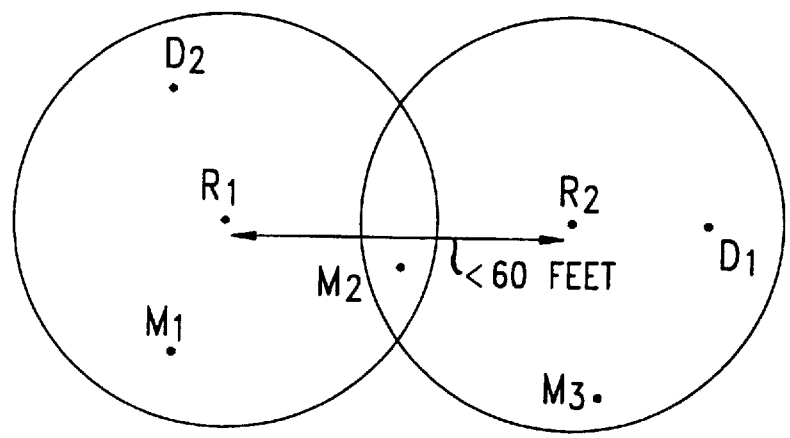
FIG. 22A shows a possible layout of lighting control devices, master control stations and repeater stations in an installation.

For example, in a system having two dimmers D1 and D2 and three masters M1, M2 and M3, the repeaters R1 and R2 might be placed as indicated in FIG. 22A. In such a case, a repeater sequence of R1-R2-R1 is established to ensure that all devices receive their messages. For example, in the above-mentioned case, if M3 sends an initial message, R2 would hear the message but R1 would not. D2 also would not hear the message. Accordingly, R1 is unable to respond in its time slot because it did not hear the message. R2 is able to repeat the message in its time slot because it heard the signal from M3. Because R1 can hear R2, R1 then repeats the message in its time slot, allowing D2 to receive the message.

It can be shown that for the two repeater system shown in FIG. 22A, the repeater sequence of R1-R2R1 will ensure that all communication devices within the transmission zones of R1 and R2 will receive messages intended for those devices after repetition by the repeaters of the signals in the sequence R1-R2-R1.

As long as each device is within the range of at least one repeater, all devices will thus be assured of communicating with each other. According to the preferred embodiment, each one of the repeater time slots is 25 milliseconds long. It is required that any single device only communicate once in a 100 millisecond interval due to FCC regulations. FCC averaging is performed every 100 milliseconds. As a result, in order to ensure that any device communicates only once in a 100 millisecond interval, which allows for maximum transmission power, wait slots are added so that the first repeater does not violate this rule. Accordingly, the sequence obtained is R1-R2-W-W-R1. Thus after the second repeater repeats there are two wait (W) slots before the first repeater repeats.

For three repeaters, the sequence necessary to ensure that all devices within range of any repeater receive communications intended for it has 7 slots, e.g., R1-R2-R3-R1-R2-R3-1 (7 slots). In order to ensure that no device communicates more than once in a 100 millisecond interval, wait slots are added as follows: R1-R2-R3-W-R1-R2-R3-W-R1 (9 slots).

For four repeaters, the shortest possible sequence is 12 slots, e.g., R1-R2-R3-R4-R1-R3-R2-R1-R4-R3-R1-R2 (12 slots). With this sequence, however, repeaters R1 and R3 communicate more than once in 100 milliseconds. Accordingly, the following sequence is used R1-R2-R3-R4-R1-R2-R3-R4-R1-R2-R3-R4-R1 (13 slots). For 5 and 6 repeaters, the following sequences can be used R5-R6-[four repeater sequence]-R5-R6. This would require that repeaters R5 and R6 each hear at least one system repeater R1 to R4. Another sequence that can also be employed is the following R6-R5-[four repeater sequence]-R5-R6. This would require that repeater R5 hear at least one system repeater R1 to R4. Repeater R6 must hear at least a system repeater R1 to R4 or repeater R5.

In general, the number of slots required (R) as a function of the number of repeaters (N) is determined by the following relationship: for N less than or equal to 4, $$R(N)=[4\times(N-1)]+1,$$

for N=5 then the equation is R(5)=R(4)+2=15 slots.
for N=6 then the equation is R(6)=R(5)+2=R(4)+4=17 slots.

When a master unit communicates that a button has been depressed, this may control multiple dimmers, in the preferred embodiment, up to 32 dimmers. All affected dimmers respond by indicating their status in their respective time slot so the master will know that each dimmer operated in response to a communication from a master. If each response is passed through the repeater sequence, too much time will be required. To overcome this, the repeaters build and pass the described on-off status bit map of dimmer status information. By the end of the repeater sequence, each master must have received a complete bit map at least once.

According to one embodiment of the invention, an aim of the invention is to use the shortest repeater chain possible. Because of the FCC requirement, a sequence has been developed such that a repeater speaks only once in 100 milliseconds, i.e. once out of every four 25 millisecond timeslots. An alternative scheme is that if a repeater has already communicated, it cannot retransmit again in its next slot if it would be within 100 milliseconds of its previous transmission. However, such a scheme would not have assured proper building and passing of the on-off status bit map. The development of the complete on-off status bit map would have required two passes through the repeater chain. Accordingly, an alternative scheme is to use the shortest possible sequence for outgoing messages and not to use any wait slots. If a repeater has already communicated, it remains silent in its next slot. Such a method would add significant complexity to the program code and remove redundancy or reliability from the link. However, such an alternative scheme can save transmission time.

Figure 21:
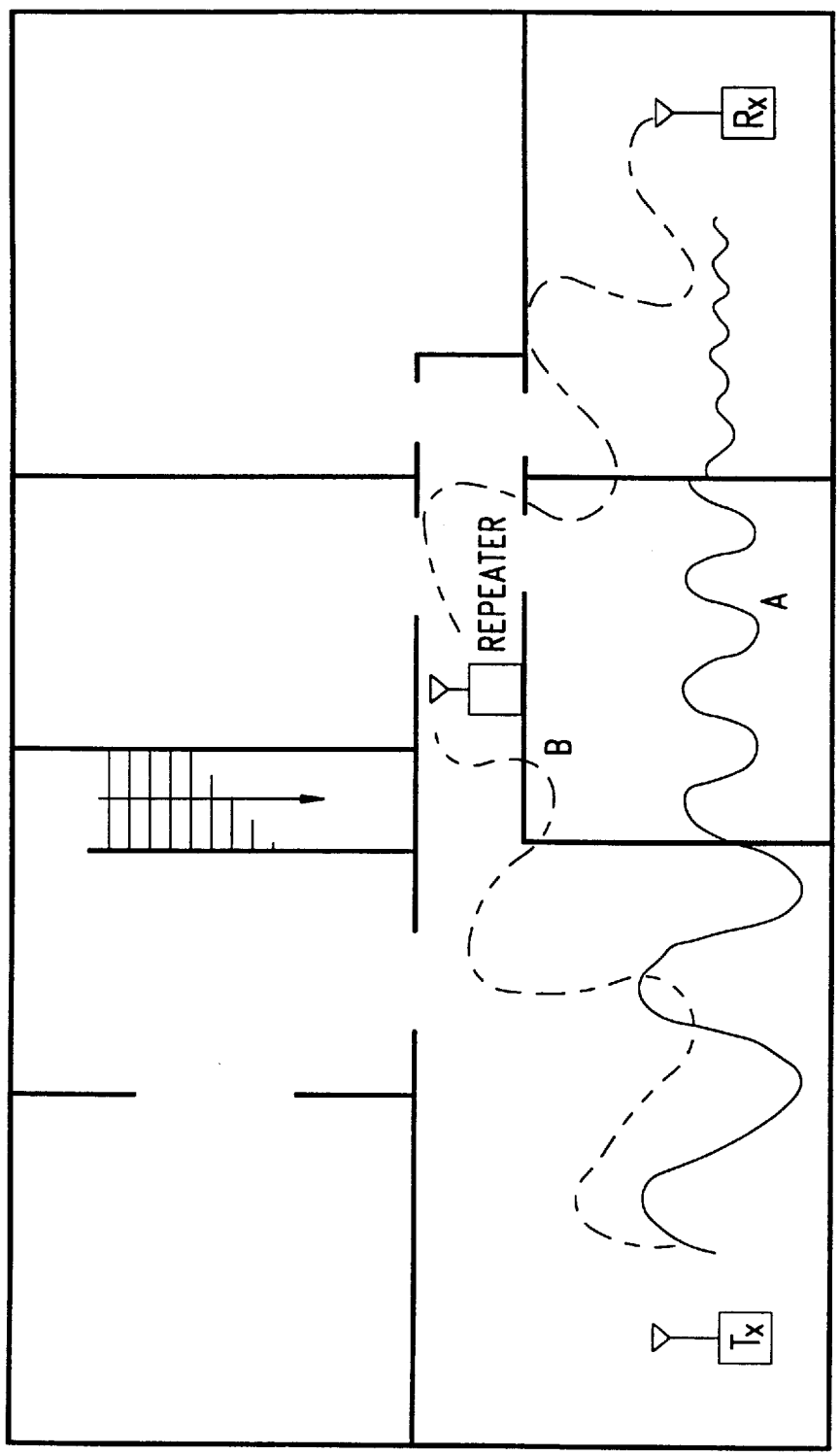
FIG. 21 shows how the installation of a repeater provides for more reliable communications in the environment of a typical house.

FIG. 21 shows how the system of the invention, using repeaters, eliminates problems that would occur in non-repeater type systems. For example, wave A shows how an RF signal could be affected passing through walls of a house without a repeater. Such building materials as lumber, drywall, metal lath, pipes, electrical wiring, etc. can attenuate the RF signal so that it is not received by the receiver. Furniture, people, animals and water moving in pipes can also cause attenuation or shadowing.

Using a repeater, space diversity is accomplished, as shown by wave B in FIG. 21. The repeater ensures that an amplified signal is repeated or relayed to the receiver. This creates space diversity for reliability.

FIG. 22 shows how multiple transmission paths can cause multi-path nulls, as is well known. The transmitted signal, after being reflected by the RF reflector and travelling a distance of $m\lambda+\lambda/2$ may combine with the signal travelling the shorter distance $n\lambda$ destructively, resulting in weak or no reception at the receiver.

By using a repeater in the system of the invention, because of the space diversity provided by the repeater, it is unlikely also to develop a multi-path null at the receiver from the signals transmitted both directly from the repeater and via reflection after transmission from the repeater.

As described, in one embodiment of the invention wherein a repeater is not employed, the master devices transmit or broadcast control information simultaneously to all control devices. The affected control devices change the status of the connected electrical devices and return status information to the master devices in assigned timeslots, i.e., sequentially.

In the preferred embodiment of the invention, a repeater is employed to provide a redundant path for radio frequency transmissions between master devices and control devices. In the preferred embodiment, the control signals from the master devices are broadcast so that they can either be received directly by the control devices or received by the control devices via one or more repeaters. As in the previously described embodiment, the dimmers respond to the control information and change the status of the affected lamps. The control devices transmit status information concerning the affected lamps in assigned timeslots, i.e., sequentially. This information can be received either directly by the master or received by the repeater where all the received status information is combined into a combined status signal for transmission to the master control device.

If a second repeater is employed, this repeater can receive status information either directly from the control devices or in the form of the combined status signal from the first repeater. The second repeater takes the status information that is received and combines it into a second combined status signal which is then transmitted for reception by the master.

Figure 23:
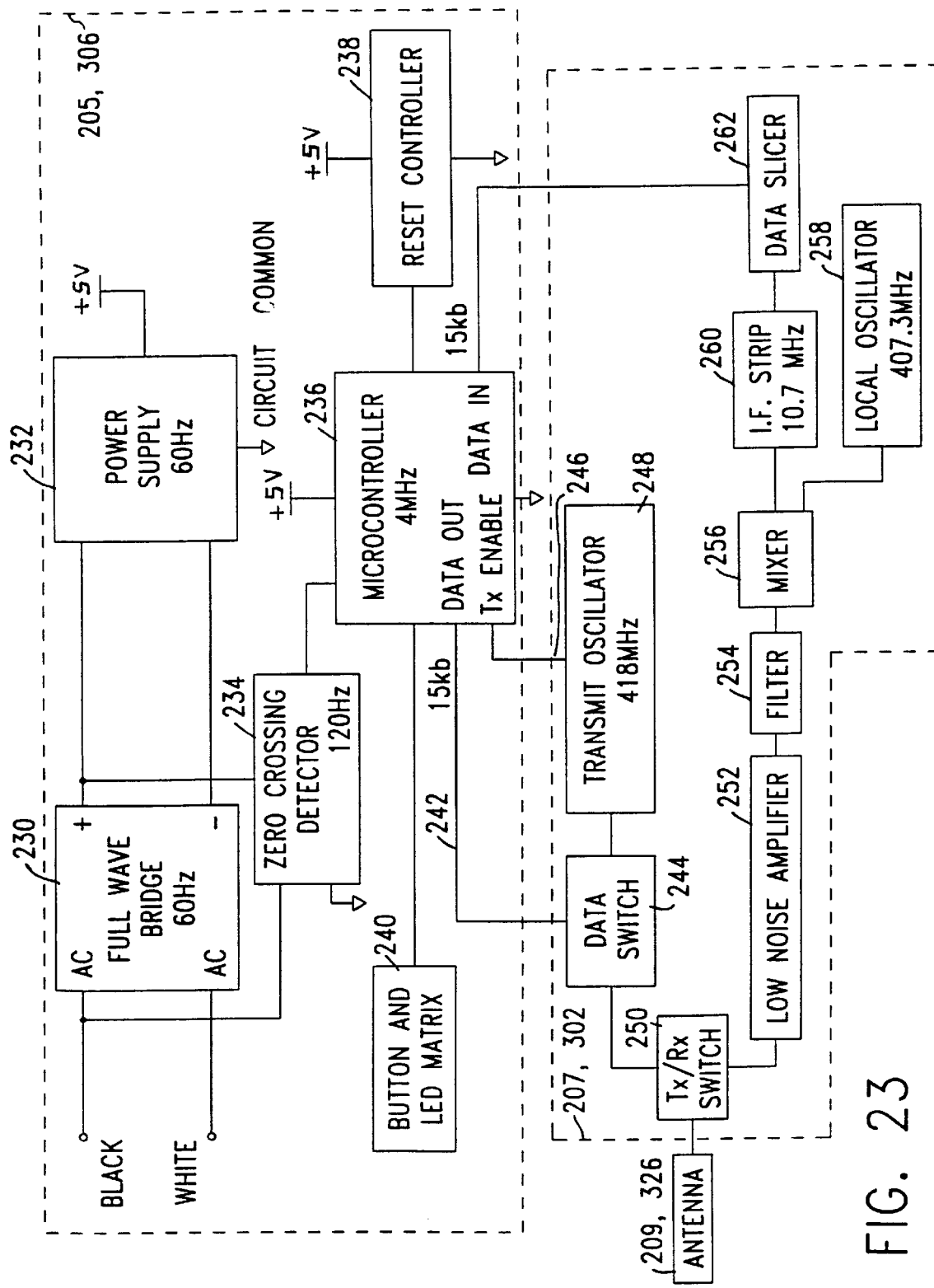
FIG. 23 shows the block diagram of a master station according to the invention.
Figure 24:
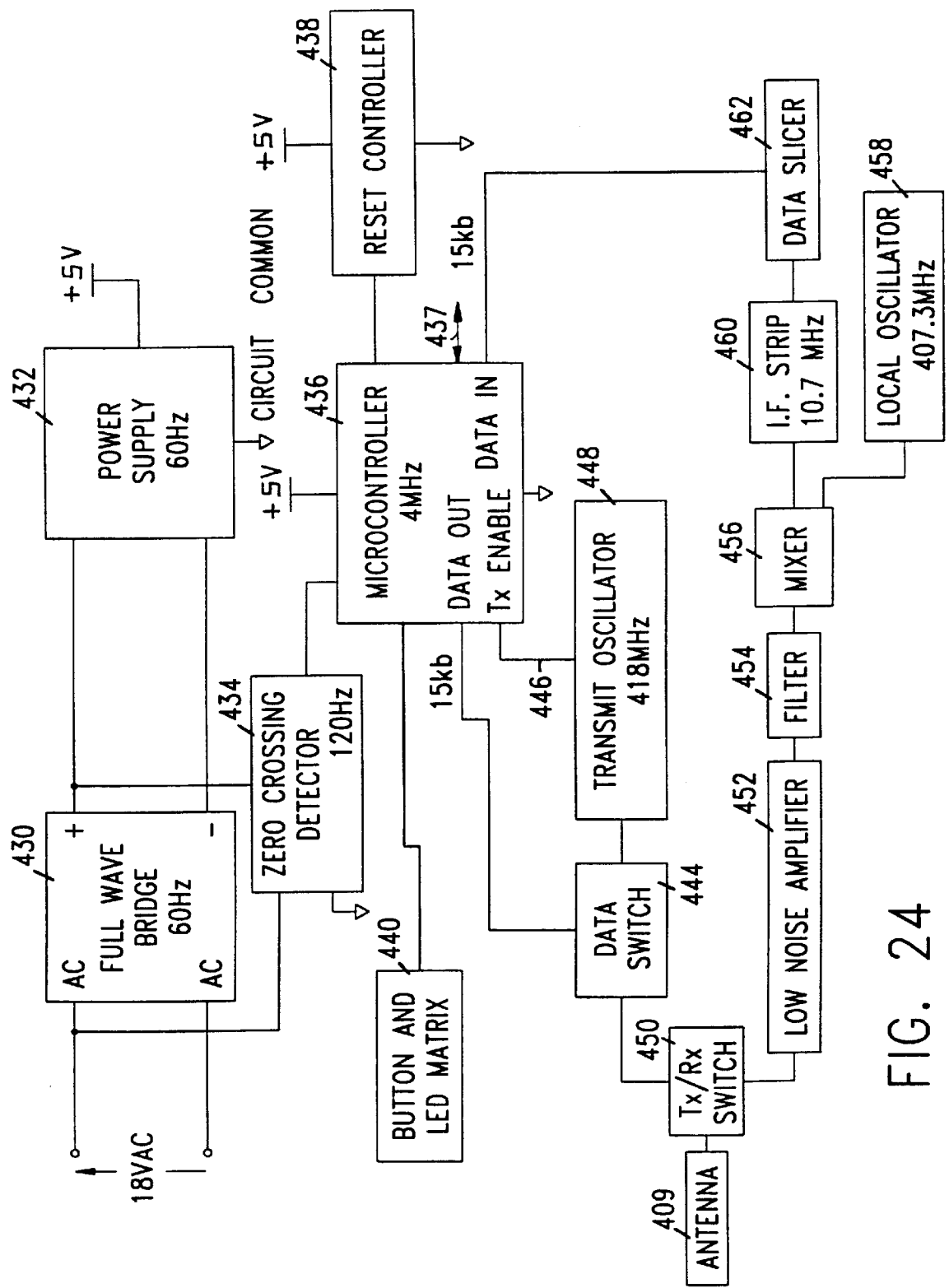
FIG. 24 shows the block diagram of a repeater, according to the present invention.
Figure 25:
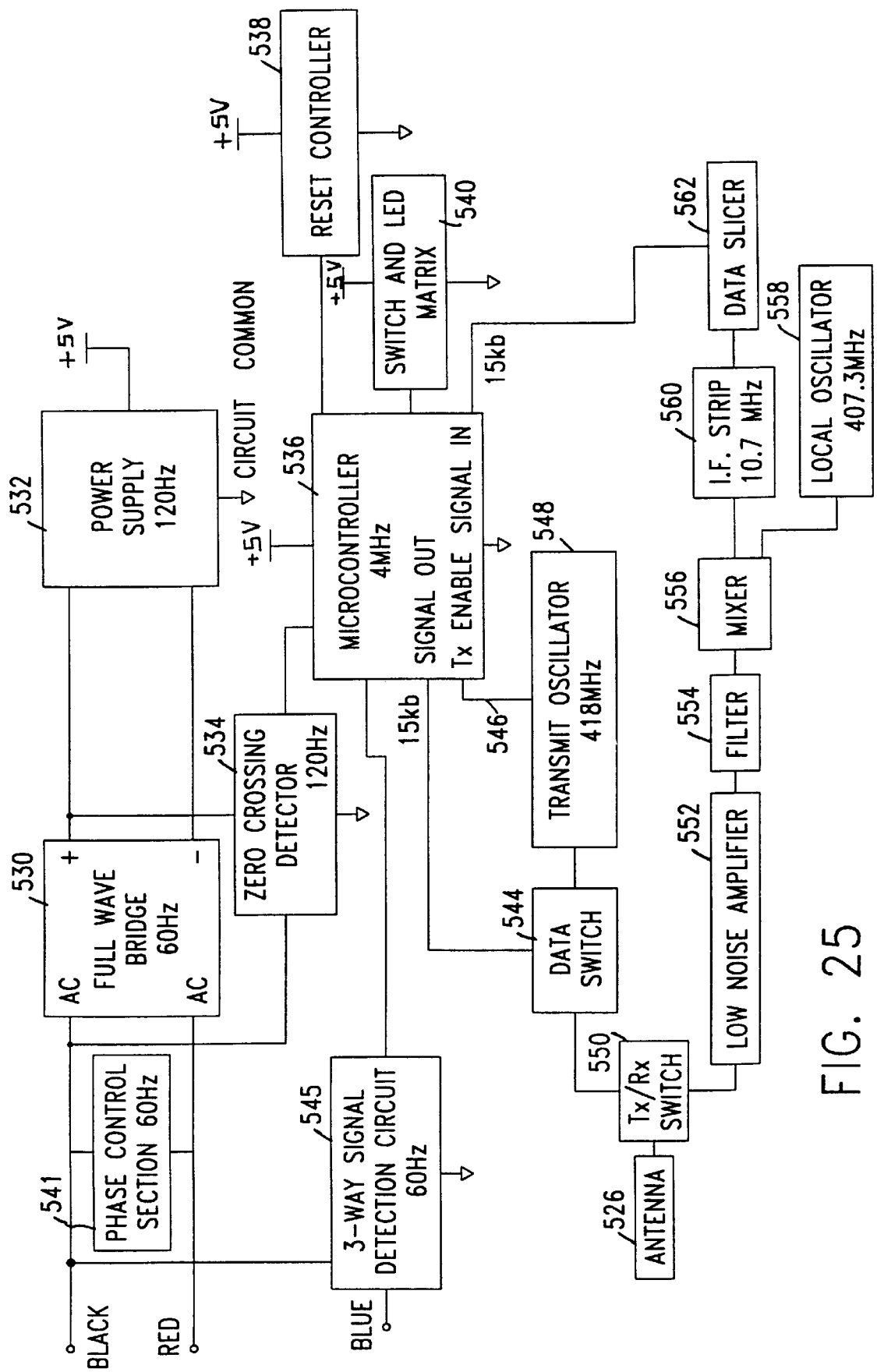
FIG. 25 shows the block diagram of a dimmer control device according to the present invention.

FIGS. 23, 24 and 25 show the block diagrams of the master station, repeater and dimmer, respectively, according to the invention.

Turning now to FIG. 23, the master station includes, as described previously, a main board 205, 306, and an RF board 207, 302, depending upon whether it is a table top master or a wall mount master. The block diagrams are the same, although the circuit boards for the wall mount masters may be made more compact than those for the table top masters. The RF board 207 or 302 is connected to an antenna 209 or 326 according to whether the master is a table top or a wall mounted master.

The main board 205, 306 is provided for supplying power and providing control functions. AC power is provided to a full wave rectifier bridge 230. The output of the full wave bridge is provided to a power supply regulator circuit 232 which provides power for the processor and logic circuitry. The output of the full wave bridge 230 is provided to a zero crossing detector 234 which is used to synchronize the time slots, the output of which is provided to a microcontroller 236. The microcontroller 236 is coupled to a reset controller 238 in conventional fashion. The control buttons and LED matrix 240 of the master station are coupled to the microcontroller 236 for providing the microcontroller information concerning the selected local controls and for providing status information to the LEDs.

Data to be transmitted for controlling the local controls is provided on a data outline 242 to the RF board 207, 302. When the data is to be transmitted, the microcontroller 236 first provides a transmit enable signal on line 246 to a transmit oscillator 248, preferably operating at a frequency of 418 MHz. The data to be transmitted is provided on line 242 to a data switch 244 which on-off keys the data onto the 418 MHz carrier. The key modulated data is then fed to a transmit/receive switch 250 and then to antenna 209, 326. Incoming information, for example, status information from a local control, is provided from the antenna 209, 326 to the transmit receive/switch 250. The received information is provided then to a superheterodyne receiver. The received data is provided to a low noise amplifier 252, filtered by a filter 254, mixed at 256 with a local oscillator signal provided by a local oscillator 258, such that an IF signal is produced. The IF signal modulator which receives information is supplied to the IF amplifier 260, thereafter provided to a data slicer 262 which squares up the data signal and provides it to the data input of the microcontroller 236.

The block diagram of the repeater is shown in FIG. 24. It has essentially the same components, which are like renumbered as the master of FIG. 23 using "400" series numbers instead of "200" series. Accordingly, it has essentially the same block diagram as the master station. The microcontroller 436 is of course, programmed differently than the microcontroller of the master station, as discussed above with respect to the program flow. In addition, the repeater processor 436 preferably has a communications port 437 which allows it (and thus the master units) to communicate with external devices, e.g. security systems, computers, networks, computer networks (e.g. the Internet) audio/visual systems, HVAC systems, communication systems (e.g. telephone systems or other communication systems), cable systems, other appliances, sensors, etc. Alternatively, the communications port 437 can also be coupled to the master controller 236.

FIG. 25 shows the block diagram of the dimmer. The dimmer block diagram is similar to the block diagram of the master and repeater. Like components are numbered similarly using "500" series numbers. However, additional circuits are included. The dimmer includes a phase control section 541 and a three-way signal detection circuit 545. The phase control section 541 is of conventional design and is controlled by the microcontroller 536. The phase control section 541 includes the power switching device 514. The microcontroller 536 is controlled by signals received from antenna 526 and also by manual actuation of dimmer control 537 and switch actuator 52 as shown in FIGS. 1 and 2. The switches actuated by actuator 52 and dimmer control 537 are part of switch and LED matrix 540 of FIG. 25. Instead of the dimmer control 537, a conventional potentiometer type dimmer control or another known dimmer control can be employed replacing a portion of switch and LED matrix 540.

Three-way signal detection circuit 545 is provided for determining if a signal from another switch connected with the dimmer in a three-way circuit is received. The three-way signal detection circuit 545 is of conventional design.

In all other respects, the block diagram is the same as the block diagram for the master repeater. Of course, the program resident in microcontroller 536 is different than the program resident in the microcontrollers 236 and 436 of the master and repeater, respectively, as previously described.

As is evident from the block diagrams and the program flow already discussed, intelligence in the system of the invention is distributed amongst the master stations, repeaters and dimmers. Each master and dimmer contains all the relationship information pertaining to itself. Accordingly, if any one component fails, the rest of the system continues to operate. The intelligence information may, however, be moved to different components. For example, if a repeater is not used, its intelligence can be moved to the master.

The system described allows a building's lighting system to be controlled remotely without the installation of any additional wiring. It provides, unlike any prior art system, the ability to know the status of each light fixture from the remote master station. The status indicated at the master station is the true status of each light fixture. When a control device (dimmer) changes the status of a lamp, either because of a command from a master or a manual actuation, it returns a status signal to the master. The system is capable of providing this status information as well as command information reliably because of the use of repeaters, the repeater sequencing, use of time slots and use of assignment and on-off status bit maps to communicate respectively, dimmer assignments and status information. The repeater or repeaters provide "space diversity" to overcome shadowing, nulls, attenuation, electromagnetic interference and inefficiencies of the antenna used at the control device.

The use of a repeater provides an alternative path for a signal to travel between the master and control device and vice versa. Thus, if the chance of a transmission failing for any given path is $1/1000$, by using two paths that are subject to independent failure, the chance of a failure is reduced to $1/1,000,000$.

As described, however, the system can be constructed without the repeater or repeaters, in which case any essential functions such as programming functions can be located elsewhere, e.g., in the master control unit. In such a system, all master units and control devices must be in range of each other.

In another embodiment of the system according to the invention, a combination of radio frequency signals and power line carrier signals are employed to transmit and receive command and status information.

Figure 26:
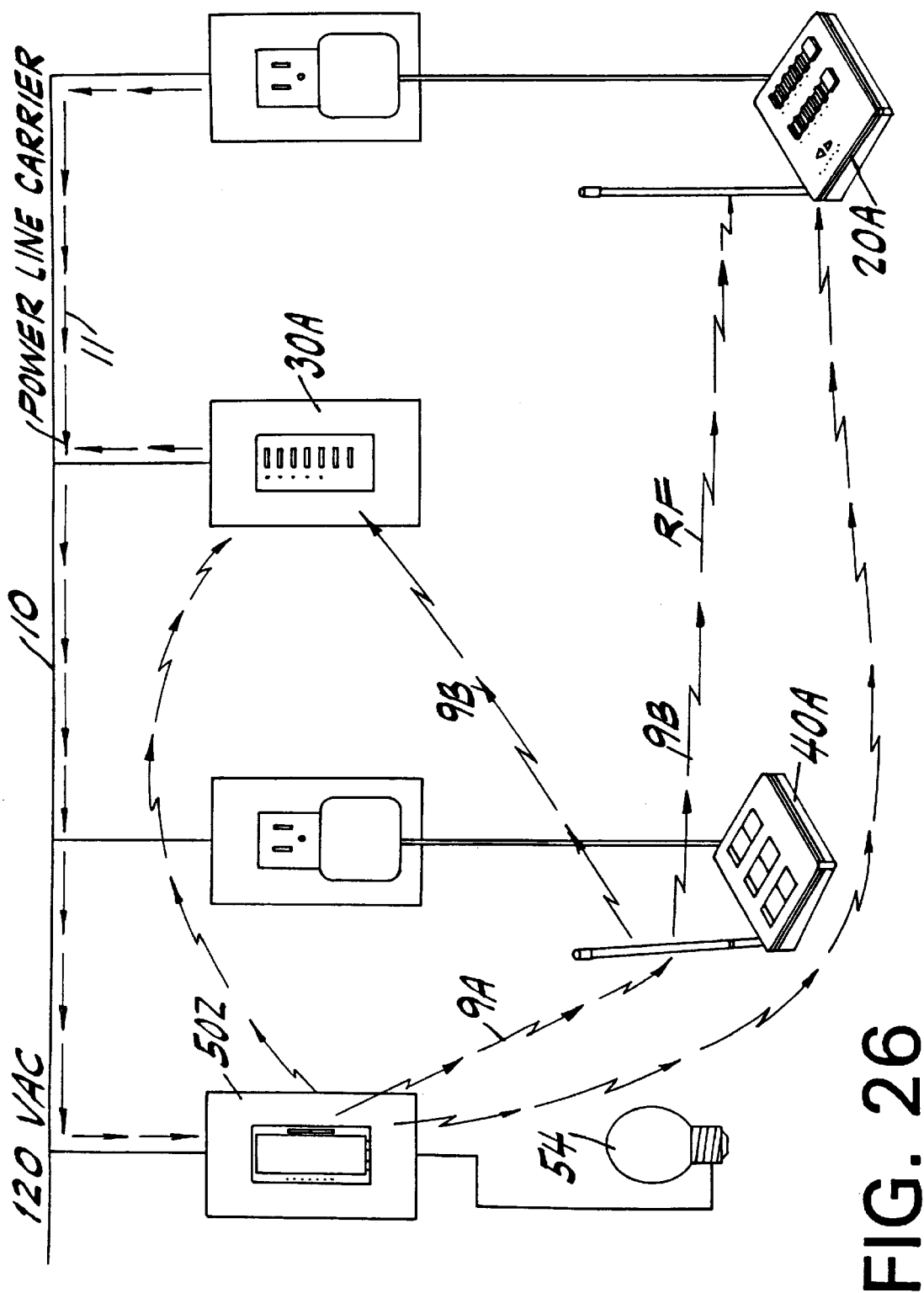
FIG. 26 is a system diagram of an overall system for controlling electrical devices from remote locations using a combined RF and power line carrier signal communications system.

FIG. 26 shows a first embodiment employing a combination of radio frequency and power line carrier signals. According to this embodiment, master units, for example, table top master 20A or wall mounted master 30A transmit power line carrier signals 11 onto the existing power line 10 comprising the wiring of the lighting system. These power line carrier signals 11 are received by a lighting control device, for example, dimmer 50Z. Dimmer 50Z has a power line carrier receiver which responds to the command signals from the master units 20A, 30A to control the status of the lamp 54.

In order to return status information to the master units 20A or 30A, the control device 50Z utilizes radio frequency signals 9A, shown by the zig-zag arrows in FIG. 26. As in the embodiment shown in FIG. 1, a repeater 40A may be employed in order to increase the reliability of the system. However, as in the embodiment shown in FIG. 1, the repeater may be dispensed with if all control devices are within communication range of the master stations. The repeater 40A essentially accomplishes the same purpose as the repeater 40 of FIG. 1 namely, it provides an additional path for the transmission of status information to the master stations 20A, 30A, relaying RF signals 9B to the master stations.

In another embodiment of the combined RF power line carrier system, an RF to power line carrier bridge 40B is employed. In this system, the master units 20B, 30B transmit radio frequency signals, as shown by the zig-zag lines 51B in FIG. 27, to the RF to PLC bridge 40B. The RF to PLC bridge 40B converts the radio frequency signals into power line carrier signals, and superimposes them on the existing power line wiring of 10 of the building, as shown by the arrows 13 of FIG. 27. These power line carrier signals include the command information for the control devices. Additionally, RF to PLC bridge 40B receives radio frequency signals from the control devices 50Y, as shown by zig-zag arrows 51A, and converts these radio frequency signals into power line carrier signals. These power line carrier signals include status information concerning the status of the electric lamps 54 connected to the control devices 50Y.

Accordingly, the power line carrier signals 13 are of two types, command signals for the control devices and status signals from the control devices to be received by the master units 20B, 30B. As in the other embodiments, the master units 20B, 30B use the status information to indicate the status of the controlled electric lamps 54.

Figure 28:
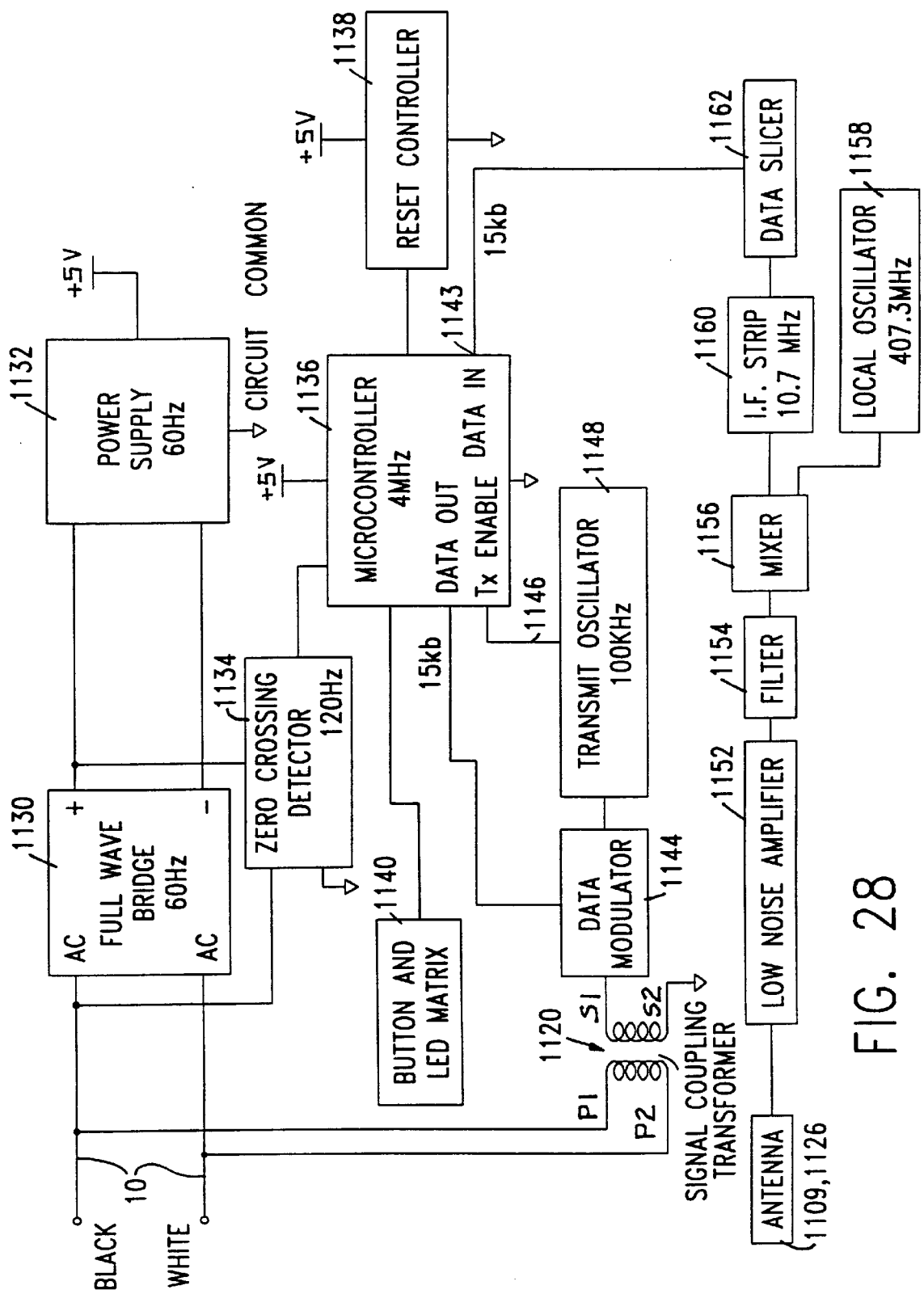
FIG. 28 is a block diagram of a master unit for use in the system shown in FIG. 26.

FIG. 28 shows the block diagram of a master unit 20A, 30A of the embodiment of FIG. 26. The master unit of FIG. 28 comprises microcontroller 1136 which has the operating program stored therein. Microcontroller 1136 receives status information concerning the status of the controlled electrical lamps 54 at an input 1143. Input 1143 is coupled to a receiver comprising an antenna 1109, 1126, for example, a printed circuit board antenna as previously described for a wall mounted master 30A shown in FIG. 26. The output of the antenna is coupled to a low noise amplifier 1152 whose output is coupled to a filter 1154. The output of the filter is coupled to a mixer 1156 fed by a local oscillator 1158. The beat frequency of the mixer 1156 is coupled to the input of an intermediate frequency amplifier 1160 whose output is coupled to a data slicer 1162. The data slicer functions in the same manner as described with reference to FIGS. 23–25. The output of the data slicer is coupled to the input 1143 of the microcontroller 1136.

The microcontroller 1136 provides command information for the lighting control devices 50Z of FIG. 26 to a data modulator 1144. The carrier frequency for the data modulator 1144 is provided by a transmit oscillator 1148 which is enabled by an enable line 1146 from the microcontroller 1136. The modulator control data is supplied to the signal coupling transformer 1120 whose secondary is coupled to the power line 10 for providing the power line carrier signal to the power line for receipt by the control devices 50Z.

The remaining blocks of FIG. 28 are substantially the same as the corresponding blocks shown in FIG. 23 and are numbered accordingly, using "1100" series numbers.

Figure 27:
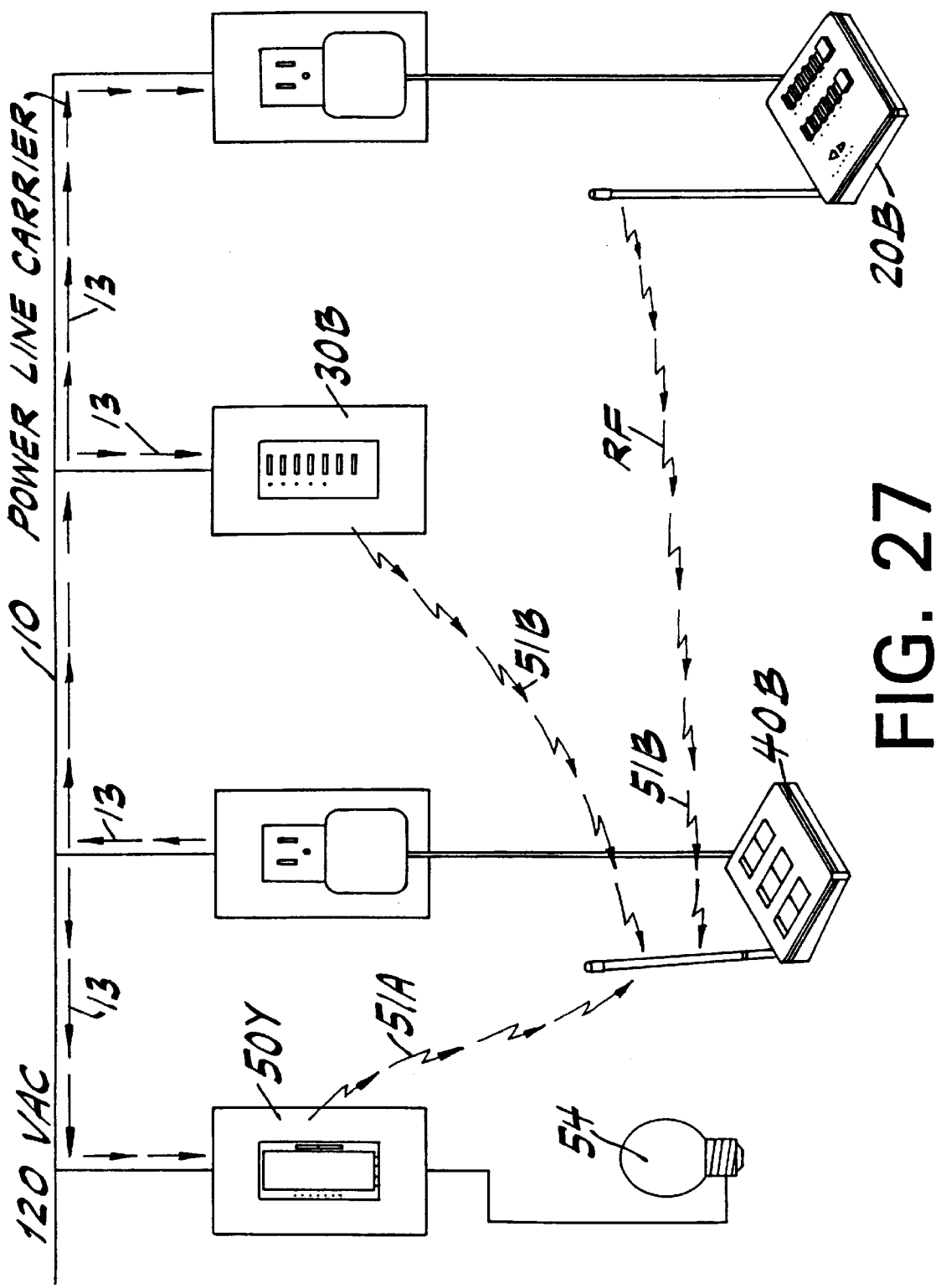
FIG. 27 is a system diagram of another embodiment of an overall system for controlling electrical devices from remote locations using a combined RF and power line carrier signal communications system.
Figure 29:
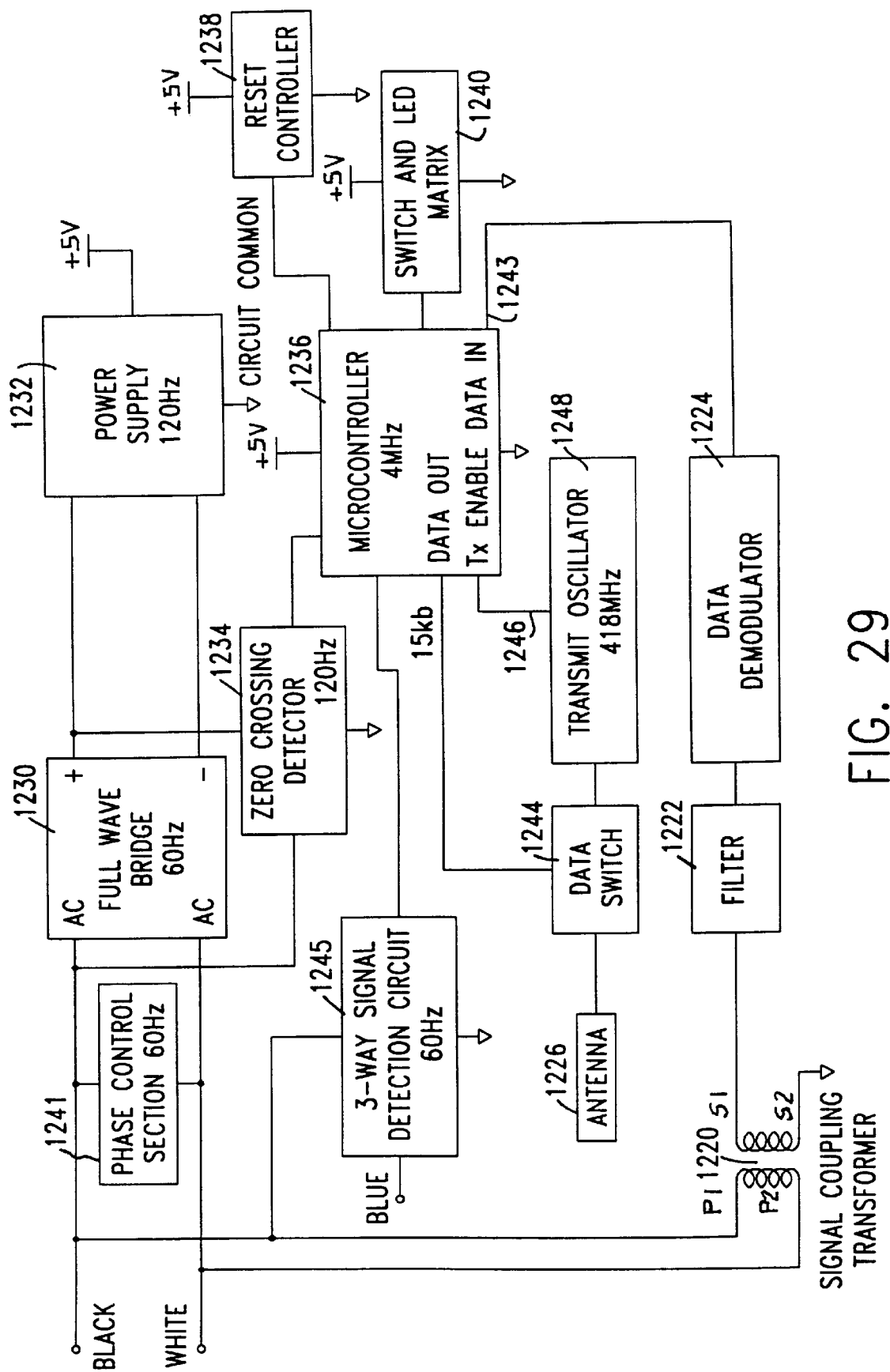
FIG. 29 is a block diagram of a control device for use in the system shown in either FIGS. 26 or 27.

FIG. 29 shows the block diagram of the control device 50Z, 50Y, which is substantially the same for both the embodiment of FIG. 26 and that of FIG. 27. As shown, the lighting control device 50Z, 50Y, which may comprise a dimmer, includes a microcontroller 1236, a switch and LED matrix 1240, a phase control section 1241, a three-way signal detection circuit 1245, a power supply 1232, zero crossing detector 1234, rectifier bridge 1230 and reset controller 1238. The functions of these blocks are substantially the same as like blocks shown in FIGS. 23–25.

The lighting control device of FIGS. 26, 27 and 29 receives command information as power line carrier signals via a signal coupling transformer 1220, the secondary of which is coupled to a filter 1222, whose output is coupled to a data demodulator 1224. The output of the data demodulator is coupled to the data input 1243 of the microcontroller 1236. Accordingly, the microcontroller 1236 obtains commands for controlling the status of the electric lamps 54.

The microcontroller 1236 returns status information for receipt by the master as radio frequency signals. In the embodiment of FIG. 26, the radio frequency signals can be received either directly by the master or via the repeater 40A. In the embodiment of FIG. 27, the radio frequency signals are received by the RF to PLC bridge 40B and converted to power line carrier signals for receipt by the master over the power line.

Accordingly, the status information is provided on an output of the microcontroller 1236 to a data switch 1244 which receives its carrier from a transmit oscillator 1248 enabled by an output 1246 of the microcontroller 1236. The output of the data switch 1244 is coupled to an antenna 1226, preferably the printed circuit board antenna described earlier.

Figure 30:
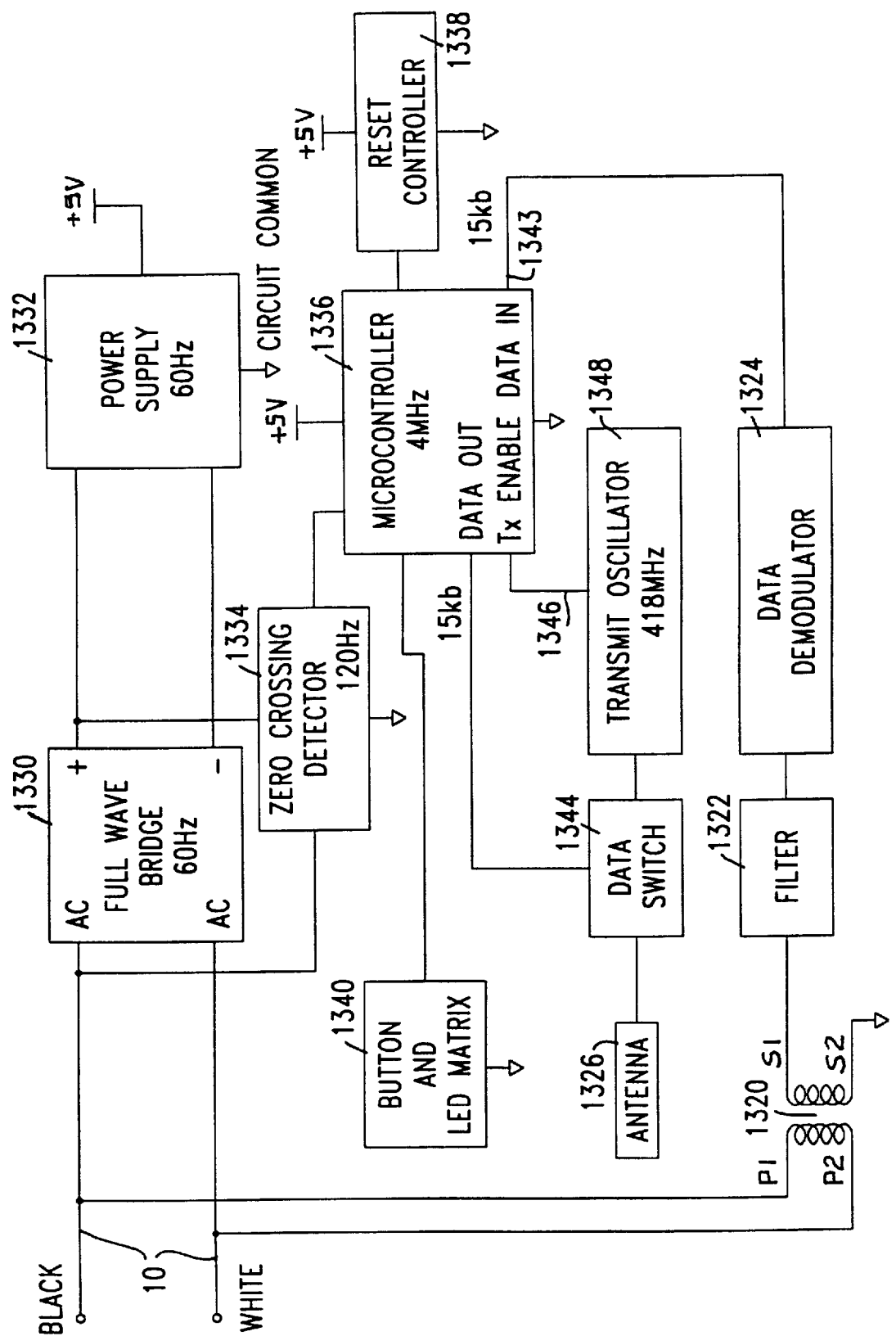
FIG. 30 is a block diagram of a master unit for use in the system shown in FIG. 27.

FIG. 30 shows the block diagram of the master units 20B, 30B of FIG. 27. The master unit comprises a microcontroller 1336, as well as the full wave rectifier bridge 1330, power supply 1332, zero crossing detector 1334, button and LED matrix 1340 and reset controller 1338 as described with reference to the other block diagrams. The master unit according to the system of FIG. 27 transmits radio frequency signals via a data switch 1344, transmit oscillator 1348 enabled by line 1346 from microcontroller 1336 and antenna 1326. The information transmitted by radio signals by antenna 1326 is received by the RF to PLC bridge 40B and converted into PLC signals for receipt by the control devices 50Y for controlling the status of the connected electric lamps 54.

Microcontroller 1336 of the master unit shown in FIG. 30 receives status information concerning the status of the electrical lamps 54 from the power line 10 via a signal coupling transformer 1320. The secondary of the transformer 1320 is coupled to a filter 1322 and data demodulator 1324. The output of the data demodulator 1324 comprising the status information is provided to the data input of the microcontroller 1336 for informing the master unit of the status of the electric lamp 54.

Figure 31:
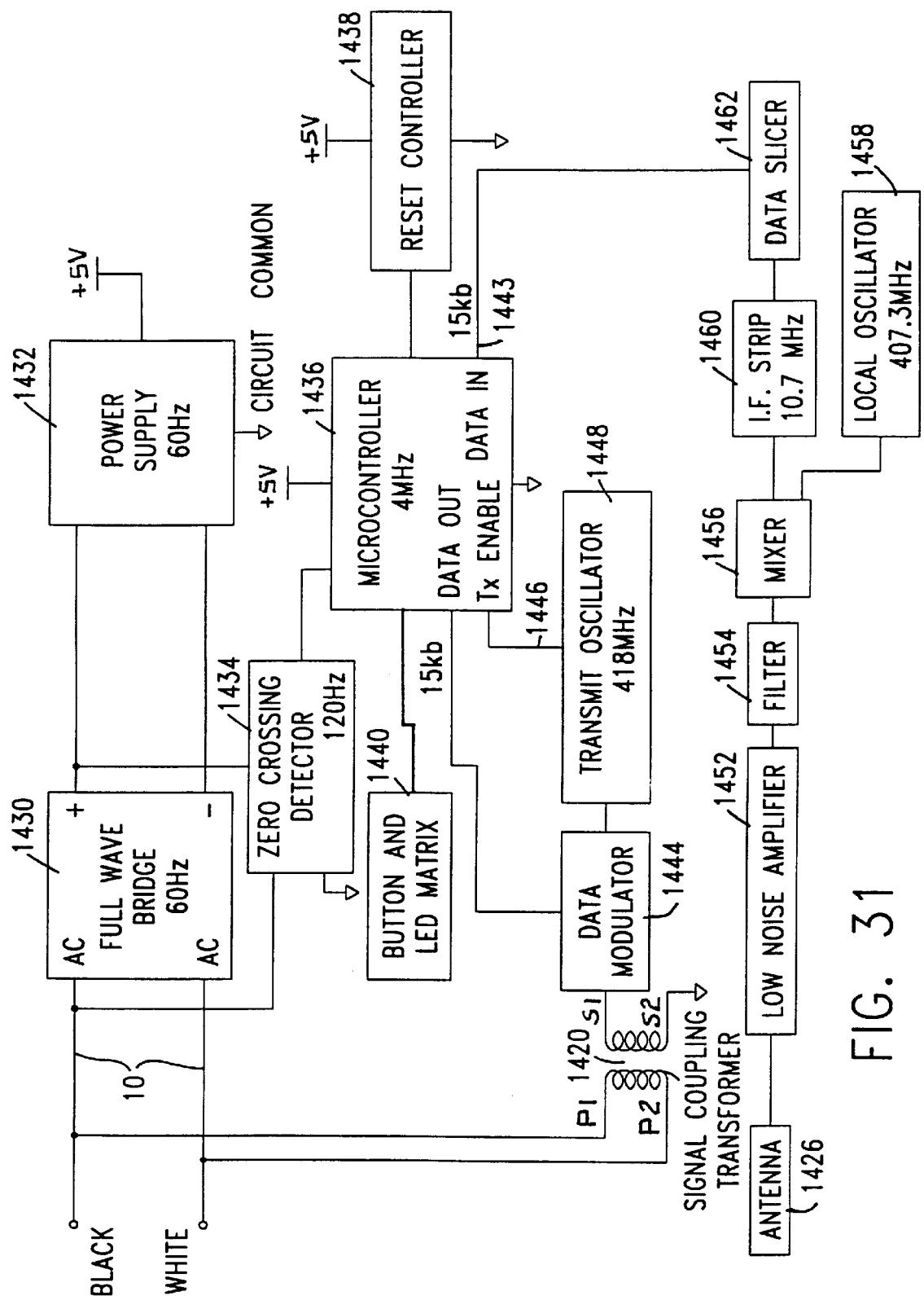
FIG. 31 is a block diagram of a radio frequency to power line carrier signal bridge utilized in the system shown in FIG. 27.

FIG. 31 shows the block diagram of the RF to PLC bridge 40B of FIG. 27. The block diagram is substantially the same as that of the master unit shown in FIG. 30. An important difference is that the microcontroller 1436 of FIG. 31 is provided with a program to convert the radio frequency command information from the masters 20B and 30B and the radio frequency status information from the control devices 50Y into power line carrier signals for receipt, respectively, by the control devices 50Y and master units 20B, 30B.

As in the other block diagrams shown, the bridge includes a button and LED matrix 1440, zero crossing detector 1434, full wave rectifier bridge 1430, power supply 1432 and reset controller 1438. The RF to PLC bridge of FIG. 31 receives radio frequency signals via antenna 1426. These radio frequency signals are provided to a low noise amplifier 1452 whose output is provided to a filter 1454. The output of the filter is provided to a mixer 1456 coupled to the output of a local oscillator 1458. The beat frequency of the mixer is supplied to an intermediate frequency amplifier 1460 whose output is supplied to a data slicer 1462. The output of the data slicer, comprising the baseband information in the radio frequency signals, is supplied to the microcontroller 1436. As discussed previously, this information, depending upon the source, can comprise either status information from the control devices 50Y or command information from the masters 20B, 30B.

The microcontroller 1436 provides the respective status or command information to a data modulator 1444 coupled to a transmit oscillator 1448 which is enabled by a line 1446 from the microcontroller 1436. The output of the data modulator 1444 is provided to a signal coupling transformer 1420, whose secondary is provided to the power line 10 to superimpose the respective command and status signals on the power line.

Figure 32:
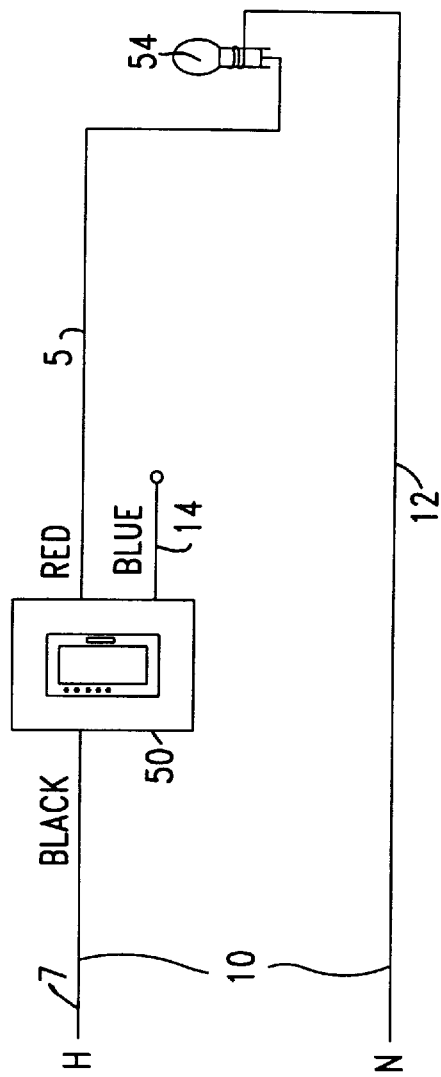
FIG. 32 is a block diagram of the connection of the control device to an electric lamp showing how the control device of FIG. 25 receives power.

FIG. 32 shows the details of the connection of the dimmer 50, whose block diagram is shown in FIG. 25, to the building's existing hard wired electrical system 10. The hot lead of the dimmer, identified as the black lead in FIG. 25, is connected to a phase hot wire 7, of the building's existing hard wired electrical system. The dimmed hot lead of the dimmer, identified as the red lead in FIG. 25, is connected to the electric lamp 54 via wire 5. Optionally, 3-way signal lead 14 identified as the blue lead in FIG. 25, is connected to a remote device (not shown). The remote device provides signals to control the on-off status and the intensity setting of the dimmer of FIG. 25. A device of this type is the Maestro Remote Model MA-R manufactured by the assignee of the present invention.

The other terminal of electric lamp 54 is connected to a neutral wire 12 of the building's existing hard wired electrical system. it should be noted that there is no direct connection at the dimmer 50 to the neutral wire 12, but that dimmer 50 is only connected to neutral wire 12 through electric lamp 54.

This is significant because in a situation where dimmer 50 is being retrofitted into an existing building, neutral wire 12 would usually not be available in the existing wallbox into which dimmer 50 would be installed to replace an existing switch controlling electric lamp 54.

If dimmer 50 did require direct connection to neutral wire 12 then in the retrofit situation described an additional wire would have to be pulled into the wallbox in which dimmer 50 was installed through the existing building walls, which would add significantly to the cost of installation and may cause damage to finished building surfaces.

All the power supplied to power supply 532 which powers the control circuitry and the radio frequency circuitry in dimmer 50 is derived from the connections to phase hot wire 7 and electric lamp connection wire 5.

This is possible because dimmer 50 uses a relatively low power radio frequency transmitter to transmit status signals and low power control circuitry, but more particularly is possible because dimmer 50 does not use power line carrier signals to transmit status information which would employ a transmitter which uses more power than can be derived from the connection to phase hot wire 7 and electric lamp connection wire 5.

In addition to the employment of the system described to control lighting fixtures remotely without rewiring, the system according to the invention can also be employed to control other electrically operated devices, e.g., security systems, HVAC systems, PC's, motors, appliances, sensors etc. and may be connected to such systems as cable TV, the Internet, phone lines, PC's audio visual systems, local area networks, etc. for communications.

The system of the invention can also employ an input/output device. The input/output device can receive a signal from a signal generating device, for example, a time clock, occupancy sensor, modem input, etc. In response to the signal from the signal generating device, which may be located remotely, the input/output device produces a command signal, e.g., an RF signal like masters 20, 20B or 30, 30B or a PLC signal like masters 20A, 30A, for controlling respective lighting control devices.

Conversely, the input/output device can provide output signals from RF or PLC inputs, depending on the embodiment, for controlling external devices, in much the same way as the communications port previously described.

Additionally, the system could be employed with phone lines to allow the checking of the system status from remote locations. The system also provides benefits relating to energy conservation and provides security and/or a sense of security to a building/home occupant.

The system according to the invention is also easily expanded to accommodate electrical lighting systems of any size. The user/installer merely must replace the conventional lighting switches with the local controls according to the invention, expand the size of the master station or stations to the size required and install the number of repeaters that may be necessary (if the embodiment uses a repeater) for the size of the system.

Although the preferred embodiment of the invention employs radio frequency communication links, other communication links can also be employed, as shown by the alternative embodiments, in either or both directions, e.g. power line carrier links.

Although the present invention has been described in relation to particular embodiments thereof, many other variations and modifications and other uses will become apparent to those skilled in the art. The present invention, therefore should be limited not by the specific disclosure herein, but only by the appended claims.

Although the present invention has been described in relation to particular embodiments thereof, many other variations and modifications and other uses will become apparent to those skilled in the art. The present invention, therefore should be limited not by the specific disclosure herein, but only by the appended claims.

What is claimed is:

1. A method of communication for a two way transmission system having at least one first transmitter/receiver device, at least one second transmitter/receiver device and at least one repeater for relaying signals between the first and second devices comprising the steps of:

transmitting a first signal comprising a first command from the first device;

repeating the first command with each repeater in a respective repeater time slot;

receiving the first command at the second device;

transmitting status information regarding the status of each second device from each second device in a respective status time slot;

forming a status bit map comprising all status information regarding each second device in the at least one repeater; and transmitting the status bit map with the repeater so that the at least one first device has received the status bit map.

2. The method of communication of claim 1, further comprising the steps of:

transmitting the first command a second time from the first device; and repeating the first command a second time with each repeater in a respective second repeater time slot.

3. The method of communication of claim 2, further comprising the steps of:

transmitting the first command a third time from the first device; and repeating the first command a third time with each repeater in a respective third repeater time slot.

4. The method of communication of claim 3, further comprising the steps of:

transmitting the first command a fourth time from the first device; and repeating the first command a fourth time with each repeater in a respective fourth repeater time slot.

5. The method of communication of claim 1, wherein the step of transmitting a first command from the first device comprises the steps of:

transmitting a link claim; and thereafter transmitting a command packet.

6. The method of communication of claim 5, wherein the step of repeating the first command with each repeater in respective repeater time slots comprises the steps of:

repeating the link claim a plurality of times after the first device transmits the link claim; and repeating the command packet a plurality of times after the first device transmits the command packet.

7. The method of communication of claim 6, further comprising the steps of:

transmitting the first command a second time; and repeating the first command a second time with each repeater in a respective second repeater time slot;

the step of transmitting the first command a second time comprising the steps of:

dividing a time period in which to transmit the first command a second time into a plurality of backoff time slots;

selecting one of the backoff time slots for transmission of the first command a second time; and transmitting the first command a second time by transmitting the link claim and thereafter the command packet;

the step of repeating the first command a second time with each repeater in a respective second repeater time slot comprising the steps of:

repeating the link claim a plurality of times after the first device transmits the link claim the second time; and repeating the command packet a plurality of times after the first device transmits the command packet the second time.

8. The method of communication of claim 7, wherein the step of selecting one of the backoff time slots comprises the step of randomly selecting one of the backoff time slots.

9. The method of communication of claim 1, further wherein the first device comprises a master control unit and each second device comprises an electrical device control device, the master control unit having a plurality of actuators, at least one of the second devices being assignable to an actuator, and further comprising the steps of:

assigning at least one of the second devices to the actuator;

transmitting an assignment bit map of the second devices assigned to each actuator;

determining, at the second devices, the number of second devices assigned to the actuator of the master unit; and determining the status time slot from the number of second devices assigned to the actuator in which to transmit said status information.

10. The method of communication of claim 9, further comprising the step of assigning the repeater, the first device, and the second devices a unique address and further wherein the step of determining the status time slot of a first second device from the number of second devices assigned to the actuator comprises the step of counting the number of second devices assigned to the actuator with a lower address than the address of the first second device.

11. The method of communication of claim 1, further comprising the step of determining with the second devices a beginning of the status time slots from the zero crossings of a particular phase of a three phase power system to which the second devices are connected and further comprising the step of connecting said second devices to any of the phases of the three phase power systems, the step of transmitting status information comprising the step of providing a sufficiently long status time slot to ensure the status information sent by the second devices connected to different phases of the three phase power system do not overlap.

12. The method of communication of claim 1, wherein the step of repeating the first command with each repeater in a respective repeater time slot comprises the step of:
  repeating the first command with each repeater in a defined repeater sequence to ensure that each second device receives the first command pertinent to the respective second device.

13. The method of communication of claim 1, wherein the steps of forming and transmitting the status bit map with each repeater comprises the steps of:
  inserting into the status bit map at each repeater the status information known to that repeater; and
  transmitting the status bit map as known to that repeater in an assigned repeater time slot according to a predefined repeater sequence to ensure that at the end of the sequence, all status information will have been inserted into the status bit map and all first devices will have received the complete status bit map at least once.

14. The method of communication of claim 13, wherein the step of forming the status bit map comprises determining the on/off status of an electrical device coupled to a second device.

15. The method of communication of claim 14, wherein the step of forming the status bit map further comprises the step of determining the intensity level of the electrical device where the electrical device is an electric lamp.

16. The method of communication of claim 13, wherein there are two repeaters identified as R1 and R2 and the step of transmitting the status bit map as known to each repeater in an assigned repeater time slot according to a predefined repeater sequence comprises the step of transmitting in the predefined repeater sequence R1-R2-R1, wherein R1 means repeater 1 transmits and R2 means repeater 2 transmits.

17. The method of communication of claim 13, wherein there are three repeaters identified as R1, R2 and R3 and the step of transmitting the status bit map as known to each repeater in an assigned repeater time slot according to a predefined repeater sequence comprises the step of transmitting in the predefined repeater sequence R1-R2-R3-R1-R2-R3-R1, wherein R1 means repeater 1 transmits, R2 means repeater 2 transmits and R3 means repeater 3 transmits.

18. The method of communication of claim 13, wherein there are four repeaters identified as R1, R2, R3 and R4 and the step of transmitting the status bit map as known to each repeater in an assigned repeater time slot according to a predefined repeater sequence comprises the step of transmitting in the predefined repeater sequence R1-R2-R3-R4-R1-R3-R2-R1-R4-R3-R1-R2, wherein R1 means repeater 1 transmits, R2 means repeater 2 transmits, R3 means repeater 3 transmits and R4 means repeater 4 transmits.

19. The method of communication of claim 13, wherein there are four repeaters identified as R1, R2, R3 and R4 and the step of transmitting the status bit map as known to each repeater in an assigned repeater time slot according to a predefined repeater sequence comprises the step of transmitting in the predefined repeater sequence R1-R2-R3-R4-R1-R2-R3-R4-R1-R2-R3-R4-R1, wherein R1 means repeater 1 transmits, R2 means repeater 2 transmits, R3 means repeater 3 transmits and R4 means repeater 4 transmits.

20. The method of communication of claim 13, wherein each repeater time slot is 25 msec. and further comprising the step of, in order that each repeater only communicate once in a 100 msec. time period, inserting wait slots in which no repeaters communicate.

21. The method of communication of claim 1, wherein the two way transmission system comprises a radio frequency transmission system and each of the steps of transmitting comprises the step of transmitting with radio frequency radiation.

22. A method of communication for a two way transmission system having at least one first transmitter/receiver device and at least one second transmitter/receiver device comprising the steps of:
  transmitting a first signal comprising a command from the first device;
  receiving the first signal at each of the second devices; and
  transmitting a status signal regarding the status of the second device from each second device in a respective time slot; and
  further wherein each of the second devices have individual device addresses, and further comprising the step of using the addresses to determine the time slots.

23. The method of communication of claim 22, further comprising the step of transmitting the first signal with the first device to each of the second devices at the same time.

24. The method of communication of claim 22, further comprising the step of transmitting the first signal with the first device to each of the second devices in sequence.

25. The method of communication of claim 22, further comprising the steps of providing as a master control unit and providing the second device as a control device for controlling an electrical device.

26. The method of communication of claim 25, further comprising the steps of providing the electrical device as an electric lamp and providing the second device as a lamp dimmer.

27. A method of communication for a two way transmission system, having at least one first transmitter/receiver device, at least one second transmitter/receiver device, and a repeater for relaying signals between the first and second devices comprising the steps of:
  transmitting a first signal comprising a command from the first device;
  receiving the first signal at the repeater;
  transmitting the command in a second signal from the repeater;
  receiving at least one of the first signal and the second signal at each of the second devices;
  transmitting a first status signal regarding the status of the second device from each second device in a respective time slot;
  receiving the first status signals regarding the status of the second device from each second device at the repeater and combining them into a combined status signal;

transmitting the combined status signal from the repeater;

receiving at least one of said first status signals from said second devices and said combined status signal at said first device.

28. (Amended) The method of communication [communications protocol] of claim 27, further comprising the steps of providing [wherein] the first device [comprises] as a master control unit and providing the second device [comprises] as an electrical device control device, and further comprising providing the master control unit [having] with a plurality of actuators.

29. The method of communication of claim 27, further comprising the steps of providing the second device as a lamp dimmer that controls power to an electric lamp, and providing the first device with at least one status indicating device, and further comprising the steps of:

indicating the status of the lamp dimmer at the first device in response to the receipt of at least one of said first status signal and said combined status signal at said first device.

30. The method of communication of claim 27, further comprising the step of providing the first device with at least one actuator and further wherein the step of transmitting the first signal is initiated by the step of actuating said at least one actuator.

31. The method of communication of claim 29, further comprising the step of providing the second device with a manual actuator for controlling the power to the electric lamp and further comprising the step of actuating the manual actuator, said step of actuating the manual actuator causing the further steps of:

transmitting a second status signal containing status information from the lamp dimmer;

receiving the second status signal at the repeater and transmitting a third status signal containing the status information from the second status signal from the repeater;

receiving at least one of the second status signal and the third status signal at the master; and indicating the status of the lamp dimmer at the first device.

32. A method of communication for a two way transmission system, having at least one first transmitter/receiver device, at least one second transmitter/receiver device and at least two repeaters for relaying signals between the first and second devices comprising the steps of:

transmitting a first signal comprising a command from the first device;

receiving the first signal at a first repeater;

transmitting the command in a second signal from the first repeater;

receiving at least one of the first signal and the second signal at the second repeater;

transmitting the command in a third signal from the second repeater;

receiving at least one of the first signal, the second signal, and the third signal at each of the second devices;

transmitting a status signal regarding the status of the second device from each second device in a respective time slot;

receiving the status signals regarding the status of the second device from each second device at least one repeater and combining them into a combined status signal;

transmitting the combined status signal from the repeater;

receiving the combined status signal at the other repeater, adding additional status information received by that repeater regarding the status of each second device and transmitting an updated combined status signal from the other repeater; and receiving at least one of said status signal from said second device, said combined status signal, and said updated combined status signal at said first device.

33. The method of communication of claim 32, further comprising the steps of providing the first device as a master control unit with status indicating devices and providing the second device as a lamp dimmer that controls power to an electric lamp and further comprising the step of:

indicating the status of the lamp dimmer at the first device in response to the receipt of at least one of said first status signal, said combined status signal and said updated combined status signal at said first device.

34. The method of communication of claim 32, further comprising the step of providing the first device with at least one actuator and further wherein the step of transmitting the first signal is initiated by the step of actuating said at least one actuator.

* * * * *